(12) United States Patent
Minemura

(10) Patent No.: US 7,773,481 B2
(45) Date of Patent: Aug. 10, 2010

(54) RECORDING METHOD AND OPTICAL DISC APPARATUS

(75) Inventor: Hiroyuki Minemura, Kokubunji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1158 days.

(21) Appl. No.: 11/091,663

(22) Filed: Mar. 29, 2005

(65) Prior Publication Data

US 2006/0083135 A1 Apr. 20, 2006

(30) Foreign Application Priority Data

Oct. 20, 2004 (JP) .............................. 2004-305083

(51) Int. Cl.
*G11B 20/10* (2006.01)
(52) U.S. Cl. ............... 369/59.22; 369/59.12; 369/47.35
(58) Field of Classification Search ................. 369/100, 369/59.2, 59.21, 59.22, 59.51
See application file for complete search history.

(56) References Cited

U.S. PATENT DOCUMENTS

| | | | | |
|---|---|---|---|---|
| 5,661,709 | A * | 8/1997 | Takagi et al. ............. | 369/59.22 |
| 6,269,062 | B1 * | 7/2001 | Minemura et al. ....... | 369/47.53 |
| 6,510,116 | B1 * | 1/2003 | Miyagawa et al. ....... | 369/59.12 |
| 6,625,095 | B1 | 9/2003 | Yasuma | |
| 6,654,325 | B1 | 11/2003 | Minemura et al. | |
| 6,678,230 | B2 * | 1/2004 | Miyashita et al. ......... | 369/53.16 |
| 2002/0126604 | A1 * | 9/2002 | Powelson et al. ........ | 369/47.53 |
| 2002/0159350 | A1 * | 10/2002 | Ogura et al. ............. | 369/59.22 |
| 2002/0181360 | A1 * | 12/2002 | Hamada et al. .......... | 369/47.28 |
| 2003/0210753 | A1 * | 11/2003 | Kuo et al. ................. | 375/341 |
| 2004/0114912 | A1 * | 6/2004 | Okamoto et al. ............. | 360/65 |
| 2004/0208106 | A1 * | 10/2004 | Minemura ............... | 369/59.22 |
| 2005/0094304 | A1 * | 5/2005 | Ohkubo et al. ................ | 360/65 |
| 2005/0213460 | A1 | 9/2005 | Ohkubo | |
| 2006/0203674 | A1 * | 9/2006 | Schreurs et al. .......... | 369/59.11 |

FOREIGN PATENT DOCUMENTS

| | | |
|---|---|---|
| JP | 10-320777 | 12/1998 |
| JP | 2001-6181 | 1/2001 |
| JP | 2001-118246 | 4/2001 |
| JP | 2003-6864 | 1/2003 |
| JP | 2003-303417 | 10/2003 |
| WO | WO 01/11614 A1 | 2/2001 |

* cited by examiner

*Primary Examiner*—Hoa T Nguyen
*Assistant Examiner*—Jesse Hauck
(74) *Attorney, Agent, or Firm*—Antonelli, Terry, Stout, & Kraus, LLP.

(57) ABSTRACT

In a recordable optical disc apparatus, the efficiency of the work necessary for optimizing the write pulse condition (write strategy) is improved and the read compatibility among drive units is ensured by a minimum addition of circuitry. An edge shift amount or a read signal and a binarized result are stored in an external memory as digital data and are later processed by analysis software in a host PC. The write pulse shape and power conditions can be optimized to individual optical disc media in a short time by means of a simple circuit. Further, by optimizing the write pulse shape and power condition in view of the PRML class or the difference in NA of the head, any deterioration of read compatibility can be avoided.

9 Claims, 50 Drawing Sheets

New Drive
- Higher S/N Amp
- Wide Margin PRML Read Channel
- Pricise Servo Control Legacy Drive
- Lower S/N Amp
- Narrow Margin Direct-Slice Read Channel
- Normal Servo Control

|  | NA0.60 Drive Write | NA0.65 Drive Write |
|---|---|---|
| NA0.60 Drive Read | Jitter=6.9% | Jitter=8.3% |
| NA0.65 Drive Read | Jitter=6.6% | Jitter=6.2% |

(a) Write Power vs. Jitter (b) Write Power vs. PI Frame Error

|  | NA0.60 Drive Write | NA0.65 Drive Write Calibration Condition | |
|---|---|---|---|
|  |  | Boost=2.2dB | Boost=3.2 dB |
| NA0.60 Drive Read | Jitter=6.9% | Jitter=6.9% | Jitter=8.3% |
| NA0.65 Drive Read at Calibration Boost | - | Jitter=6.2% | Jitter=6.2% |

(a) Write Power vs. PI Frame Error (b) Eye Pattern at (A)

(c) 3T_Mark-3T_Space-3T_Mark Signal at (A)

FIG. 19

Case 1: Clock Point = Edge Points.
A/D Sample Points are Synchronous to Data Edges
(PRML Class Number is Even and Tap Number of FIR Filter is Odd)

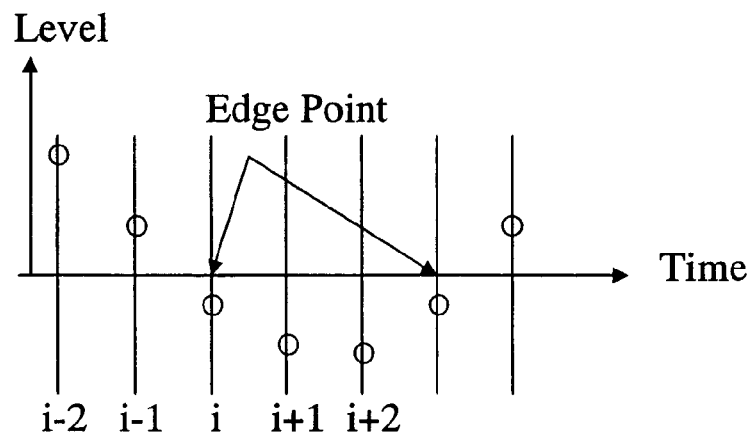

Edge Condition: $y[i-1] \cdot y[i+1] < 0$;
Edge Slope: $m = (y[i+1] - y[i-1])/2$;
Edge Level: $y_e = y[i]$;
Edge Shift: $ES = -y_e/m$;

Case 2: Clock Point ≠ Edge Points.
A/D Sample Points are Half-Clock-Shifted to Data Edges
(PRML Class Number is Odd and Tap Number of FIR Filter is Odd)

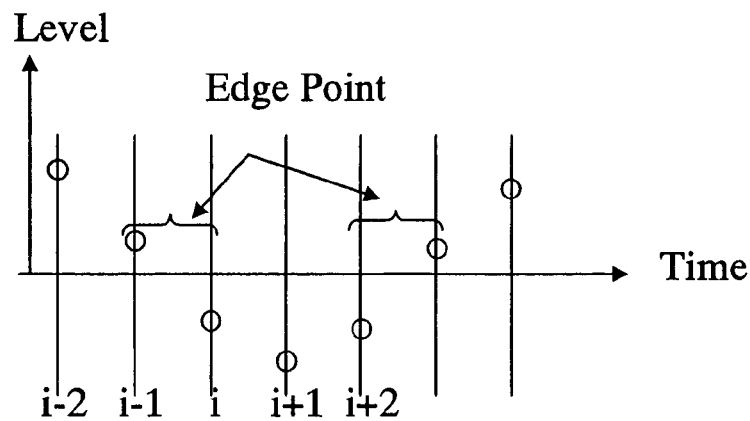

Edge Condition: $y[i] \cdot y[i+1] < 0$;
Edge Slope: $m = y[i+1] - y[i]$;
Edge Level: $y_e = (y[i+1] + y[i])/2$
Edge Shift: $ES = -y_e/m$

FIG. 29

| | Eye Pattern | Write Pulse Waveform (6T) |
|---|---|---|
| DVD-R | | Pw, Pr |
| DVD-RW | | Pw, Pe, Pg |
| DVD-RAM | | Pw, Pe |

(a) Leading Edge (b) Trailing Edge (a) Read Condition Calibration Section (b) Write Powers for Edge Shift Adjustment (=Padj) Calibration (c) Write Power Margin Evaluation after the Calibration

FIG. 41

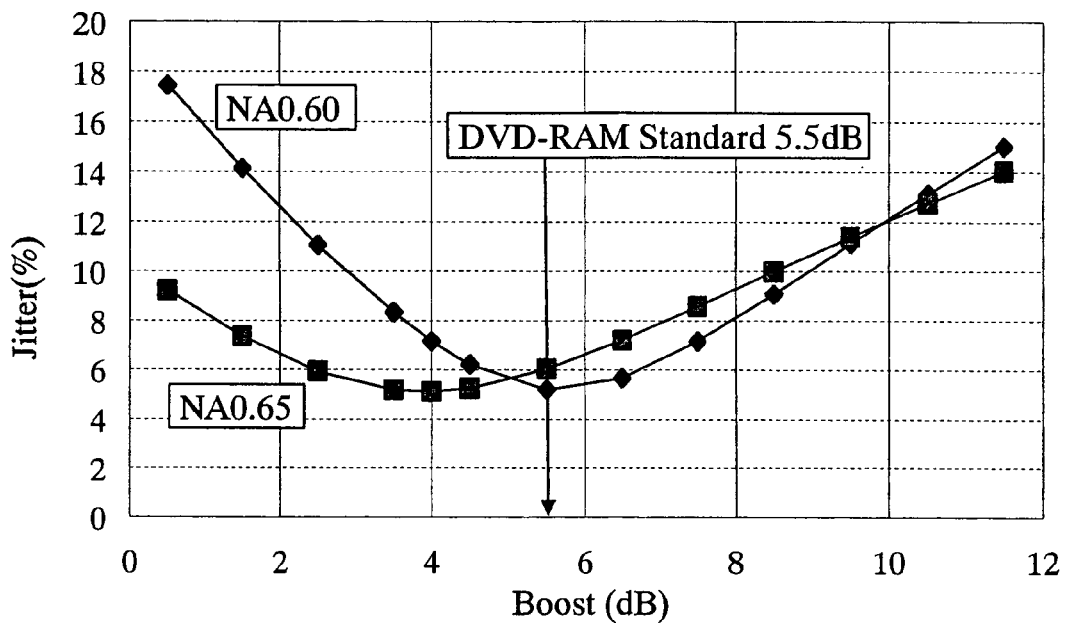

FIG. 42

| Objective Lens NA | Wave | Edge Shift Tables | |
|---|---|---|---|
| 0.60 | Jitter = 5.2%, Resolution = 37% | Leading Edges<br>| SFP | 3T | 4T | 5T | ≧6T |<br>|---|---|---|---|---|<br>| 3T | 2 | 5 | 3 | -2 |<br>| 4T | -4 | 0 | -2 | -5 |<br>| 5T | -3 | 1 | -1 | -5 |<br>| ≧6T | 1 | 4 | 3 | -1 | | Trailing Edges<br>| ELP | 3T | 4T | 5T | ≧6T |<br>|---|---|---|---|---|<br>| 3T | -2 | -5 | -2 | 2 |<br>| 4T | 4 | 0 | 2 | 3 |<br>| 5T | 3 | -1 | 2 | 3 |<br>| ≧6T | -1 | -5 | -2 | 1 |<br>[Unit = %/Tw] |
| 0.65 | Jitter = 6.0%, Resolution = 61% | Leading Edges<br>| SFP | 3T | 4T | 5T | ≧6T |<br>|---|---|---|---|---|<br>| 3T | 2 | 8 | 8 | 4 |<br>| 4T | -7 | 1 | 0 | -3 |<br>| 5T | -8 | -1 | -1 | -5 |<br>| ≧6T | -4 | 2 | 2 | -1 | | Trailing Edges<br>| ELP | 3T | 4T | 5T | ≧6T |<br>|---|---|---|---|---|<br>| 3T | -3 | -8 | -8 | -4 |<br>| 4T | 6 | -1 | 0 | 3 |<br>| 5T | 8 | -1 | 2 | 5 |<br>| ≧6T | 4 | -3 | -1 | 2 |<br>[Unit = %/Tw] |

Equalizing Condition : Boost 5.5dB (DVD-RAM Standard)

FIG. 43

| Objective Lens NA | Wave | Edge Shift Tables | | | | | | | | | |
|---|---|---|---|---|---|---|---|---|---|---|---|
| 0.60 Equalizing : Boost=5.5dB (DVD-RAM Standard) | Jitter = 5.2%, Resolution = 37% | Leading Edges | | | | | Trailing Edges | | | | |
| | | SFP | 3T | 4T | 5T | ≧6T | ELP | 3T | 4T | 5T | ≧6T |
| | | 3T | 2 | 5 | 3 | -2 | 3T | -2 | -5 | -2 | 2 |
| | | 4T | -4 | 0 | -2 | -3 | 4T | 4 | 0 | 2 | 3 |
| | | 5T | -3 | 1 | -1 | -3 | 5T | 3 | -1 | 2 | 3 |
| | | ≧6T | 1 | 4 | 3 | -1 | ≧6T | -1 | -5 | -2 | 1 |
| | | [Unit = %/Tw] | | | | | | | | | |
| 0.65 Equalizing : Boost=4.0dB | Jitter = 5.1%, Resolution = 52% | Leading Edges | | | | | Trailing Edges | | | | |
| | | SFP | 3T | 4T | 5T | ≧6T | ELP | 3T | 4T | 5T | ≧6T |
| | | 3T | 2 | 5 | 3 | -2 | 3T | -2 | -5 | -2 | 2 |
| | | 4T | -4 | 0 | -2 | -4 | 4T | 4 | 0 | 2 | 3 |
| | | 5T | -4 | 1 | -1 | -3 | 5T | 3 | -1 | 2 | 4 |
| | | ≧6T | 1 | 4 | 3 | -1 | ≧6T | -1 | -5 | -2 | 1 |
| | | [Unit = %/Tw] | | | | | | | | | |

FIG. 44

| Objective Lens NA | Wave | Edge Shift Tables | | | | | | | | | |
|---|---|---|---|---|---|---|---|---|---|---|---|
| 0.60<br><br>Equalizing :<br>Boost=5.5dB<br>(DVD-RAM Standard) | Jitter = 5.2%, Resolution = 37%<br>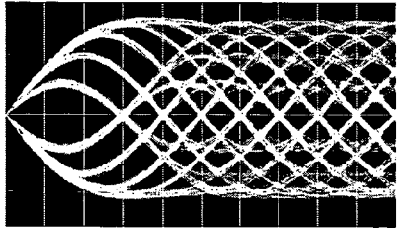 | Leading Edges | | | | | Trailing Edges | | | | |
| | | SFP | 3T | 4T | 5T | ≧6T | ELP | 3T | 4T | 5T | ≧6T |
| | | 3T | 2 | 5 | 3 | -2 | 3T | -2 | -5 | -2 | 2 |
| | | 4T | -4 | 0 | -2 | -3 | 4T | 4 | 0 | 2 | 3 |
| | | 5T | -3 | 1 | -1 | -3 | 5T | 3 | -1 | 2 | 3 |
| | | ≧6T | 1 | 4 | 3 | -1 | ≧6T | -1 | -5 | -2 | 1 |
| | | [Unit = %/Tw] | | | | | | | | | |
| 0.65<br><br>Equalizing :<br>Boost=5.5dB<br>(DVD-RAM Standard)<br>+<br>15Tap FIR(*) | Jitter = 4.2%, Resolution = 38%<br>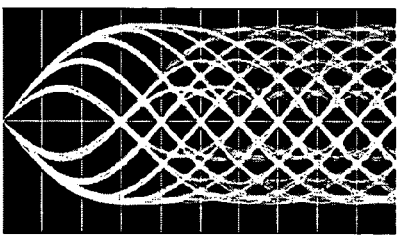 | Leading Edges | | | | | Trailing Edges | | | | |
| | | SFP | 3T | 4T | 5T | ≧6T | ELP | 3T | 4T | 5T | ≧6T |
| | | 3T | -1 | -1 | -1 | -2 | 3T | -1 | -0 | 1 | 2 |
| | | 4T | -2 | 0 | 0 | 0 | 4T | 0 | 0 | 0 | 0 |
| | | 5T | -1 | 0 | 0 | 0 | 5T | 0 | 1 | 1 | 0 |
| | | ≧6T | -1 | -2 | 0 | 0 | ≧6T | 0 | 1 | 2 | 1 |
| | | [Unit = %/Tw] | | | | | | | | | |

(*) Edge focused optimization for a PR class (1,2.8,3.8,3.8,2.8,1) by using LSE method.

(a) Frequency response of DVD-RAM standard equalizer (b) Frequency response of the compensation equalizer for NA=0.65.

Tap coefficients were obtained for a PR class (1,2.8,3.8,3.8,2.8,1) by an edge-focused LSE method.

FIG. 47(a)
$$\sigma_{tot} = \sqrt{\sigma_o^2 + \Delta_+^2 \cdot R_+ + \Delta_-^2 \cdot R_-}$$
"+" Shift Pattern Rate $R_+ = 21\%$
"−" Shift Pattern Rate $R_- = 21\%$
Do not move $= 58\%$
(a) Calculation and measurement conditions
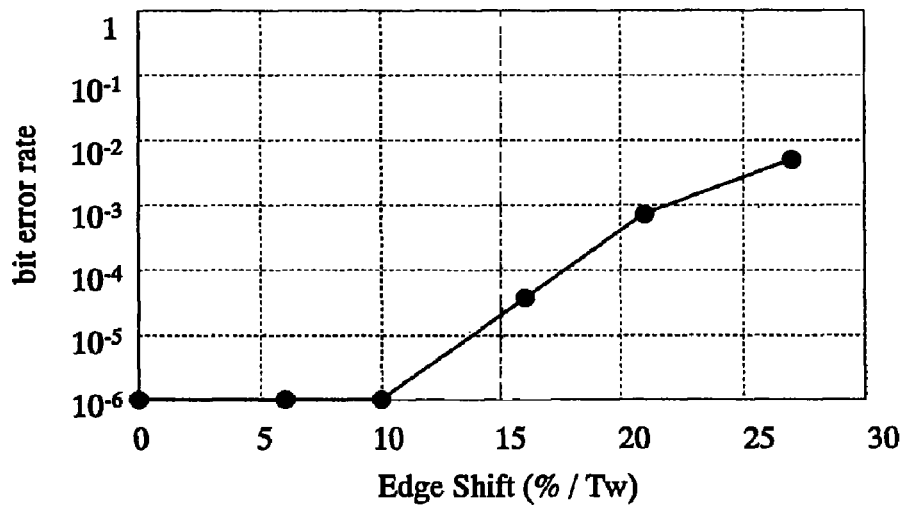
(b) Edge shift vs. bit error rate
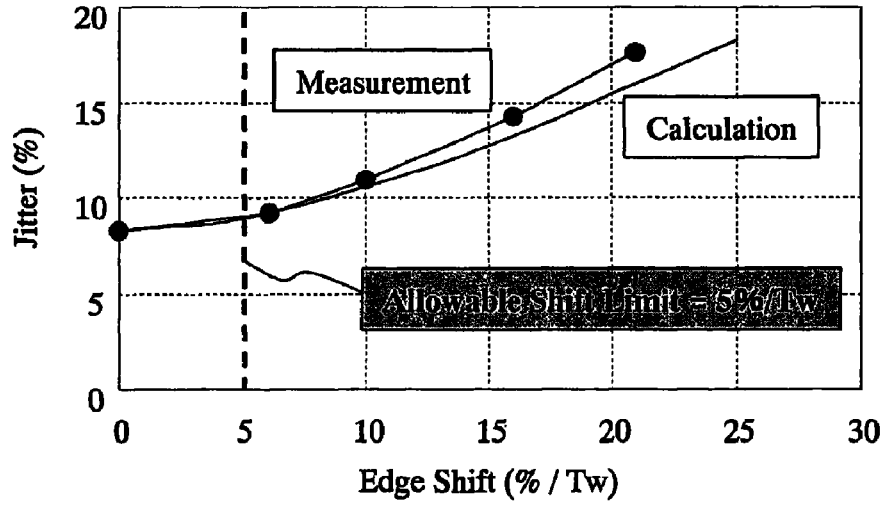
(c) Edge shift vs. Jitter (a) Average edge shifts in case of the DVD-RAM standard equalization (b) Average edge shifts in case of the DVD-RAM standard equalization and compensated by a 15-tap FIR filter.

FIG. 52

| Read Speed | Standard EQ | Standard EQ + FIR |
|---|---|---|
| 2X | Jitter = 4.8% | Jitter = 4.6% |
| 4X | Jitter = 5.1% | Jitter = 4.6% |
| 8X | Jitter = 5.8% | Jitter = 5.1% |
| 16X | Jitter = 12.6% | Jitter = 5.7% |

FIG. 53

| Tap | 2X | 4X | 6X | 8X | 10X | 12X | 14X | 16X |
|---|---|---|---|---|---|---|---|---|
| -7 | 0 | -0.040 | -0.059 | -0.052 | -0.051 | -0.048 | -0.034 | -0.037 |
| -6 | 0 | 0.022 | 0.061 | 0.044 | 0.043 | 0.028 | 0.002 | 0.009 |
| -5 | 0 | 0.037 | 0.020 | 0.039 | 0.053 | 0.062 | 0.071 | 0.068 |
| -4 | 0 | -0.069 | -0.091 | -0.099 | -0.117 | -0.122 | -0.114 | -0.139 |
| -3 | 0 | -0.004 | 0.007 | -0.002 | -0.018 | -0.022 | -0.017 | 0.009 |
| -2 | 0 | 0.087 | 0.105 | 0.122 | 0.149 | 0.168 | 0.176 | 0.211 |
| -1 | 0 | -0.035 | -0.041 | -0.043 | -0.025 | -0.023 | -0.020 | -0.045 |
| 0 | 1 | 0.909 | 0.907 | 0.899 | 0.892 | 0.908 | 0.909 | 0.890 |
| 1 | 0 | 0.073 | 0.062 | 0.073 | 0.047 | 0.015 | -0.012 | -0.005 |
| 2 | 0 | 0.135 | 0.151 | 0.184 | 0.215 | 0.241 | 0.227 | 0.218 |
| 3 | 0 | -0.107 | -0.083 | -0.112 | -0.091 | -0.065 | -0.032 | -0.028 |
| 4 | 0 | -0.130 | -0.157 | -0.191 | -0.224 | -0.251 | -0.218 | -0.176 |
| 5 | 0 | 0.138 | 0.098 | 0.133 | 0.112 | 0.088 | 0.057 | 0.044 |
| 6 | 0 | 0.037 | 0.102 | 0.083 | 0.104 | 0.122 | 0.091 | 0.052 |
| 7 | 0 | -0.054 | -0.082 | -0.079 | -0.089 | -0.099 | -0.085 | -0.071 |

FIG. 54
| W/R Speed | 1st Write | 10 times overwrite |
|---|---|---|
| 6X | 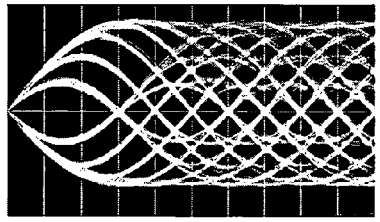 | 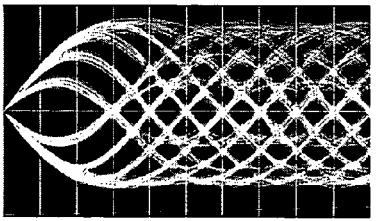 |
| bER | $< 1 \times 10^{-7}$ | $2 \times 10^{-7}$ |
| 16X | 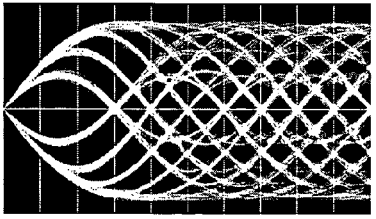 | 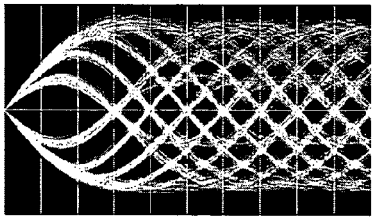 |
| bER | $< 1 \times 10^{-7}$ | $4 \times 10^{-7}$ |
(*)Bit error rates were measured using PRML Channel

RECORDING METHOD AND OPTICAL DISC APPARATUS

CLAIM OF PRIORITY

The present application claims priority from Japanese application JP 2004-305083 filed on Oct. 20, 2004, the content of which is hereby incorporated by reference into this application.

BACKGROUND OF THE INVENTION

1. Field of the Invention

The present invention relates to an optical disc recording method and apparatus for recording information by forming a recording mark on a recording medium whose physical properties are different from those of the other portions of the medium.

2. Description of Related Art

Optical disc media such as DVD-RAM and DVD-RW that employ rewritable phase-change optical recording material are in widespread use. Recently, greater capacity Blu-ray Disc products that employ blue laser and that accommodate high-vision broadcast recording have also been put on the market. There is now a growing need for optical disc apparatuses capable of reading and writing DVDs and Blu-ray Discs on a single drive unit. When information is recorded on such high-density optical discs, it is important to optimize the power and pulse condition of the write laser beam in a process generally referred to as a test write.

Generally, for the quality evaluation of the signal recorded on an optical disc, jitter, which indicates the standard deviation of the displacement between data edge and clock edge, is used. In order to measure the jitter value, a dedicated measuring instrument such as a jitter analyzer is required. Since it is impossible to build a jitter analyzer, which is expensive, in the optical disc apparatus, there is a need for an alternative signal evaluation index.

In an example of the conventional test write technique, JP Patent Publication (Kokai) No. 10-320777 (corresponding to U.S. Pat. No. 6,269,062) discloses that, instead of directly measuring the jitter value, a logic pulse referred to as an error pulse is produced when the phase difference between data edge and clock edge exceeds a predetermined value, and the number of such error pulses is counted so as to evaluate the jitter value in an equivalent manner. The write power is then optimized based on the evaluation.

In WO01/011614 (corresponding to U.S. Pat. No. 6,654,325), a test write technique for the 4.7 GB DVD-RAM is disclosed which is based on a table-referenced type adaptive write strategy in accordance with the preceding and following space and mark lengths. In this technique, a sorting process is carried out on error pulses in accordance with a write strategy table, and the pulse condition of the write laser light is optimized such that the error pulse value of each table item is minimized. Although the actual sorting process requires two 4×4 tables, since a logic pulse called error pulse is used for signal evaluation, the sorting process can be easily implemented by means of a logic LSI.

Further, JP Patent Publication (Kokai) No. 2003-6864 A discloses a write condition optimizing technique suitable for binarization by the Viterbi decoding. In this technique, which is an evolution of the aforementioned method based on binarization by the conventional direct slice scheme, the read signal is A/D converted and then sorted depending on the temporal transition of the target signal level for the Viterbi decoding. The phase difference between the clock and the data edge is detected for each case of the read signal, so that an optimum write condition for the aforementioned Viterbi decoding scheme can be obtained.

Patent Document 1: JP Patent Publication (Kokai) No. 10-320777 A (1998)

Patent Document 2: WO01/011614

Patent Document 3: JP Patent Publication (Kokai) No. 2003-6864 A

SUMMARY OF THE INVENTION

In the aforementioned examples of the test write procedure, the write power and pulse shape conditions are optimized upon loading of the disc into the drive unit in accordance with the condition of the disc and the drive unit. In the case of a disc such as the aforementioned DVD-RAM in which more than a hundred thousand rewrites are possible and which has a sector structure, the write conditions can be optimized by repeating a recording or reading a number of times. Further, since the access time for recording or reading is short, the test write procedure itself can be performed in a short time. On the other hand, in disc media such as DVD-Rs which are recordable only once, it is difficult to calibrate the write pulse shape. Therefore, in such disc media, only the power calibration is carried out based on the ID information described in the disc, using the condition of the write pulse shape stored in the drive unit beforehand.

The mainstream of the recent recordable DVD drive units are of the multiple-function type referred to as a "super-multi drive," which is capable of recording and reading any of the DVD and CD media, as shown in FIG. 2. These "super-multi drive" units store write pulse shape conditions for each recording speed for more than 100 types of optical disc media. Meanwhile, the recordable optical disc apparatuses including the super-multi drives have been undergoing model changes on a yearly basis, and there are repeated waves of speed increases and price reductions as well as renewals to accommodate the latest media. In such an environment surrounding the development of the drive units, tremendous amounts of work hours are spent on the selection of an appropriate write pulse shape condition for each of the huge numbers of optical disc media. Actually, it is not too much to say that the selection process represents a bottleneck in the development of new drive units.

As described above, in the recordable DVD and CD media excluding the DVD-RAMs, the write pulse shape is in many cases not optimized upon loading. Thus, it has been necessary to determine the appropriate write pulse shape condition for individual discs and to store them in the drive units.

Further, now that the DVDs are in such widespread use as mentioned above, how to increase the recording and reading speeds is one of the most important technical issues for developers. At the same time, when a signal is read from a DVD is read on a single drive unit at high speeds, the influence of noise becomes large. Therefore, the PRML (Partial Response Maximum Likelihood) scheme, typically the Viterbi decoding, is becoming more and more indispensable as a read signal binarization scheme whereby the S/N ratio can be effectively improved, instead of the conventional direct slice method.

The following discusses the problems that are encountered when the latest drive units employing the PRML scheme and the conventional drive units of the direct slice scheme coexist in the market. FIG. 3 schematically shows these problems. The illustrated example is where a disc recorded on a high-performance, latest drive unit can be read on another latest drive unit but ends up producing a read error when read on a conventional drive unit with inferior performance. Such an issue of read compatibility takes place more often in cases where a new drive unit records data under conditions favorable for reading on its own.

In the PRML scheme, binarization is carried out such that not only the edge position of the read signal but also the signal as a whole is compared with the target signal to sequentially select a most feasible data sequence. In this case, in order to generate the target signal, two to five numerical sequences referred to as a PR class are used. The PR class is a numerical value sequence approximating the impulse response of the read signal. As a PR class for DVDs, the PR(3,4,4,3)ML scheme is well known. However, since the PR class is no more than an approximation of the impulse response, if the equalization conditions and the write pulse and power are determined using a signal evaluation index such as the bit error rate, edge shift, SAM (Sequenced Amplitude Margin), or MLSE (Maximum Likelihood Sequence Estimation), on a PR(3,4,4,3)ML decoder, for example, such that the indices are optimized, the jitter value increases when played back on a conventional unit due to the difference from the conditions determined by the DVD standards for ensuring compatibility, possibly resulting in a read error in a worst case. Since the PR class used by a particular drive unit is unique to that drive unit, the write conditions must never be determined in accordance with the PR class. The technique disclosed in JP Patent Publication (Kokai) No. 2003-6864 A determines an optimum write condition for the PR class of a particular drive unit, and it does not take into consideration the read compatibility between drive units.

Therefore, it is the object of the invention to:

(1) Allow the write pulse shape and power conditions for individual optical disc media to be optimized in a short time using a simple circuit configuration; and (2) Optimize the write pulse shape and power conditions while taking into consideration the PRML class or the difference in the NA of the head, such that the read compatibility is not adversely affected.

Hereafter, the result of an analysis will be discussed.

The recordable DVD media include DVD-RAMs, DVD-Rs, DVD-RWs, DVD+Rs, and DVD+RWs, and it is desired that these discs can be recorded and read on a single drive unit. The NA of the heads for reference drives defined by these standards is different individually, namely, the NA for DVD-RAMs, DVD-Rs, and DVD-RWs is 0.60, while that for DVD+Rs and DVD+RWs is 0.65. Therefore, if a single optical head mounted on a drive unit is to accommodate all of these discs, one or the other NA must be selected. Generally speaking, it would be more natural to adopt the larger NA, or 0.65, and to record or read using a small spot size, in terms of signal quality and the write power efficiency during high-speed recording, for example. When optimizing the write condition for DVD-RAMs, DVD-Rs, and DVD-RWs, it is necessary to optimize the write pulse condition by using an optical head with NA of 0.65 so that a good jitter value can be obtained when played back on an optical disc apparatus with NA of 0.60. For example, in the case of a DVD-R, although the boost amount for waveform equalization upon reading on an apparatus with NA of 0.60 is determined to be 3.2 dB, if the write condition is optimized using the same waveform equalization boost amount of 3.2 dB on a unit with NA of 0.65, the difference in the optical spot size is reflected and the jitter value deteriorates when the recorded disc is read on a standard unit with NA of 0.60.

FIG. 4 summarizes the result of an experiment confirming the above notion. In the experiment, a commercially available DVD-R disc was measured using evaluation units with NA of 0.60 and 0.65 with a fixed equalization boost amount of 3.2 dB for each. The recording speed was 2×, and the read speed was 1×. When a disc recorded on the unit with NA of 0.60 was read on the same unit, the jitter value was 6.9%, whereas the jitter value deteriorated to 8.3% when another disc recorded on the unit with NA of 0.65 was read on the unit with NA of 0.60. Since the bit error rate in DVDs increases by a factor of 10 for each 1% increase in the jitter value, it can be said that the reliability of the disc recorded on the unit with NA of 0.65 dropped by a factor of 10 or more. In order to solve this problem, it would be necessary to read the disc recorded on the drive unit with NA of 0.65 on the standard drive unit with NA of 0.60 to evaluate the signal quality, and then determine the write pulse and power conditions of the drive unit with NA of 0.65 such that the signal quality can be optimized. If such an operation were to be conducted on a huge number of discs, the development resource for the development of newer models would increase, resulting in an increase in the cost of the drive unit.

FIG. 6 shows the result of measuring the power margin of a DVD-R disc. Using the aforementioned evaluation unit with NA of 0.60, the jitter value relative to the write power and the PI frame error count, which is an error evaluation index for the ECC (Error Correction Code), were measured. With regard to the PI frame error count, the result of binarization by the direct slice method and that by PR(3,4,4,3)ML were compared. As will be seen from the drawing, it was learned that a large discrepancy arises between the PI frame error count by the direct slice method and that by the PRML method in the regions of write power above the write power (approx. 17 mW) where the jitter was minimized. The disc recorded with a write power exceeding 20 mW in the drawing would be read properly on a drive unit with the PRML scheme, but it would likely produce a read error if read on a drive unit with the direct slice scheme. This phenomena is not about the NA of the head, as mentioned above, but it is due to the difference in the binarization scheme per se. This is another problem to be addressed before read compatibility can be ensured. The major factors underlying it and a solution will be described later.

Hereafter, a means for achieving the object (1) will be described.

As mentioned above, in the recordable optical discs other than DVD-RAMs, only the write power calibration is carried out upon loading of the disc medium into a drive unit. Thus, with regard to the write pulse shape condition, the condition is optimized in advance and stored in drive units for individual media and for individual recording speeds. Accordingly, the write pulse shape is not optimized once the drive units are put on the market. This means that there is no need for a circuit capable of optimizing the write pulse shape on a real-time basis, as in the aforementioned prior art examples. Indeed, the simple configuration is preferable from the viewpoint of preventing an increase in power consumption which would result when the drive units equipped with the circuit operating at high speeds are operated in the market.

FIG. 1 shows a block diagram of a read signal processing unit of an optical disc apparatus in which the invention is implemented. The overall configuration consists of a read signal processing circuit 40, an external memory 200, and a CPU 140. The read signal processing circuit 40 comprises a Viterbi decoder 10 and a PLL 30. When an RF signal 50 that is obtained by subjecting a signal read by an optical head (not shown) to an analog equalization process is fed, the read signal processing circuit 40 outputs a binary data sequence 51 and the amount of edge shift 52 (also referred to as a phase error) between a clock 53 detected in the PLL 30 and the RF signal 50. These outputs are stored in the external memory 200 in chronological order. The CPU 140 reads the binary data sequence 51 and the edge shift amount 52 from the external memory 140 and processes them in order to evaluate the read signal quality. Since not only the edge shift amount but also the binarization result is stored simultaneously, the jitter amount for each pattern depending on the mark lengths and the preceding and following space lengths and a mean shift amount can be determined by simple calculations. Thus, individual factors can be processed in a parallel manner and optimized for individual DVD write strategies with different write pulse shape conditions depending on the mark lengths and the preceding and following space lengths, thereby allowing the processing time to be reduced. At the same time, the CPU 140 gives instructions to a recording data processing unit (not shown) to modify the write pulse shape and power conditions, and evaluates the corresponding read signal quality. The CPU 140 then determines the appropriate write pulse shape and power conditions in accordance with the result of the evaluation. In the present configuration, the read signal processing circuit 40 and the CPU 140 are indispensable for the drive unit. With regard to the external memory 200, the quantity of the circuitry that must be added can be minimized by sharing the DRAM used in the work area for the ECC decoding processing, for example.

Regarding the evaluation of the read signal quality, since the apparatus of the invention is not provided with dedicated hardware for jitter evaluation, such as disclosed in WO01/011614, the jitter cannot be measured simultaneously upon reading. If the time required for optimizing the write condition is one second, for example, in WO01/011614, the apparatus of the invention requires more processing time. However, assuming that the operation took eight hours, for example, by the aforementioned method shown in FIG. 5, the invention would require 10 minutes, for example, for optimizing the write condition, which represents a sufficient effect. The flow of procedures for optimizing the write pulse shape and power conditions will be described in detail with reference to the description of the preferred embodiments. Also, the significance of using the binarization result by the PRML scheme and the information concerning the edge shift amount will be described in detail with reference to the embodiments. The essence of the invention lies in that the binarization result and the edge shift are stored in an external memory in chronological order, and these information are later processed by the CPU to evaluate the signal quality, based on which the write pulse shape and power conditions are optimized. Such a write method and an optical disc apparatus implementing it allow the write condition of a huge number of media to be efficiently optimized with a minimum addition of circuitry. Thus, the time required for the development of the drive unit can be reduced, so that the cost of the unit can be reduced, thereby achieving the object (1).

Hereafter, means for achieving the object (2) will be described.

First, a method for compensating the difference in NA is described.

FIG. 7 shows the result of measuring the relationship between the amount of boost for waveform equalization and jitter, using evaluation units with NA of 0.60 and 0.65. As shown in the drawing, on the evaluation unit with NA of 0.60, a minimum jitter of 6.9% was obtained at the standard boost amount of 3.2 dB. When the same disc was read on the evaluation unit with NA of 0.65, a minimum jitter value of 6.2% was obtained with the boost amount of approximately 2.2 dB. This difference is considered to be the consequence of approximating the difference in optical spot size with an equalizing boost amount. Thus, the jitter was evaluated by optimizing the write condition by changing the equalizing boost amount of the evaluation unit of NA 0.65 to 2.2 dB. The results are shown in FIG. 8. The jitter when read on the evaluation unit with NA of 0.60 was (1) 8.3% on the disc that had been recorded on the evaluation unit of NA 0.65 with the equalizing boost amount adjusted to 3.2 dB; and (2) 6.9% on the disc that had been recorded on the evaluation unit of NA 0.65 with the equalizing boost amount adjusted to 2.2 dB. Thus, the latter case provided the same jitter value as that obtained when a write adjustment was made on the evaluation unit of NA 0.60.

FIG. 9 shows the result of measuring the relationship between the equalizing boost amount and jitter values when the aforementioned three discs were read on the evaluation unit of NA 0.60. Even the disc that had been recorded on the evaluation unit of NA 0.65 provided jitter characteristics equivalent to those of the disc recorded on the evaluation unit of NA 0.60 when the equalizing boost amount had been adjusted to 2.2 dB. This indicates that the marks formed on both discs have substantially the same sizes.

FIG. 10 shows the result of measuring the relationship between the write power and the PI frame error on a DVD-R disc. FIG. 10(a) corresponds to FIG. 6(b). At point A in FIG. 10(a), there are approximately 80 PI errors per block in the case of the direct slice scheme. On the other hand, there is virtually no PI errors when the PRML scheme was employed for binarization. FIGS. 10(b) and (c) show an eye pattern at point A and the read signal for a 3T mark-3T space-3T mark pattern, respectively. Although a small amount of distortion can be observed in the eye pattern, the jitter value is 9.6% and, statistically, hardly any bit error should be produced. However, when FIG. 10(c) is observed, the signal amplitude of the two 3T marks is greatly different, namely, the amplitude of the preceding (earlier in time; on the left in the drawing) 3T mark is smaller. This is a phenomenon unique to the high-density dye-based optical discs, such as DVD-Rs. During the write process for a dye-based recording film, the dye is modified in quality by laser pulse irradiation, some of the dye sublimating into gas. The pressure of the gas is said to deform the plastic substrate, which then cools down to solidify, thereby forming a mark. The inventors' conjecture is that when two marks are formed at short intervals, such as a 3T space, the following mark is irradiated with laser pulse before the preceding mark has not yet cooled down sufficiently, such that the pressure created by the following mark, which is a mechanical influence, bears on the preceding mark and reduces the size of it which has not yet fully been fixed. When such a phenomenon occurs, only certain data patterns are affected. While this would not have any significant influence on the jitter value, which is concerned with the whole statistically, when the direct slice scheme is employed for binarization, the aforementioned 3T mark could be binarized into a 2T or a 1T, resulting in a PI frame error. On the other hand, in the case of the PRML for optical discs, the scheme normally has a metric structure corresponding to the RLL (Run Length Limited) codes employed. Since there is no 2T marks in the RLL codes in the PRML for reading DVD-Rs, when the PRML scheme is used for binarization, the aforementioned mark with a small amplitude would also be decoded into a 3T, which explains why the number of PI frame errors is different between the both.

Thus, in order to optimize the write condition such that data can be read satisfactorily by the conventional direct slice scheme, the result of decoding by the direct slice scheme must be considered. In accordance with the invention, as described with reference to FIG. 1, the result of binarization by the PRML scheme and the edge shift amount measured by the PLL are simultaneously stored in an external memory in chronological order. The PLL detects an edge of the read signal and then measures the edge shift amount. The algorithm for determining the position of an edge portion is the same as that for the direct slice scheme. Therefore, the position (time) at which a valid edge shift amount is stored in the external memory is the same as the edge position binarized by the direct slice scheme. Normally, the edge of data binarized by the PRML scheme, namely, the position at which a "1" and a "0" are switched, corresponds to the position at which a valid edge shift amount is stored. However, the two positions do not correspond in case the above-described phenomenon occur. Therefore, by detecting the disagreement between them using the CPU, the difference in the read result between the PRML scheme and the direct slice scheme can substantially be quantified. And when the frequency of such a disagreement exceeds a certain value, the write power is limited such that no greater power would be used for recording. In this way, data can be recorded on a drive of the PRML scheme such that it can be satisfactorily read by the direct slice scheme. Other methods that emulate the direct slice scheme will be described in detail with reference to the embodiments.

As described above, object (2) has been achieved.

Thus, the invention can provide an optical disc write method and an optical disc apparatus whereby the aforementioned two objects can be achieved, the write pulse and power conditions can be optimized in a short time by a simple structure, and the read compatibility among drive units can be ensured.

By using the write method and optical disc apparatus of the invention, the operation required for optimizing the write pulse condition (write strategy) can be made more efficient by a minimum addition of circuitry in a recordable optical disc apparatus implementing the PRML scheme, while ensuring the read compatibility among drive units. The effects provided by the invention can be summarized as follows:

(1) The write pulse shape and power conditions for individual disc media can be optimized in a short time by means of a simple circuit configuration.

(2) The write pulse shape and power conditions can be optimized while taking into consideration the difference in the PRML class or the NA of the head such that the read compatibility would not be compromised.

BRIEF DESCRIPTION OF THE DRAWINGS

FIG. 19 schematically shows an edge shift detection method.

FIG. 29 schematically shows a write strategy for each of DVD-R, DVD-RW, and DVD-RAM media.

FIG. 41 shows the results of measuring the relationship between equalizing boost amount and jitter when a DVD-RAM disc was read on evaluation units with NA 0.60 and NA0.65.

FIG. 42 shows the results of measuring and comparing the shift amount of each pattern when a DVD-RAM disc was read on apparatuses with NA 0.60 and NA 0.65 under standard equalizing boost conditions.

FIG. 43 shows the results when a DVD-RAM disc was read on the apparatus with NA 0.65 under the equalizing boost amount condition of 4.0 dB.

FIG. 44 shows the results when a DVD-RAM disc was read on the apparatus with NA 0.65 with an equalizing boost amount of 5.5 dB and using an FIR filter for read correction.

FIGS. 47(a)-47(c) show the results of determining the allowable values of edge shift.

FIG. 52 shows the eye patterns and jitter values at each speed in a summarized manner when read correction is performed and when it is not performed.

FIG. 53 shows the tap coefficients of the FIR filter for read correction at each speed in a summarized manner.

FIG. 54 shows the results of measuring the jitter value and bit error ratio at 6× and 16× speeds.

DESCRIPTION OF THE PREFERRED EMBODIMENTS

The invention will be hereafter described by way of preferred embodiments thereof.

Embodiment 1

Figure 1:
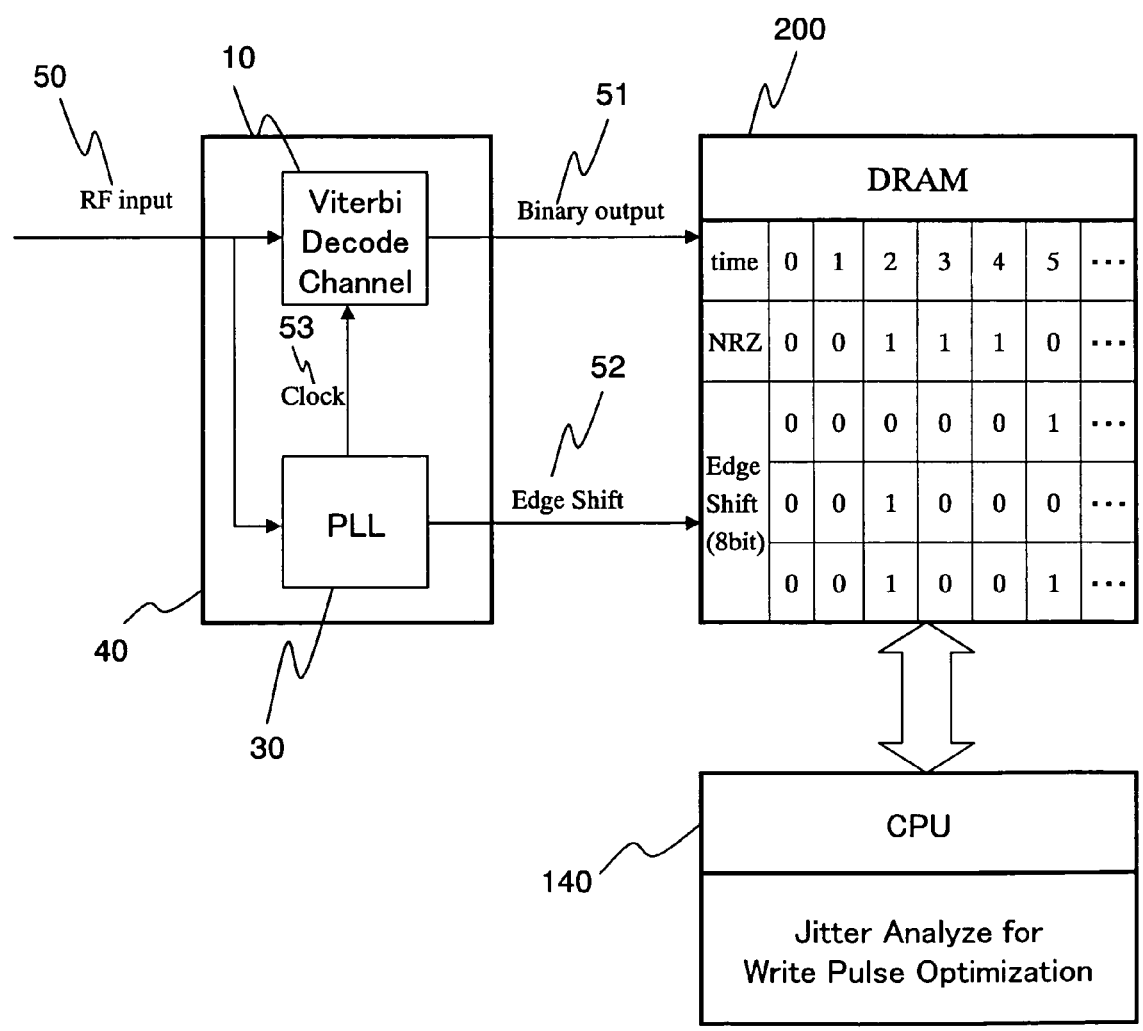
FIG. 1 shows a block diagram of a read signal processing portion of an optical disc apparatus for carrying out the present invention.
Figure 2:
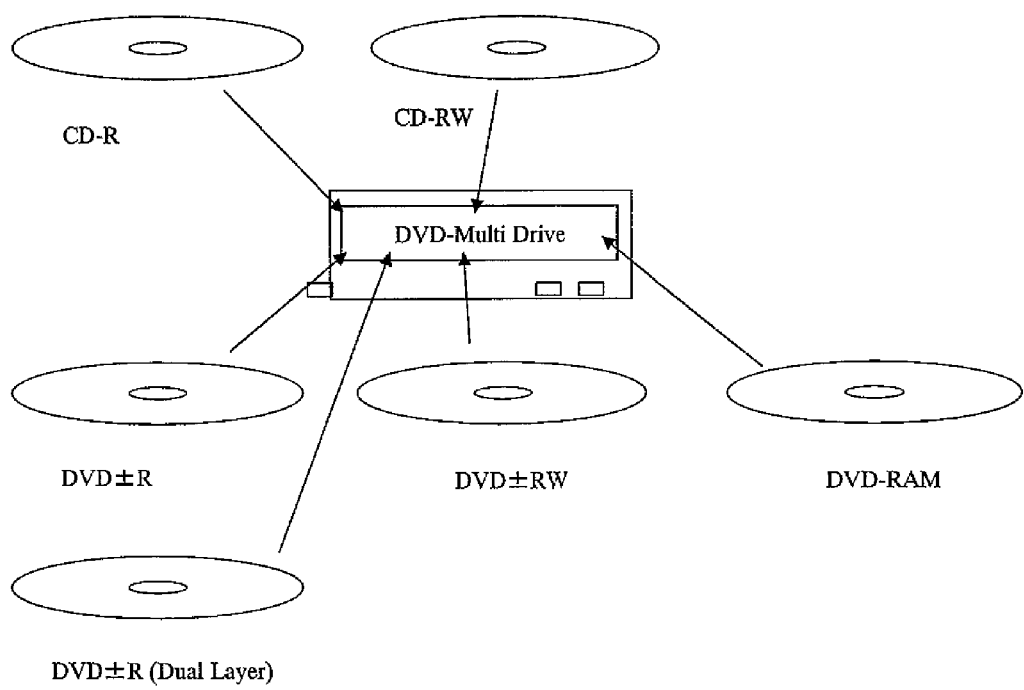
FIG. 2 schematically shows a recordable DVD drive unit.
Figure 3:
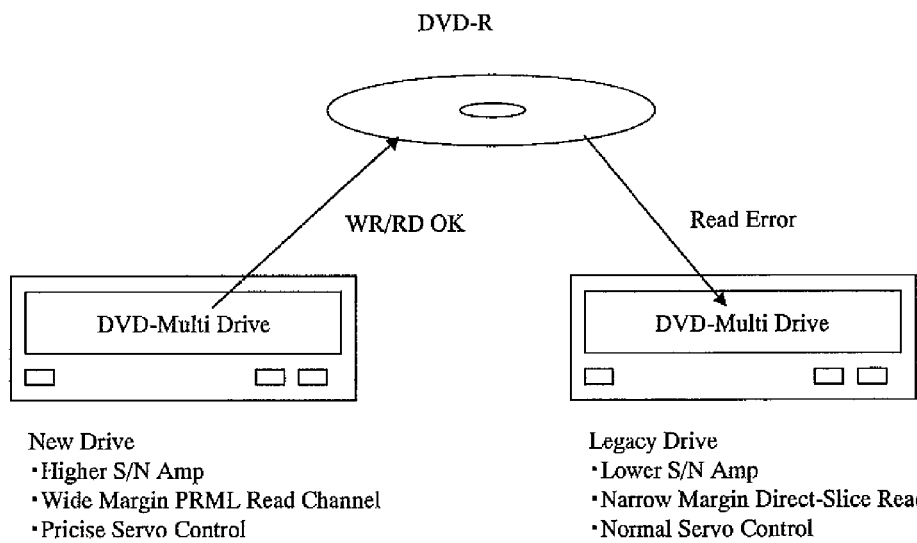
FIG. 3 schematically shows problems of the recordable DVD drive unit.
Figure 11:
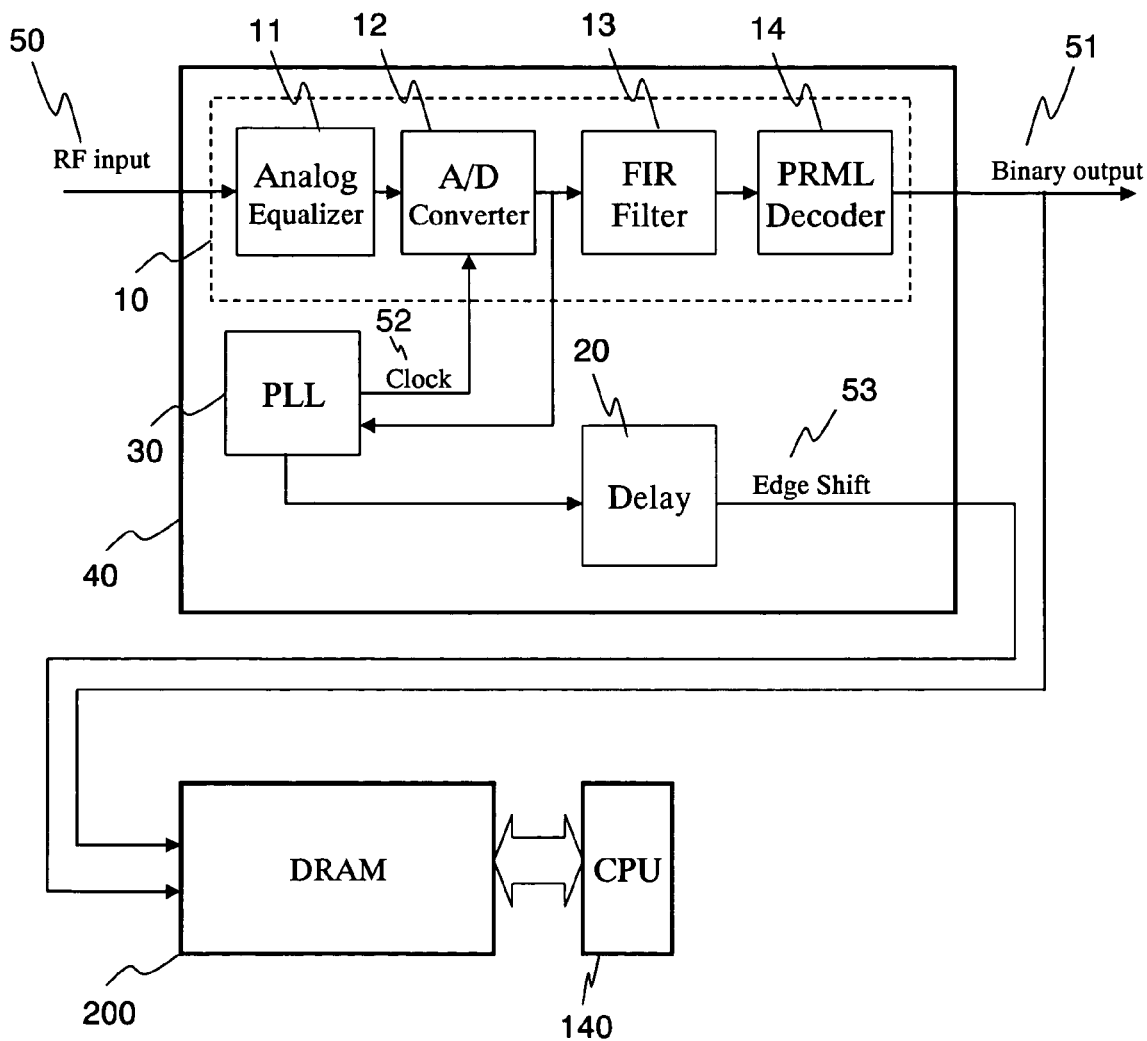
FIG. 11 shows an embodiment illustrating a circuit configuration suitable for the recording method and optical disc apparatus of the present invention.

The block diagram of an apparatus in accordance with the invention will be described in detail. FIG. 11 shows the diagram of a circuit suitable for the write method and optical disc apparatus of the invention, showing the block shown in FIG. 1 in greater detail. The circuit generally consists of a read signal processing circuit 40, an external memory 200, and a CPU 140. The read signal processing circuit 40 comprises a Viterbi decoder unit 10, a PLL 30, and a delay unit 20. The Viterbi decoder unit 10 includes an analog equalizer 11, an A/D converter 12, an FIR (Finite Impulse Response) filter 13, and a PRML decoder 14. A read signal 50 read by an optical head (not shown) is equalized and low-pass filtered by the analog equalizer 11. The thus processed signal is then sampled by the A/D converter 12 at each clock and converted into a 6- to 8-bit digital data sequence. The digital data sequence is digitally equalized by the FIR filter 13 and then binarized by the PRML decoder 14, which implements the Viterbi decoding scheme, thereby producing a binarized signal 51. In the PRML decoder 14, the data stream that has undergone the digital equalization process in the FIR filter 13 is compared with a target data stream generated by a superposition of appropriate impulse responses over a plurality of times. The PRML decoder 14 then makes a selection such that the difference between the two data streams can be minimized, thereby outputting the binarized data 51. The aforementioned impulse response is referred to as PR class. The PRML decoder 14 includes a memory sequence called a path memory for implementing the aforementioned selection process. As a result, there is a fixed delay amount between the data stream that is entered and the binarized data sequence that is outputted. The internal structure of the PRML would not be described in detail herein. The PLL 30 generates a clock from the read signal and feeds it to the individual circuits.

The PLL 30 therefore controls the voltage applied to a VCO (voltage controlled oscillator) built therein but not shown such that the clock 52 it generates tracks the edge of the aforementioned digital data sequence or the digital data sequence that has been digitally equalized by the FIR filter 13. For this purpose, the PLL 30 includes a phase comparator (not shown) for detecting the phase difference (edge shift amount) between the clock 52 and an edge position extracted from the digital data sequence. Alternatively, a CCO (current controlled oscillator) may be substituted for the VCO. The structure of the PLL will not be described in detail herein. The edge shift amount is calculated as a digital data value. The delay unit 20 causes the edge shift amount 53 to be delayed by the number of clocks corresponding to the sum of the aforementioned binarization delay amount produced by the PRML decoder and the delay amount produced by the FIR filter as needed so that the edge shift amount 53 can be synchronized with the binarized data sequence 51.

Figures 4, 5:
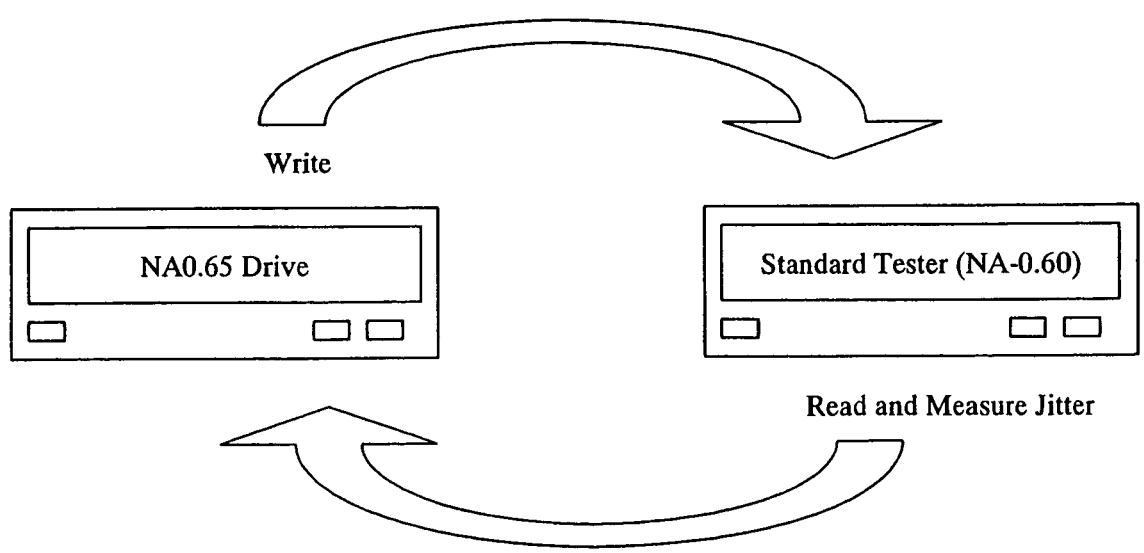
FIG. 4 shows experimental results when a DVD-R disc was written on an apparatus with NA 0.65 and read on an apparatus with NA 0.60.
FIG. 5 shows an example of a technique for ensuring read compatibility.
Figure 6A:
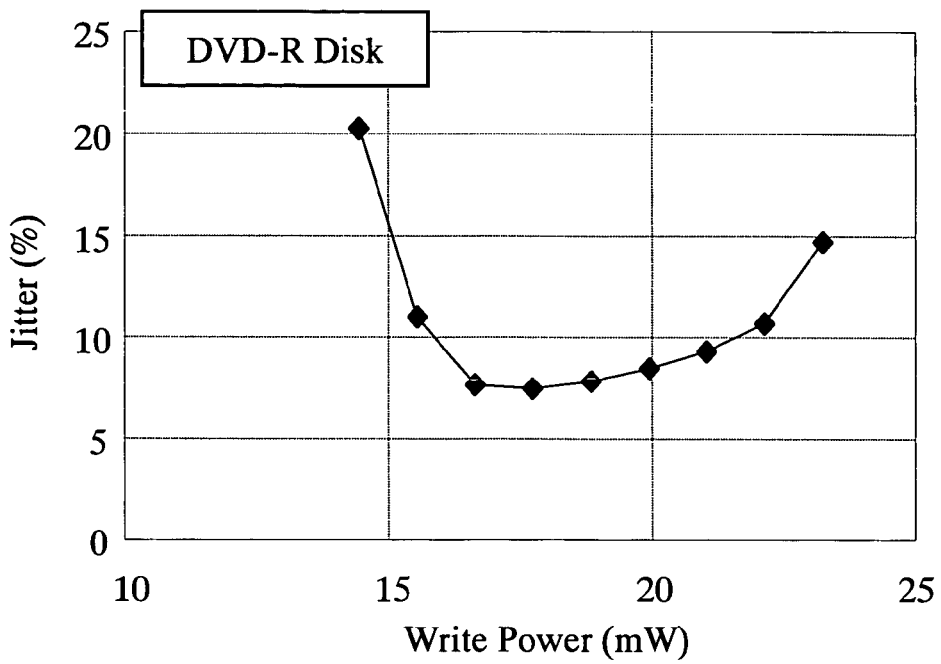
FIGS. 6(a)-6(b) show the results of measuring the power margin of a DVD-R disc.
Figure 6B:
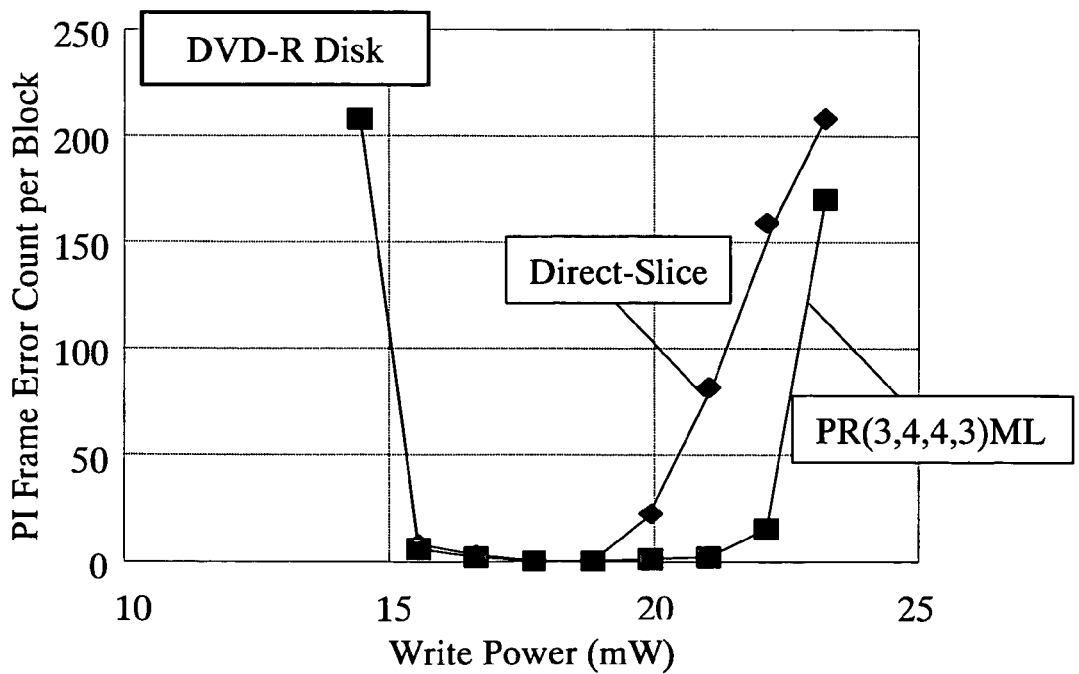

The binarized data sequence 51 and the edge shift amount 53 outputted from the read signal processing circuit 40 are thus stored in the external memory 200 on a clockby-clock basis in chronological order. CPU 140 then reads the binarized data sequence 51 and the edge shift amount 53 from the external memory 140 and processes them in order to evaluate the read signal quality, as mentioned above. Since v is also stored simultaneously with the edge shift amount 53, it is possible to calculate the jitter amount for individual patterns depending on the mark lengths and the preceding and following space lengths, and a mean shift amount. Thus, individual factors can be processed in parallel and optimized for individual write strategies for DVDs with different write pulse shape conditions depending on the mark lengths and the preceding and following space lengths. As a result, the processing time can be reduced. At the same time, the CPU 140 can give instructions to the recording data processing unit, not shown, and evaluate the quality of corresponding read signals while changing the write pulse shape and power conditions. In this way, the CPU 140 can determine the appropriate write pulse shape and power conditions based on the result of the evaluation. In the present configuration, the read signal processing circuit 40 and CPU 140 are indispensable for the drive unit. With regard to the external memory 200, the DRAM used in the work area for the ECC decoding process can be shared, such that the amount of additional circuits can be minimized. Regarding the evaluation of the read signal quality, since the apparatus is not provided with dedicated hardware for jitter evaluation, such as disclosed in WO01101 1614, the jitter cannot be simultaneously measured upon reading. However, as compared with the method shown in FIG. 5, the write condition can be optimized in a sufficiently short time.

Now, in order to facilitate a better understanding of the invention, a method of calculating the jitter value from the edge shift amount 53 stored in the external memory 140 is described. The edge shift amount is stored for each edge for which a phase comparison has been made. There are a total of a number N of edges, and each edges shift amount is represented by ES[n], n=0, 1, 2, ..., N−1. When a mean shift amount is represented by $ES_{ave}$, and a jitter value by $\sigma_{tot}$ as evaluation values, they can be determined by the following equations:

$$ES_{ave} = \frac{1}{N} \sum_{n=0}^{N-1} ES[n] \quad \text{(Eq. 1)}$$

$$\sigma_{tot} = \sqrt{\frac{\sum_{n=0}^{N-1}(ES[n] - ES_{ave})^2}{N-1}} \quad \text{(Eq. 2)}$$

Eq. 2 indicates the standard deviation of the sampling data. As the number of data N is usually larger than 1000, the following equation may be used:

$$\sigma_{tot} = \sqrt{\frac{\sum_{n=0}^{N-1}(ES[n] - ES_{ave})^2}{N}} \quad \text{(Eq. 3)}$$

Normally, when the write pulse shape is adjusted while maintaining the write power constant, the adjustment is carried out such that the mean shift amount of (Eq. 1) approaches zero. If the increase or decrease in the fluctuation of the mark edge due to the change in the write pulse shape is also to be taken into consideration, the adjustment may be made such that the jitter value $\sigma_{tot}^s$ that includes a shift represented by the following expression is minimized:

$$\sigma_{tot}^s = \sqrt{\frac{\sum_{n=0}^{N-1}(ES[n])^2}{N}} \quad \text{(Eq. 4)}$$

The write pulses used for DVDs and BDs are of the table type, or of the so-called adaptive write strategy, where the parameters are variable with reference to the mark and the preceding and following space lengths that are recorded. In order to accommodate this strategy, a signal quality evaluation index, such as the edge shift amount, may be extracted and evaluated for each table element corresponding to the write pulse. Specifically, when a preceding space length is represented as prev_sp, a mark length as mk, and a subsequent space length as post_sp, and when the shift amount and a jitter value of a leading edge of a mark are SFP and $\sigma_{SFP}$, respectively, and the shift amount, a jitter value, and fluctuation of the trailing edge of a mark are TSFP, TELP, and $\sigma_{ELP}$, respectively, the following equations are used in the case of DVD-RAMs:

$$T_{prev\_sp} = \text{prev\_sp} - 3 \quad (\text{prev\_sp} <= 6), \quad \text{(Eq. 5)}$$
$$= 3 \quad (\text{prev\_sp} > 6)$$

$$T_{mk} = mk - 3 \quad (mk <= 6), \quad \text{(Eq. 6)}$$
$$= 3 \quad (mk > 6)$$

$$T_{post\_sp} = \text{post\_sp} - 3 \quad (\text{post\_sp} <= 6), \quad \text{(Eq. 7)}$$
$$= 3 \quad (\text{post\_sp} > 6)$$

$$TSFP(T_{prev\_sp}, T_{mk}) = \quad \text{(Eq. 8)}$$
$$\frac{1}{N(\text{prev\_sp}, mk)} \sum_{n=0}^{N(\text{prev\_sp},mk)-1} ES[\text{prev\_sp}, \text{mark}, n]$$

$$\sigma_{SFP}(T_{prev\_sp}, T_{mk}) = \quad \text{(Eq. 9)}$$
$$\sqrt{\frac{\sum_{n=0}^{N(\text{prev\_sp},mk)-1}(ES[T_{prev\_sp}, T_{mk}, n] - SFP(T_{prev\_sp}, T_{mk}))^2}{N-1}}$$

$$\sigma_{SFP}^S(T_{prev\_sp}, T_{mk}) = \sqrt{\frac{\sum_{n=0}^{N(\text{prev\_sp},mk)-1}(ES[T_{prev\_sp}, T_{mk}, n])^2}{N}} \quad \text{(Eq. 10)}$$

$$TELP(T_{post\_sp}, T_{mk}) = \quad \text{(Eq. 11)}$$
$$\frac{1}{N(\text{post\_sp}, mk)} \sum_{n=0}^{N(\text{post\_sp},mk)-1} ES[\text{post\_sp}, \text{mark}, n]$$

$$\sigma_{ELP}(T_{post\_sp}, T_{mk}) = \quad \text{(Eq. 12)}$$
$$\sqrt{\frac{\sum_{n=0}^{N(\text{post\_sp},mk)-1}(ES[T_{post\_sp}, T_{mk}, n] - ELP(T_{post\_sp}, T_{mk}))^2}{N-1}}$$

$$\sigma_{ELP}^S(T_{post\_sp}, T_{mk}) = \sqrt{\frac{\sum_{n=0}^{N(\text{post\_sp},mk)-1}(ES[T_{post\_sp}, T_{mk}, n])^2}{N}} \quad \text{(Eq. 13)}$$

where Tsp and Tmk each represent the number of a particular table element, N(prev_sp, mk) and N(post_sp, mk) each the number of designated patterns included in read data, and $ES[T_{prev\_sp}, T_{mk}, n]$ and $ES[T_{post\_sp}, T_{mk}, n]$ each indicate the edge shift of a designated pattern with an element number n. In the case of DVD-RAMs, a write pulse parameter for controlling a leading edge is tabulated by a preceding space length and a particular mark length, and the parameter for a write pulse for controlling a trailing edge is tabulated by the length of the particular mark and the length of the subsequent space. In the case of DVD-Rs, the leading edge position of a leading pulse, which is the parameter for a write pulse for controlling a leading edge, is determined by the preceding space length and the mark length, as in the case of the DVD-RAMs, and the trailing edge position of the leading pulse, which is the parameter for the write pulse for controlling the trailing edge, is also determined by the preceding space length and the mark length. As is seen in this example, the structure of the adaptive table for the write strategy differs depending on the medium and format. If the calculation of the evaluation index for the read signal were to be implemented on the circuit, it would become necessary to implement many processing circuits for corresponding media, which would result in an increase in the size and power consumption of the circuit. Further, it would become difficult to accommodate a new write strategy if one is developed unless the read signal processing circuit LSI is recreated. In contrast, in accordance with the scheme of the invention, minimum necessary amounts of information are stored in an external memory and the evaluation of the read signal is carried out by software processes. This allows a new write strategy to be immediately accommodated by modifying the processing program with a minimum increase in the circuit size and without having to recreate the LSI, which is a significant effect provided by the invention.

When the individual parameters of the write pulse are actually optimized, the table elements of the corresponding write pulses are adjusted such that the edge shift amount of (Eq. 8) and (Eq. 11) each approaches zero. Further, when the adjustment is to be made with the jitter included, the table elements of the corresponding write pulses may be adjusted such that (Eq. 10) and (Eq. 13) are minimized. The following description of the embodiments is based on the former method. The latter method will not be described herein as a conversion into it is simple and lest it should bring in any confusion in the understanding of the invention.

Figure 12:
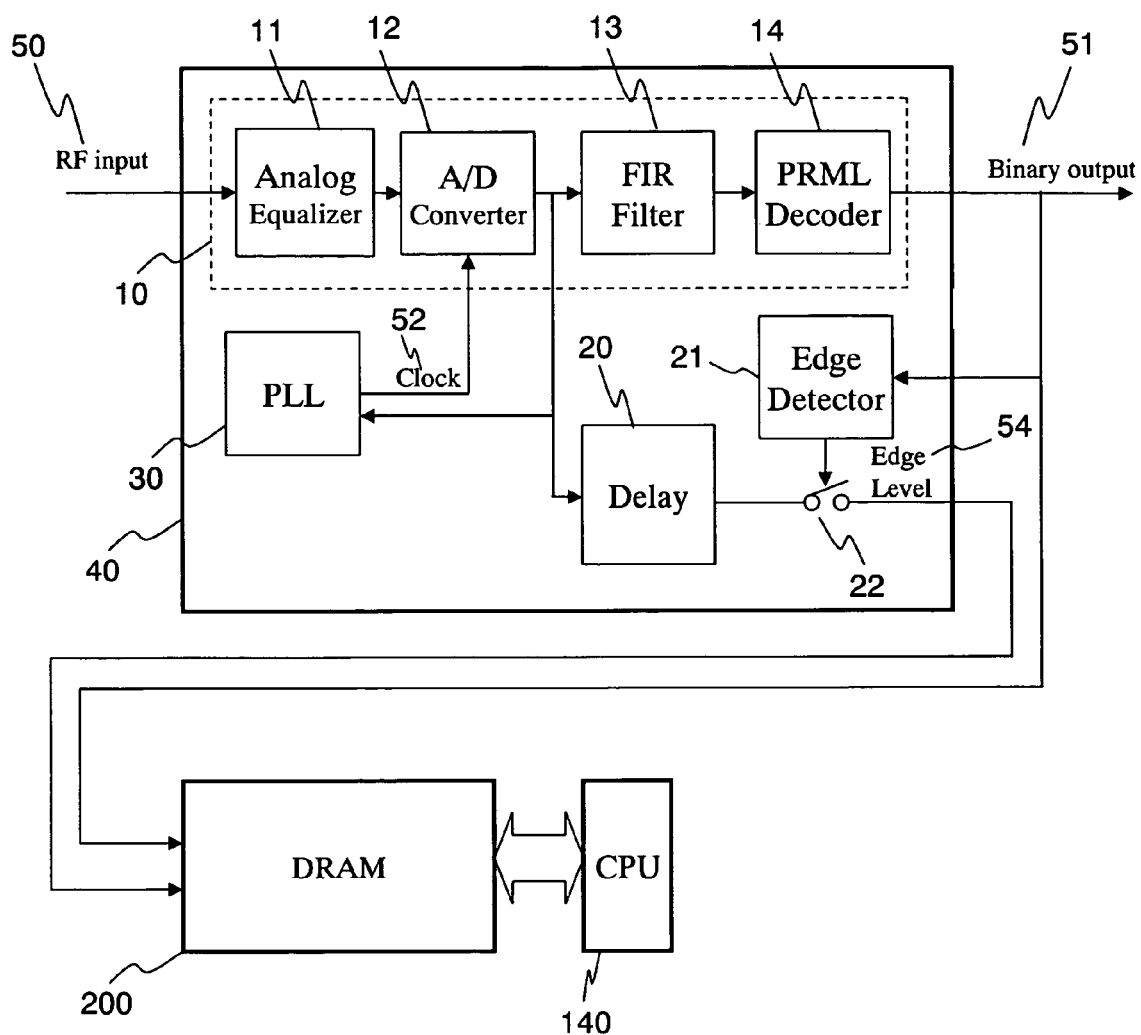
FIG. 12 shows an embodiment illustrating a circuit configuration suitable for the recording method and optical disc apparatus of the present invention.

FIG. 12 shows another embodiment illustrating the structure of a circuit suitable for the write method and optical disc apparatus of the invention. The circuit also generally consists of the read signal processing circuit 40, the external memory 200, and the CPU 140, as in the previously described embodiment. The present embodiment is characterized in that the level of an edge is stored instead of the edge shift. In the optical discs currently in widespread use, an information allocating code is used in an edge portion of the disc. For this reason, optimizing the write pulse shape and power such that the shift at the edge portion becomes zero is equivalent to bringing the level of the edge portion close to an identification level (which is normally zero). With regard to the structure of the phase comparator in the PLL, it is more effective in enhancing the PLL stability to employ a technique whereby the phase error calculation conditions are changed depending on the pattern of temporal change in the read signal, rather than directly detecting the phase error of the clock at two or three sampling points across an edge, as described in JP Patent Publication (Kokai) No. 2003-6864 A. Thus, depending on the difference in the structure of the phase comparator in the PLL, the amount of detected phase error varies in strict terms. When the read compatibility among drive units is to be emphasized, a uniform phase error detection technique is preferably employed. Thus, in the present embodiment, the edge detector 21 detects an edge, at which a switching between a "1" and a "0" occurs, from the binarized data sequence 51 and then controls the switch 22 such that only edge portions are extracted from the digital data sequence and stored in the external memory 200 as edge levels 54. The other operations are the same as described above.

Figure 13:
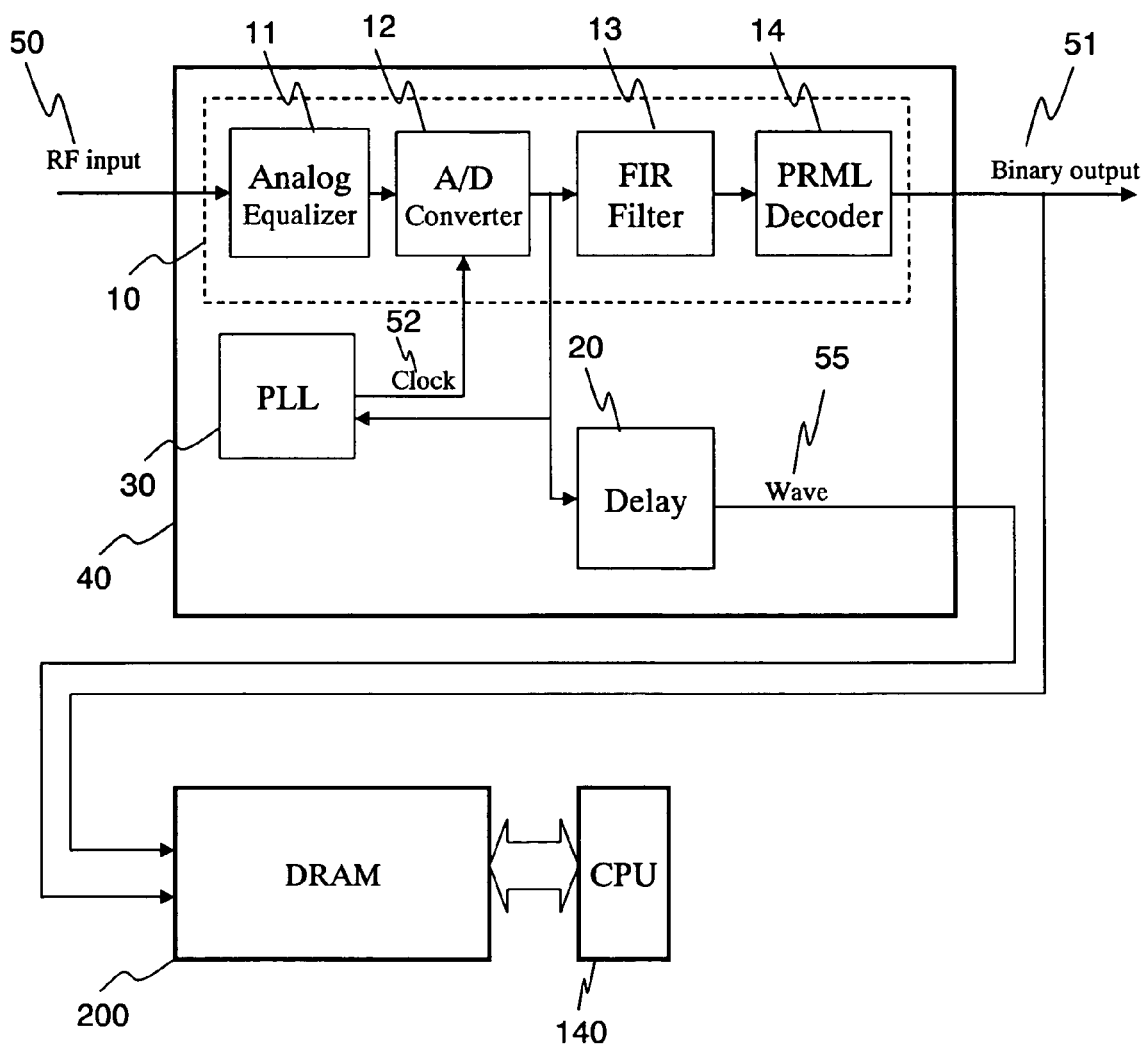
FIG. 13 shows an embodiment illustrating a circuit configuration suitable for the recording method and optical disc apparatus of the present invention.

FIG. 13 shows another embodiment illustrating a circuit suitable for the write method and optical disc apparatus of the invention. The overall construction is the same, namely, the circuit generally consists of the read signal processing circuit 40, the external memory 200, and the CPU 140. The present embodiment is characterized in that the digital data sequence per se is stored in the external memory 200 in the form of a waveform 55. By thus storing the read waveform itself, it becomes possible to calculate asymmetry, for example. It also becomes possible to evaluate the shape of the read signal of a long mark, as will be described below. For calculating the edge shift, there are the following two methods:

(1) Calculate the edge shift amount at the identification level by linear interpolation from data at two or three points including the edge.

(2) Interpolate the edge point using a polynomial, such as a spline function or the like, and calculate the edge shift amount at the identification level by the Newton-Raphson method or the like.

Method (1) is simpler and requires less volume of computation. Method (2) is capable of providing more accurate information but also requires more computation. As compared with the foregoing two embodiments, the present embodiment requires the step of calculating the edge shift from the waveform 55, resulting in an increase in the contents of processing by the CPU 140.

FIG. 19 schematically shows a method of detecting an edge shift, which corresponds to Method (1). In the figure, the edge identification point is taken at zero. In PRML, there are the case where the edge position is sampled by selecting the bit number of the class (constraint length) and the tap number of the FIR filter (Case 1 in the figure), and the case where the edge position is sampled with a half-clock displacement (Case 2 in the figure). In the following, the edge detection condition and the error pulse generation condition for each case are summarized, where an "i-th" sampled read signal is designated as y[i] and the edge identification point is taken at zero.

(Case 1) Where the edge point is a sampling point.
   Edge detection condition: y[i−1]×y[i+1]<0
   Edge slope: m=(y[i−1]−y[i+1])/2
   Edge point level: ye=y[i]
   Edge shift amount: ES=−ye/m (Case 2) Where the edge point is between two sampling points.
   Edge detection condition: y[i]×y[i+1]<0
   Edge slope: m=y[i+1]−y[i]
   Edge point level: ye=(y[i]+y[i+1])/2
   Edge shift amount: ES=−ye/m In Case 2, since the edge level is not sampled directly, the edge level is handled as a mean value of levels at two sampling points. Using these techniques, it becomes possible to basically measure the edge shift.

Whether the clock point is synchronized with an edge of a signal is basically determined by the target signal level of the PRML. The description of the relationship between the target signal level of PRML and the class bit number is omitted herein.

Figure 14:
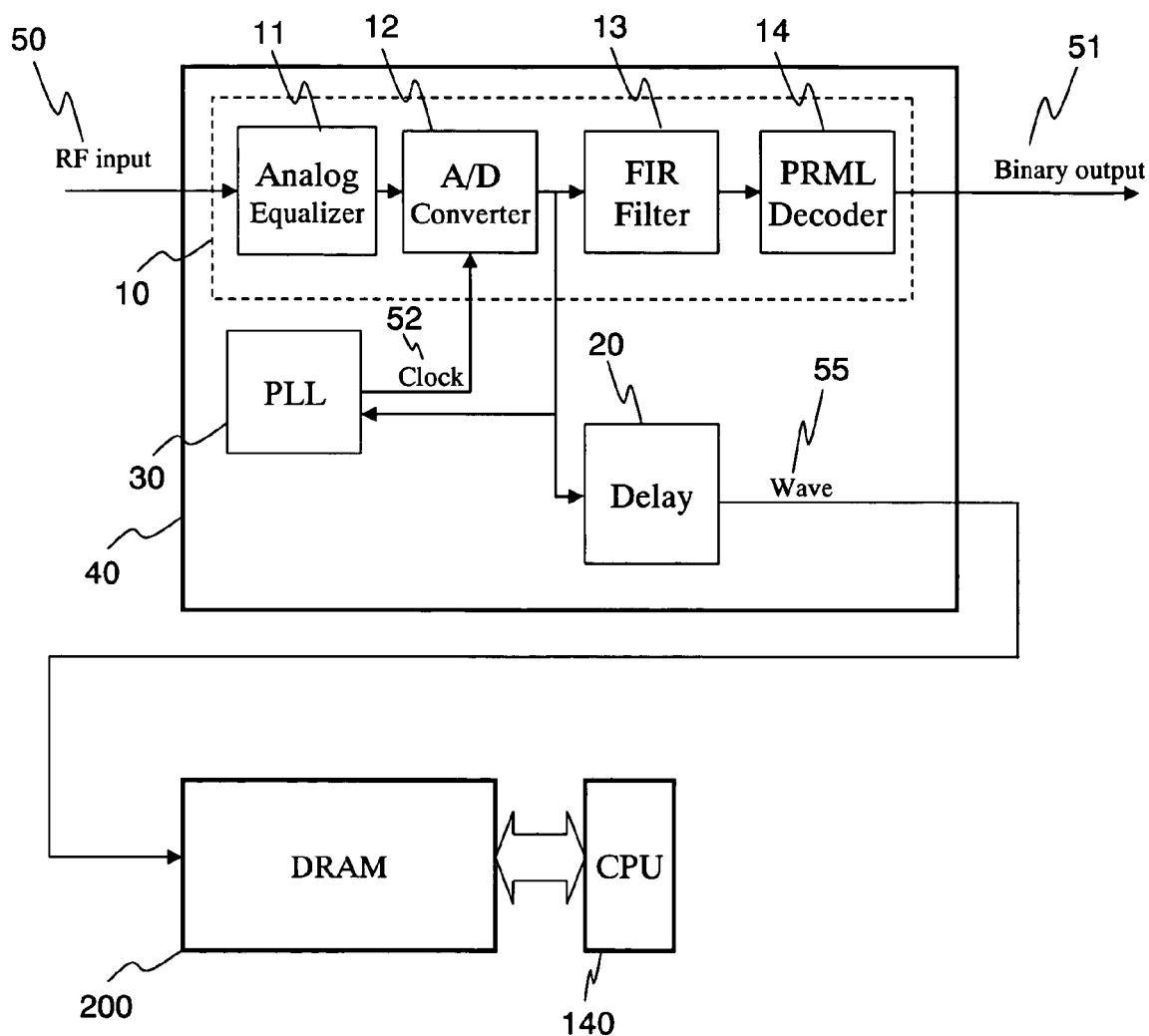
FIG. 14 shows an embodiment illustrating a circuit configuration suitable for the recording method and optical disc apparatus of the present invention.

FIG. 14 shows another embodiment illustrating the structure of a circuit suitable for the write method and optical disc apparatus of the invention. The overall structure is the same, consisting basically of the read signal processing circuit 40, the external memory 200, and the CPU 140. The present embodiment is characterized in that, based on the configuration shown in FIG. 13, the binarized data sequence 51 is omitted from the data stored in the external memory so as to save the memory capacity. In this case, CPU 140 is required to emulate the operation of the PRML decoder 14 and calculate the binarized result by computation.

In the embodiments shown in FIGS. 15 to 18, a host PC 180 is connected via an interface 170 to the embodiments of FIGS. 11 to 14, respectively. Because CPU 140 within the drive is provided to control the operation of the optical disc drive unit, its computation capability is not so high. Further, since the drive unit does not include an auxiliary storage, such as a hard disc, it is difficult to keep the measured data in storage for a long time. Originally, the optical disc drive unit is an external memory unit for the computer, so that the unit is inherently capable of being connected to the host PC 180 via the interface 170. Thus, the host PC 180 is used for enhancing computation capability and storing measurement data. Because modern personal computers have sufficiently fast computation speed and mount large-capacity hard discs, they can easily perform tasks such as the calculation of the edge position or the emulation of a PRML decoder. By further sharing data among a plurality of host computers via a network, an added advantage can be obtained that data about variations among drive units can be easily processed.

In the foregoing embodiments, the output of the A/D converter 12 has been used directly as the digital data sequence. However, it is also possible to use the output of the FIR filter 13 as the digital data sequence. In this case, higher-order equalization that cannot be processed by the analog equalizer 11 can be performed. Furthermore, since the FIR filter 13 can function as a phase controller in case there was a DC-like phase displacement in the PLL 30, more accurate signal quality evaluation can be made. This arrangement is obviously included in the scope of the invention, of which the essence lies in that the read signal data is stored in the external memory in chronological order.

Next, the configuration of analysis software for the read signal quality evaluation performed by the CPU is described in detail.

Figure 20:
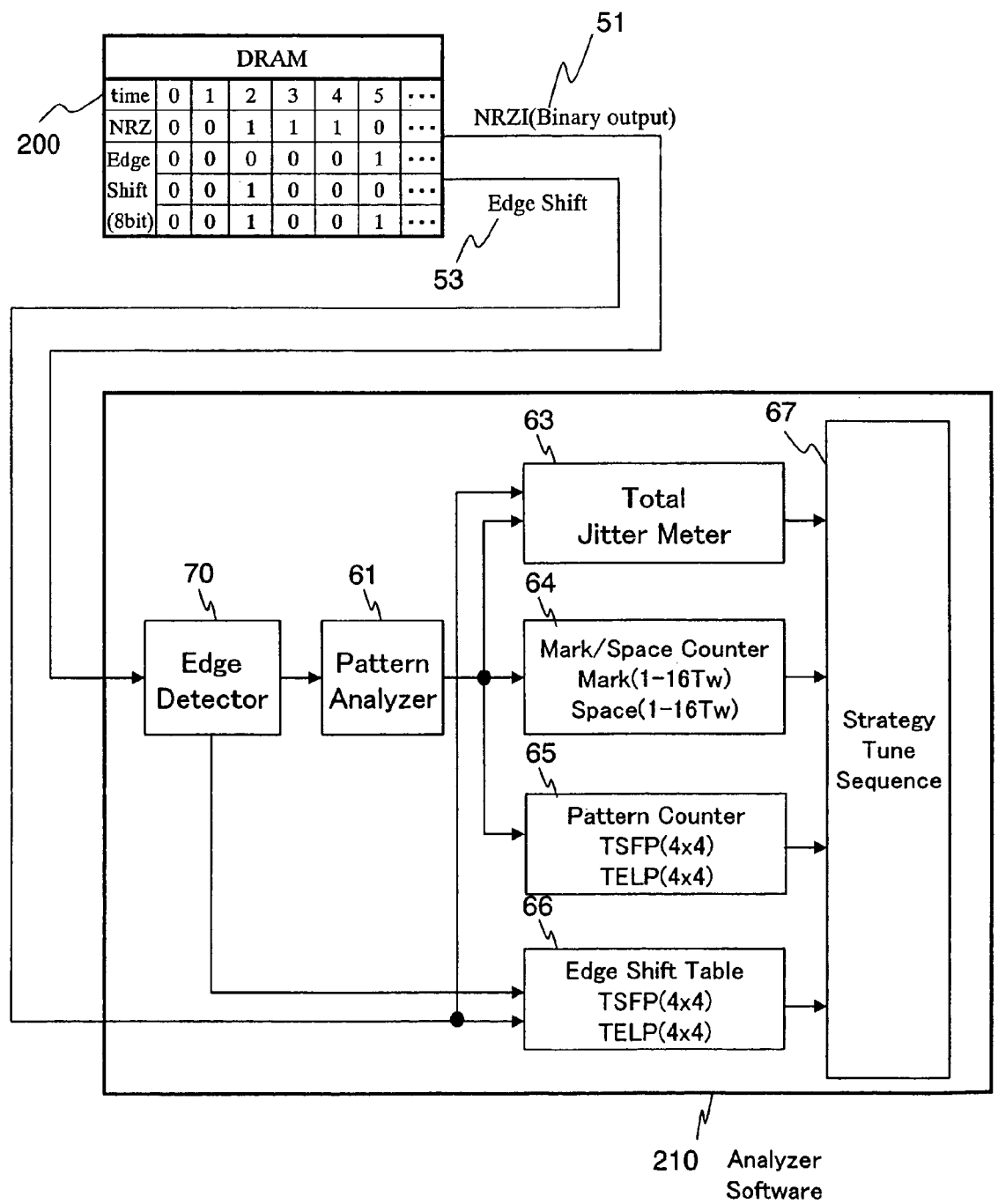
FIG. 20 shows a block diagram of the internal structure of analysis software for quality evaluation in accordance with the present invention.

FIG. 20 shows a block diagram illustrating the internal structure of analysis software for quality evaluation in accordance with the invention. The figure corresponds to the overall structure shown in FIGS. 11 and 15 and shows an example of the process performed by the CPU 140 or the host PC 180. The analysis software 210, which processes the data stored in the external memory, comprises an edge detector 70, a pattern analyzer 61, a total jitter meter 63, a mark-space counter 64, a pattern counter 65, an edge shift table 66, and a write strategy adjusting sequence unit 67. The edge detector 70 receives the binarized signal 51 as an input and detects a switching between a data "0" and "1." In the pattern analyzer 61, with regard to the leading and trailing edges of a mark in the read signal, a data pattern is determined for each of the preceding space length, the mark length, and the subsequent space length. The result is measured for each pattern in the pattern counter 65. The total jitter meter 63 calculates a total jitter value $\sigma_{tot}$ in accordance with (Eq. 2). The mark-space counter 64 adds up marks and spaces according to their individual lengths and then counts them.

The edge shift table 66, based on the result of sorting by the pattern analyzer 61, calculates the edge shift amount TFSP and jitter $\sigma_{SFP}$ of the leading edge, and the edge shift amount TELP and jitter $\sigma_{ELP}$ of the leading edge for each pattern, in accordance with (Eq. 8), (Eq. 9), (Eq. 11), and (Eq. 12), respectively. Alternatively, instead of TSFP and TELP, the jitter value $\sigma_{SFP}^S$ and $\sigma_{ELP}^S$ that include the fluctuation of the edge may be calculated in accordance with (Eq. 10) and (Eq. 13), respectively, as described above. In the write strategy adjusting sequence unit 67, a sequence process is performed whereby the write pulse shape and power are optimized in light of the individual parameters. Basically, in order to optimize the write pulse shape and power, a specific pattern (referred to as a recording instruction data sequence, which may be a random pattern) is recorded in the disc while the write pulse shape and power conditions are varied. The specific pattern is then read and conditions such that each edge shift amount is minimized are sought. The write strategy adjusting sequence unit will be described in detail later.

While not shown in the drawing, the recording with the write pulse shape and power changed is preferably carried out on the sector unit or ECC block unit basis in accordance with the format of the individual media, as this would allow the conventional recording/reading process to be utilized for the timing control of the drive unit. It goes without saying that the aforementioned process is carried out on the recording unit basis. In order to realize this easily, a method is preferably adopted such that the data stored in the external memory 200 is divided into regions for the individual recording units.

When optimizing the shape or power of the write pulse, a protection mechanism is required for ensuring their optimization. Examples of the causes that lead to abnormal operations in which the shape or power of the write pulse cannot be appropriately determined include: defects on the medium; abnormality in the locked state of the PLL clock; and a displacement between a mark length to be recorded and a mark length that is actually recorded. The last example is the case where, when the write pulse is significantly modified, the pulse width increases too much and a 4T mark is recorded instead of a 3T mark that has been intended, for example. This may occur frequently in some optimization sequences. In order to prevent such abnormal operations, the value in the mark-space counter 64 and that in the pattern counter 65 may be monitored and compared with values included in a recording instruction data sequence that is known in advance, so as to detect an abnormal state. Only by adopting such a protection mechanism can the optimization of the write pulse shape and power be ensured.

Figure 16:
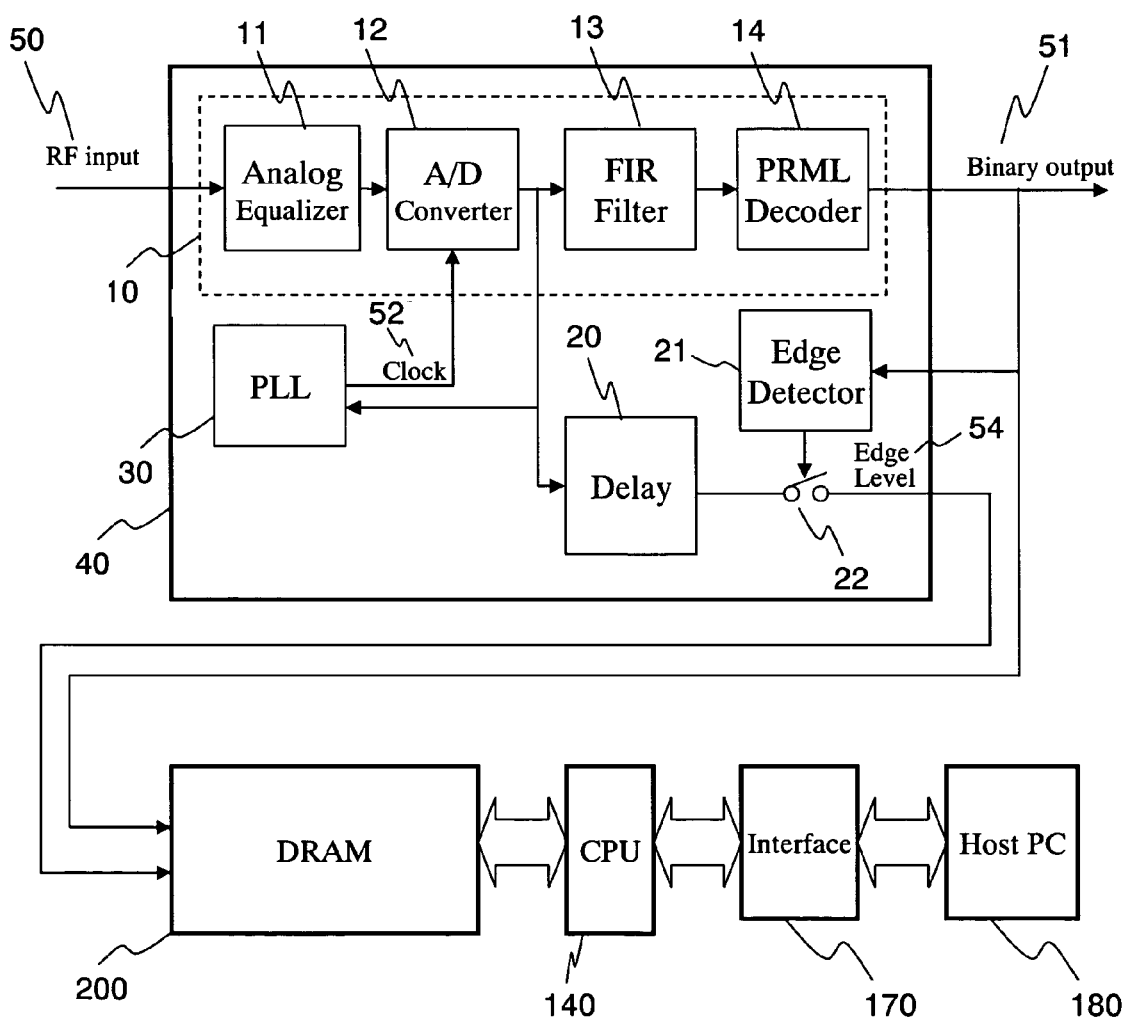
FIG. 16 shows an embodiment illustrating a circuit configuration suitable for the recording method and optical disc apparatus of the present invention.
Figure 17:
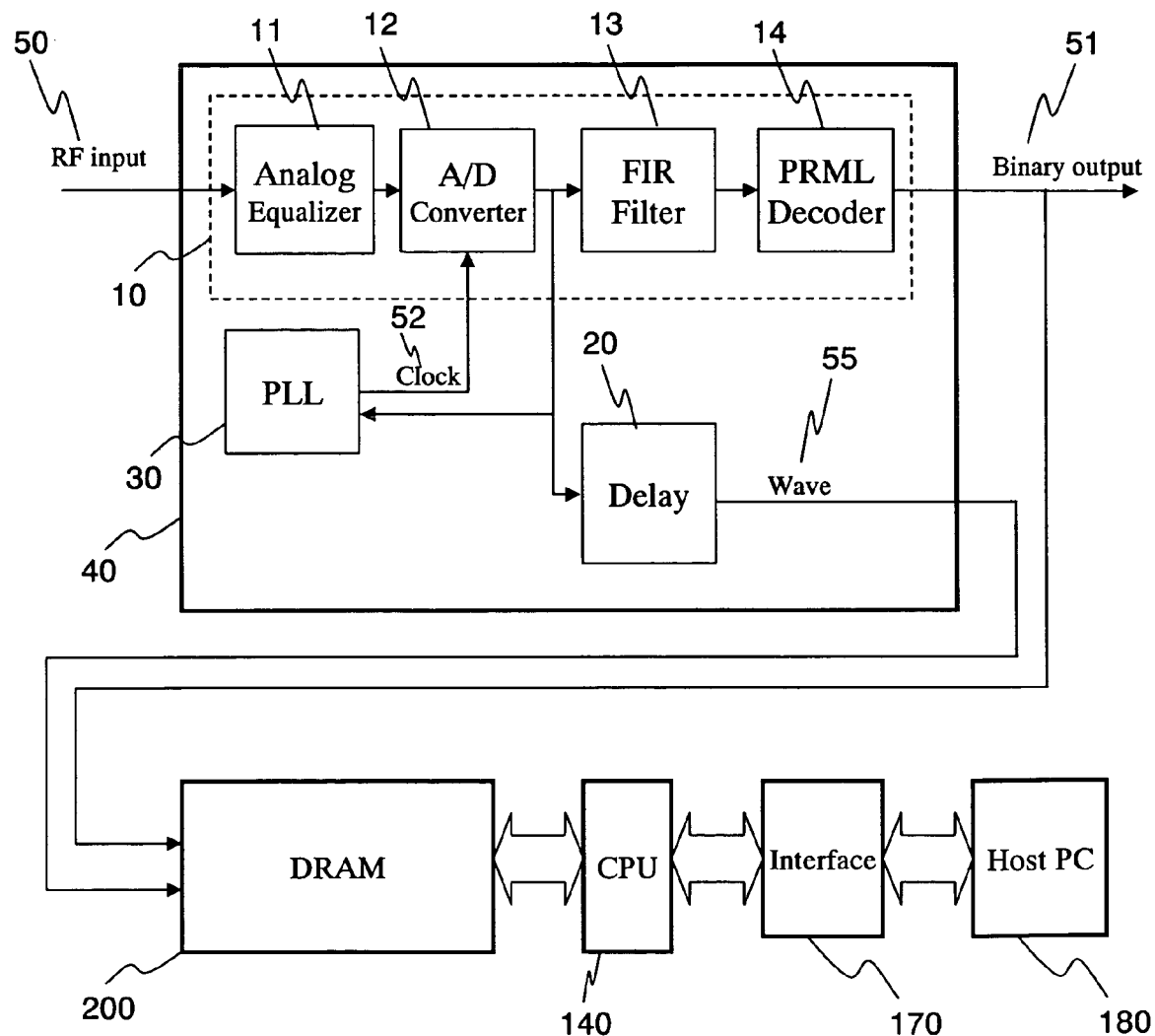
FIG. 17 shows an embodiment illustrating a circuit configuration suitable for the recording method and optical disc apparatus of the present invention.
Figure 18:
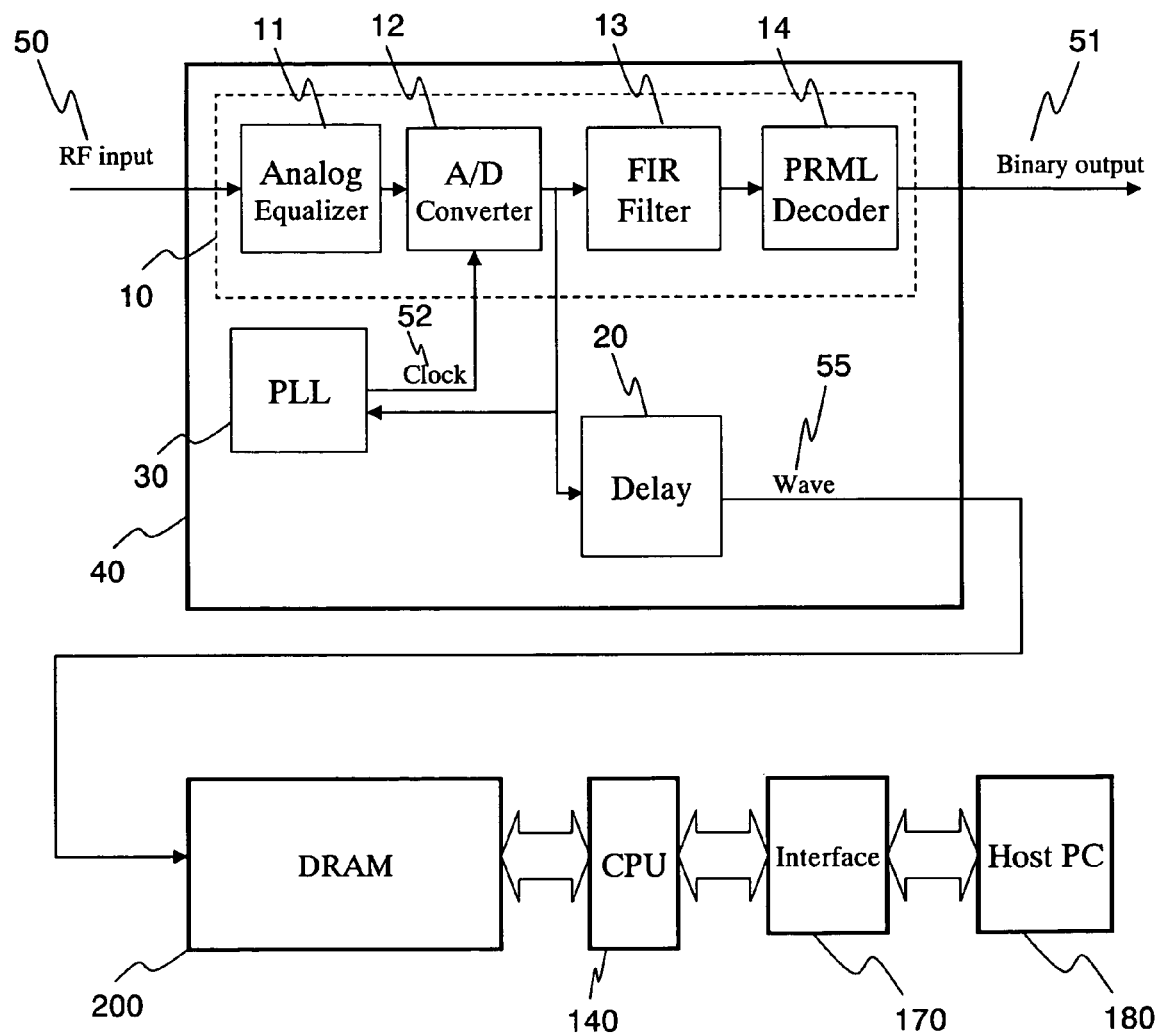
FIG. 18 shows an embodiment illustrating a circuit configuration suitable for the recording method and optical disc apparatus of the present invention.
Figure 21:
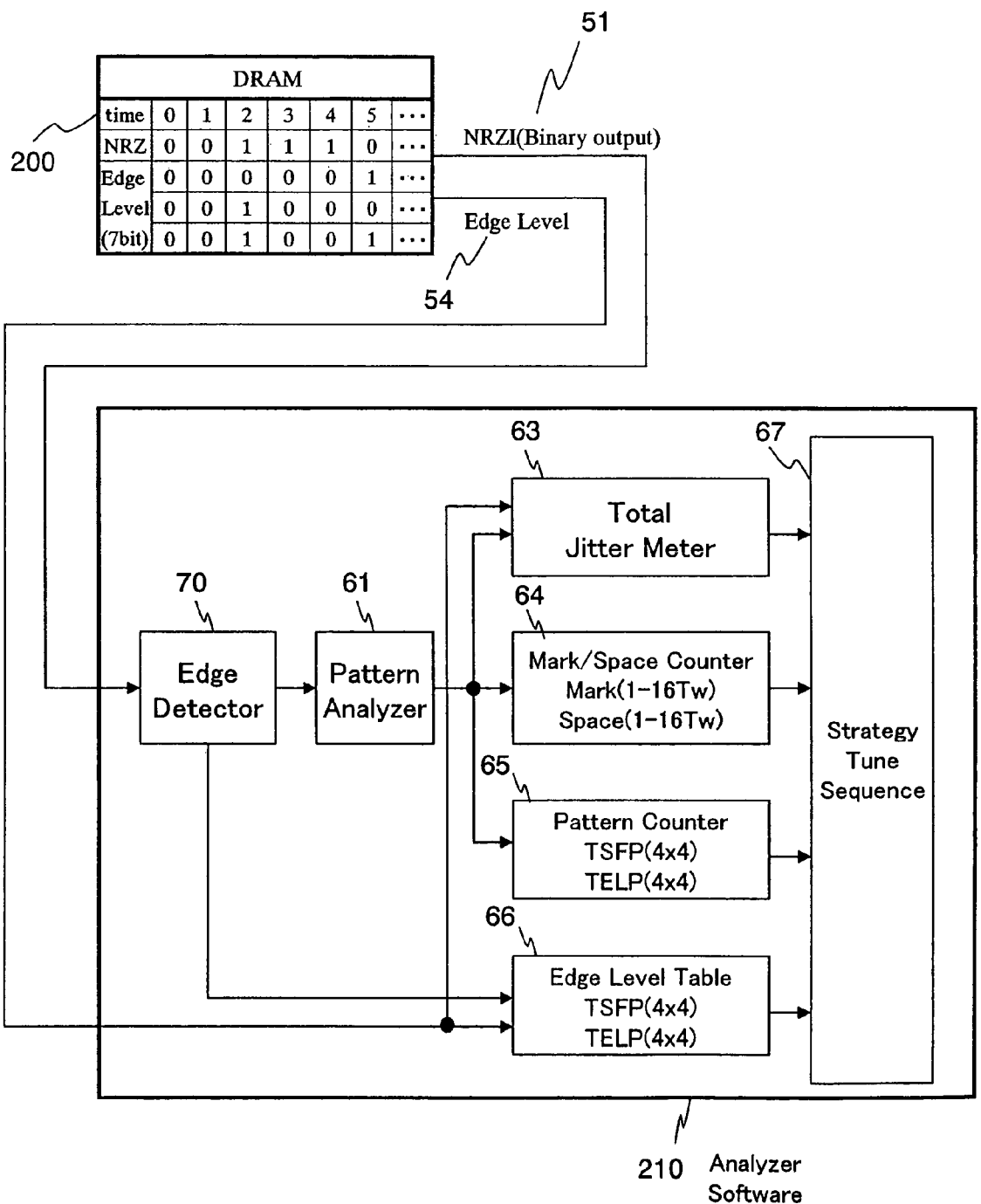
FIG. 21 shows a block diagram of the internal structure of analysis software for quality evaluation in accordance with the present invention.

FIG. 21 shows another block diagram of the internal structure of analysis software for quality evaluation in accordance with the invention. The structure, which corresponds to the overall structure shown in FIGS. 12 and 16, is such that an edge level 54 is used for the evaluation of signal quality, instead of edge shift. There is no structural difference from the embodiments in which edge shift is employed; it is just that an edge level is used for edge shift. The same mathematical formulae are also used. Thus, the total jitter meter 63 calculates the standard deviation of the entire edge levels as an edge level jitter. In the edge level table 66, a mean value of edge levels corresponding to each pattern is calculated. In order to optimize the write pulse shape and power, a specific pattern (which may be a random pattern) is recorded on the disc while changing the write pulse shape and write power conditions. The specific pattern is then read and a condition is determined such that the mean value of individual edge levels assumes an identification level (normally zero). A corresponding write strategy adjusting sequence will be described later.

Figure 22:
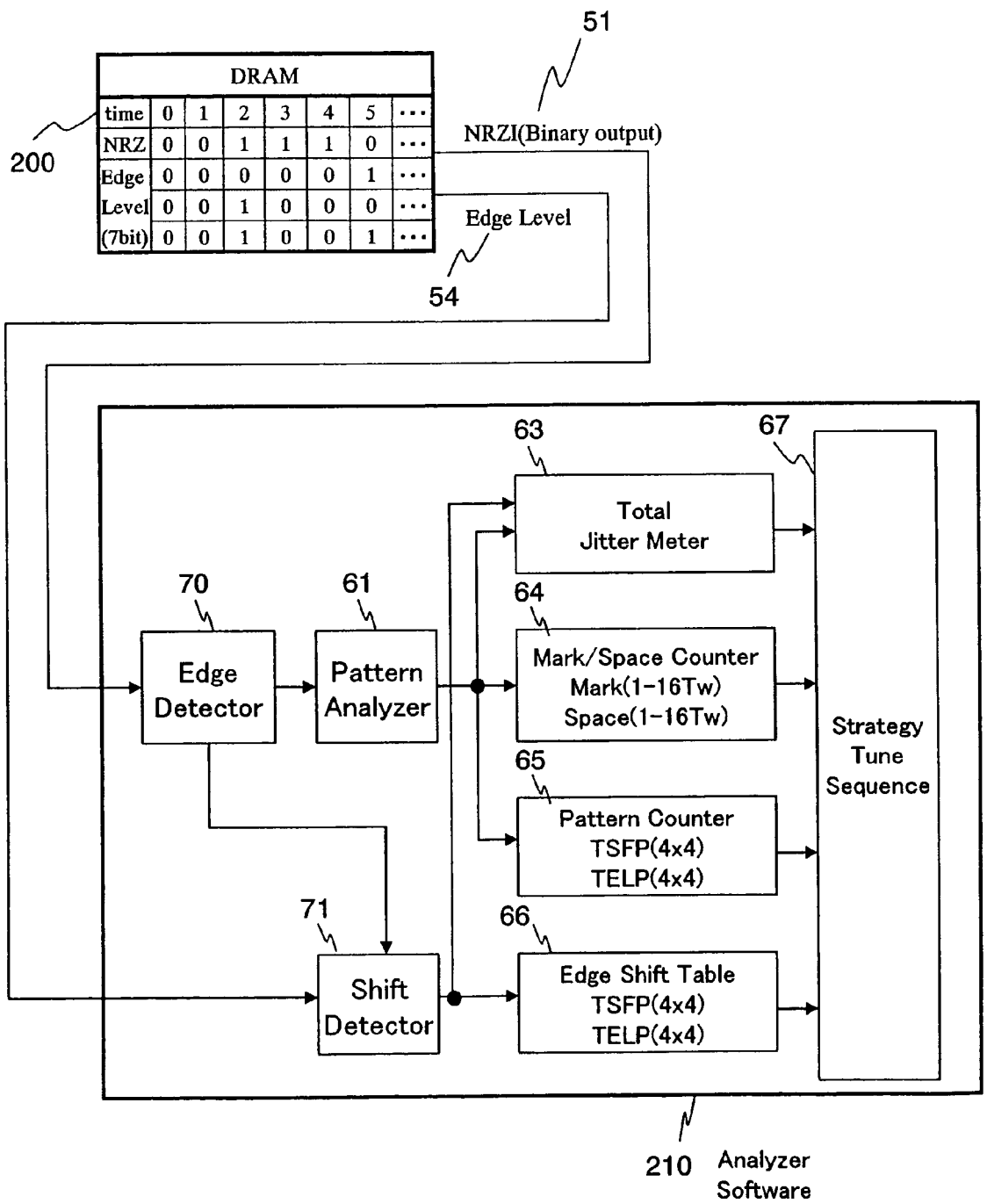
FIG. 22 shows a block diagram of the internal structure of analysis software for quality evaluation in accordance with the present invention.

FIG. 22 shows another block diagram of the internal structure of analysis software for quality evaluation in accordance with the invention. The illustrated structure, which corresponds to the overall structure shown in FIGS. 12 and 16, employs en edge level 54 instead of edge shift for signal quality evaluation. The present example differs from the one shown in FIG. 21 in that it includes a shift detector 71. The shift detector 71 converts an edge level into an edge shift and it merely carries out a multiplication process concerning the coefficient of conversion (inverse of edge slope m) from an edge level into an edge shift. The conversion coefficient may be determined in advance from a standard read signal. In the present arrangement, the total jitter meter 63 and the edge shift table 66 can calculate a conventional jitter value and a mean edge shift amount.

Figure 23:
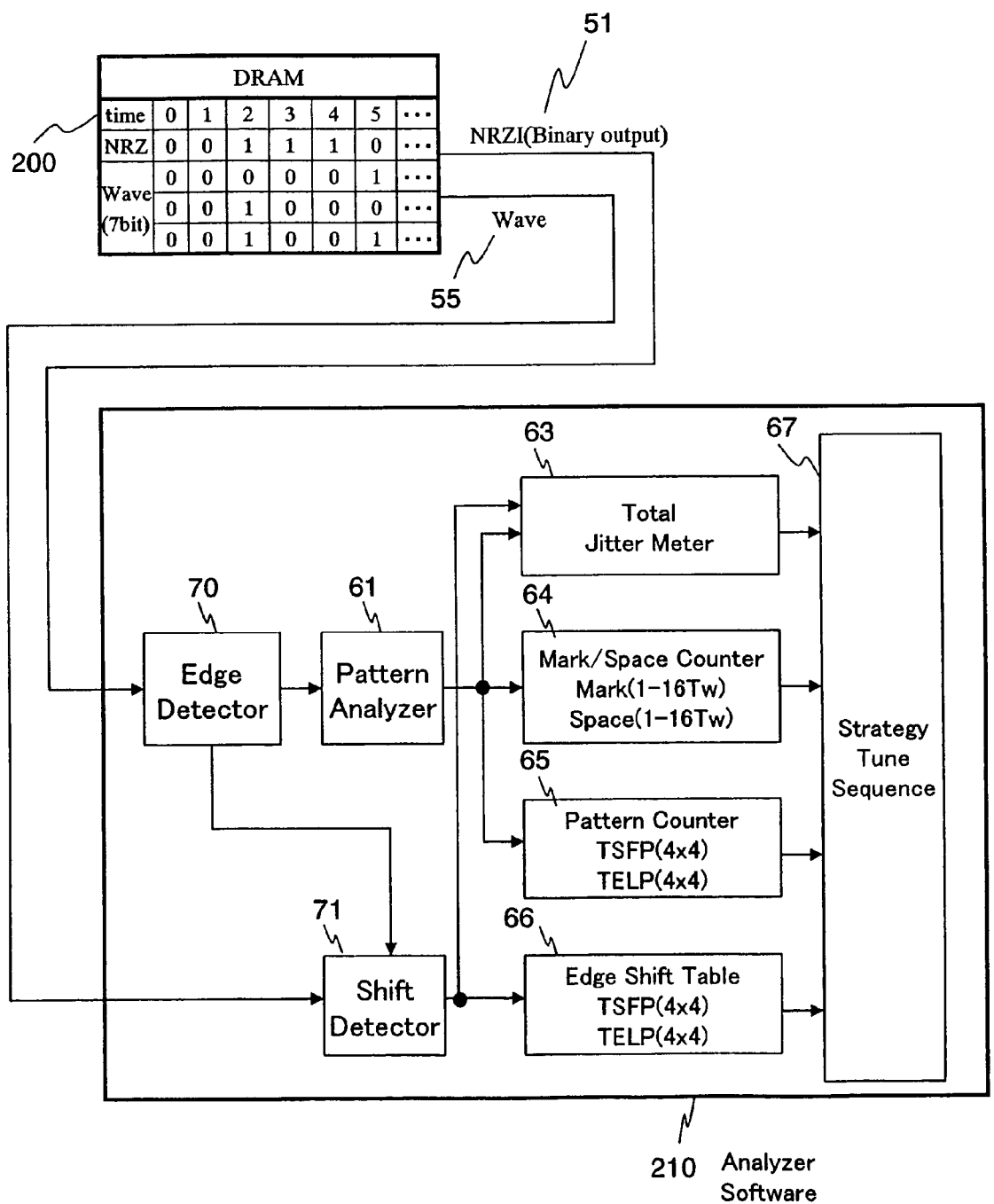
FIG. 23 shows a block diagram of the internal structure of analysis software for quality evaluation in accordance with the present invention.

FIG. 23 shows another block diagram of the internal structure of analysis software for quality evaluation according to the invention. The illustrated structure, which corresponds to the overall structure shown in FIGS. 13 and 17, directly employs a waveform 55 instead of edge shift for signal quality evaluation. The illustrated example differs from FIG. 20 in that there is provided a shift detector 71, which detects an edge in accordance with the operation as described with reference to FIG. 19 and then calculates the amount of edge shift. The present configuration makes it possible to measure the edge shift and jitter in accordance with a uniform definition regardless of the scheme of the PLL phase detector. Other operations are the same as those shown in FIG. 20.

Figure 24:
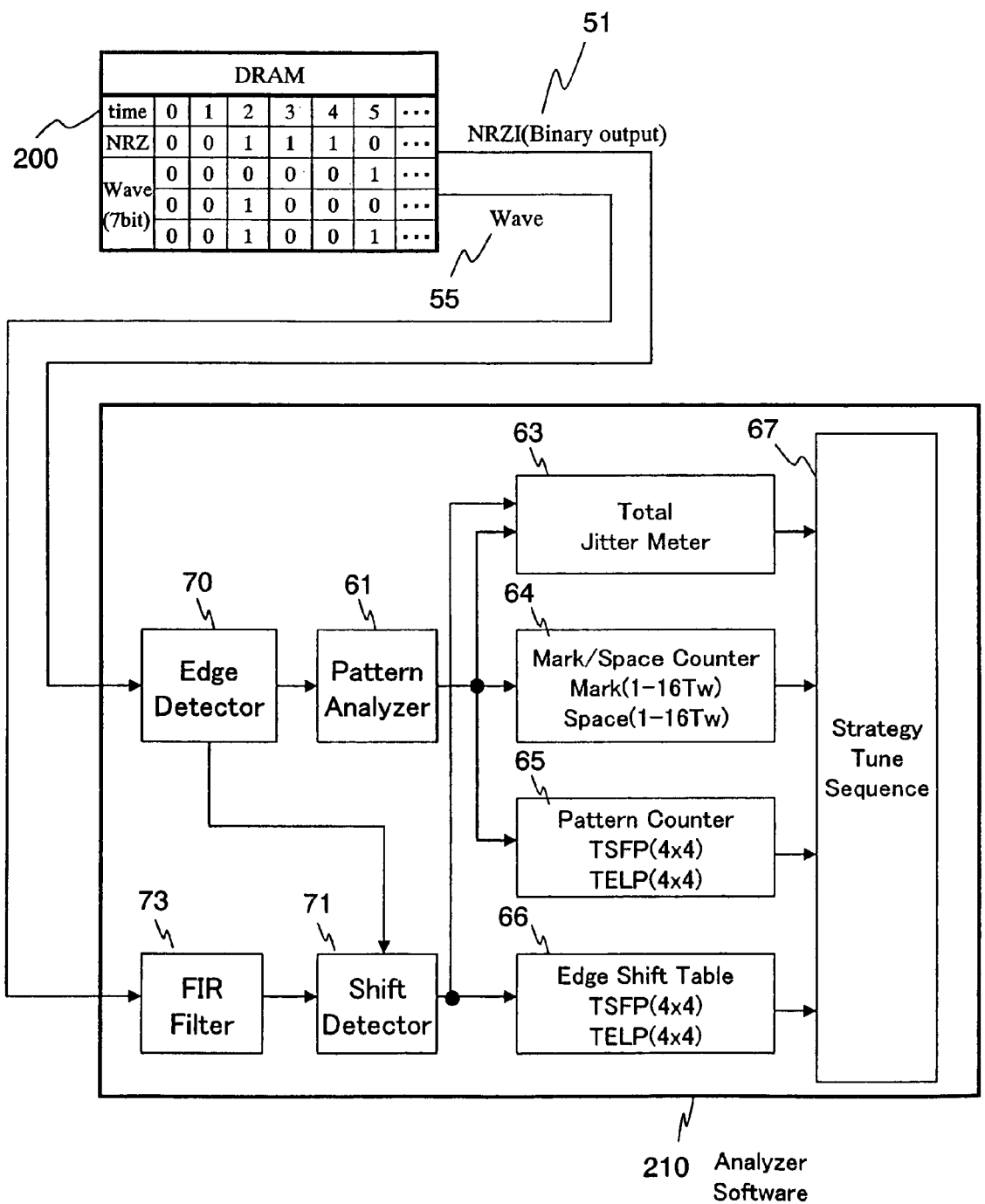
FIG. 24 shows a block diagram of the internal structure of analysis software for quality evaluation in accordance with the present invention.

FIG. 24 shows another block diagram illustrating the internal structure of analysis software for quality evaluation according to the invention. The structure, which corresponds to the overall configuration shown in FIGS. 13 and 17, evaluates the signal quality using the waveform 55 directly instead of the edge shift. The present configuration differs from that shown in FIG. 23 in that it includes an FIR filter 73 preceding the shift detector 71. The FIR filter 73 has two major purposes:

(1) Convert a read signal read by a head with a different NA into a signal read with the standard NA; and (2) Correct any distortion, such as group delay, in the read system.

In the foregoing examples, the boost amount of the equalizer has been calibrated in advance in order to achieve the first purpose. In the present example, in order to achieve higher accuracy, an FIR filter is adopted. By increasing the tap number of the FIR filter, the approximation accuracy can be further increased, which example will be described in detail later. The latter purpose is intended to optimize the write pulse shape and power for the CAV (constant angular velocity) recording. The conventional optical discs are in many cases recorded with a constant linear velocity by the CLV (constant linear velocity) scheme. If the recording velocity were to be continuously increased with the CLV scheme, the rotation speed of the disc internal portion would reach 10,000 rpm or beyond, for example, and there would come the point at which the mechanical strength of the disc medium per se reaches a limit and no further speed increases would be possible. Therefore, it is becoming more and more conventional to adopt the CAV scheme with the constant disc rotation velocity so that recording can be performed with faster speeds at the outer peripheral portion of the disc. In the CAV scheme, the linear velocity varies depending on the radial location of the disc, so the amount of thermal interference and the required write power also vary depending on the radius. Therefore, the write pulse shape and power must be appropriately selected accordingly.

Meanwhile, with regard to the I-V amplifier that is generally used for photoelectric conversion, since noise increases as the read band is raised, the drive unit is appropriately designed and particular characteristics of the I-V amplifier are selected. If it is only necessary to read optical discs, some group delay due to influences such as a lack of band would not be a problem as long as the drive unit has a sufficient reliability. However, when the read compatibility of disc media is to be primarily considered, it would not be acceptable to determine the write pulse shape and power for a reading system with a distortion at high speeds such that the edge shift becomes smaller. Thus, a read signal distortion correction technology is required in the drive unit that perform high-speed recording and reading whereby a write condition can be determined such that no compatibility problem would be produced even if there was some group delay. Distortion such as group delay cannot be corrected simply by adjusting the boost amount of the equalizer as described above. It can, however, be corrected by using an FIR filter with a sufficiently large number of taps. An example of the read signal distortion correction technology using the FIR filter will be described later with reference to experimental data concerning DVD-RAM recordings with 6× to 16× speeds.

Figure 25:
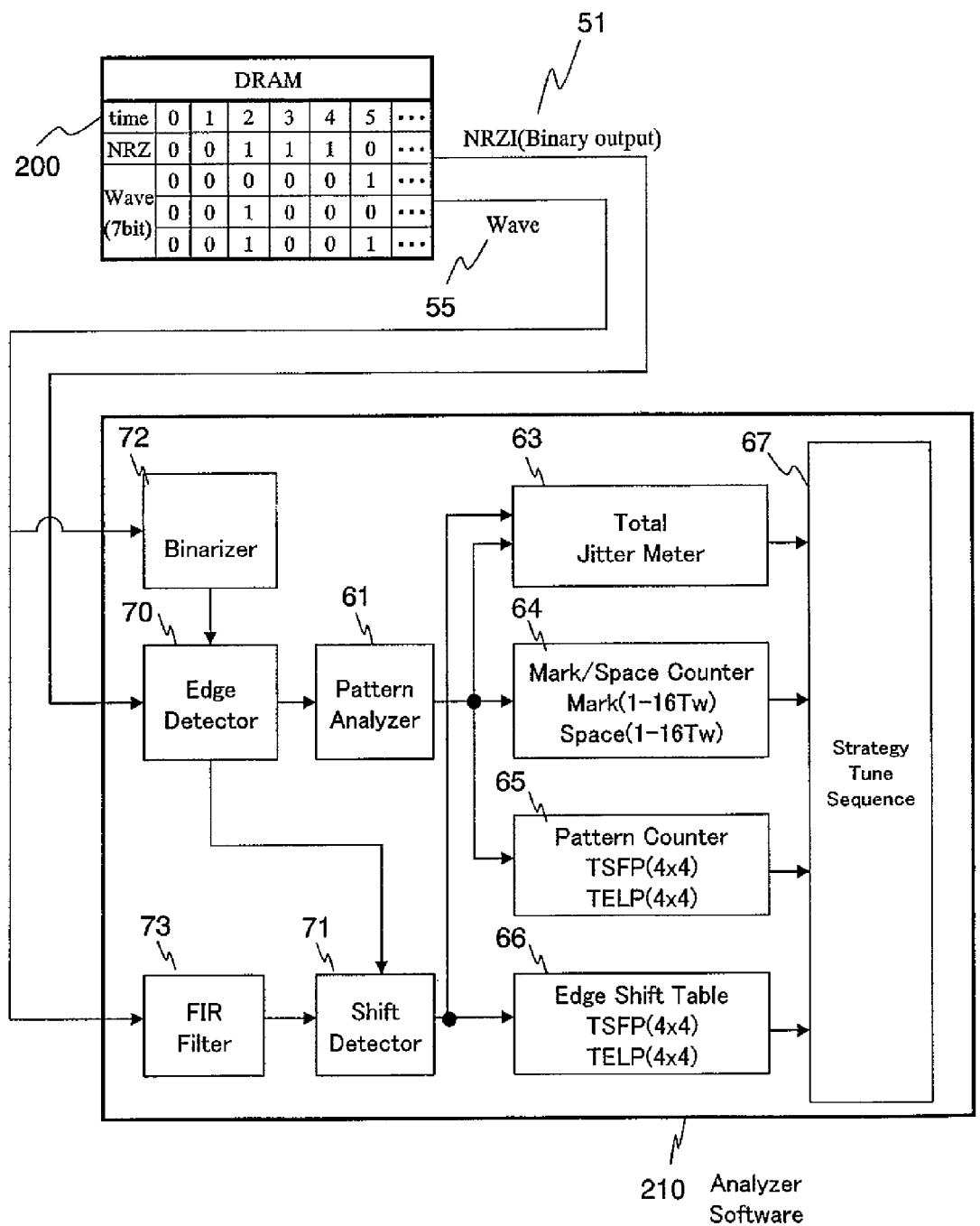
FIG. 25 shows a block diagram of the internal structure of analysis software for quality evaluation in accordance with the present invention.

FIG. 25 shows another block diagram of the internal structure of analysis software for quality evaluation according to the invention. The illustrated structure, which corresponds to the overall structure of FIGS. 13 and 17, employs the waveform 55 directly instead of edge shift for signal quality. The difference from FIG. 24 lies in that a binarizing unit 72 of the direct slice scheme is added. As in the example of DVD-R described with reference to FIG. 10, the write power margin greatly differs in some cases between the PRML scheme and the direct slice scheme. When the read compatibility of disc media is of the primary concern, it is necessary that quality recording can be realized even if the direct slice scheme is employed for reading. As mentioned above, a technique quantifies the difference in the binarized result between the direct slice and the PRML schemes by detecting the positional difference between the binarized result provided by PRML and the valid edge shift amount that is stored, taking advantage of the fact that the PLL phase detector is fundamentally of the direct slice scheme. This technique is employed when the edge shift amounts are stored in the external memory 200. However, when the PLL phase detector is highly sophisticated, as described in JP Patent Publication (Kokai) No. 2003-6864 A, the result of direct slice and the measured point of edge shift do not necessarily correspond in some cases. To cope with this problem, a binarizing unit 72 of the direct slice scheme is provided in the present embodiment. Binarization may be performed by the direct slice scheme as follows:

(1) Condition for binarizing to data "1": $y[i] \geq 0$ (2) Condition for binarizing to data "0": $y[i] < 0$ where $y[i]$ is the i-th sampled read signal, and the edge identifying point is zero.

Figure 26:
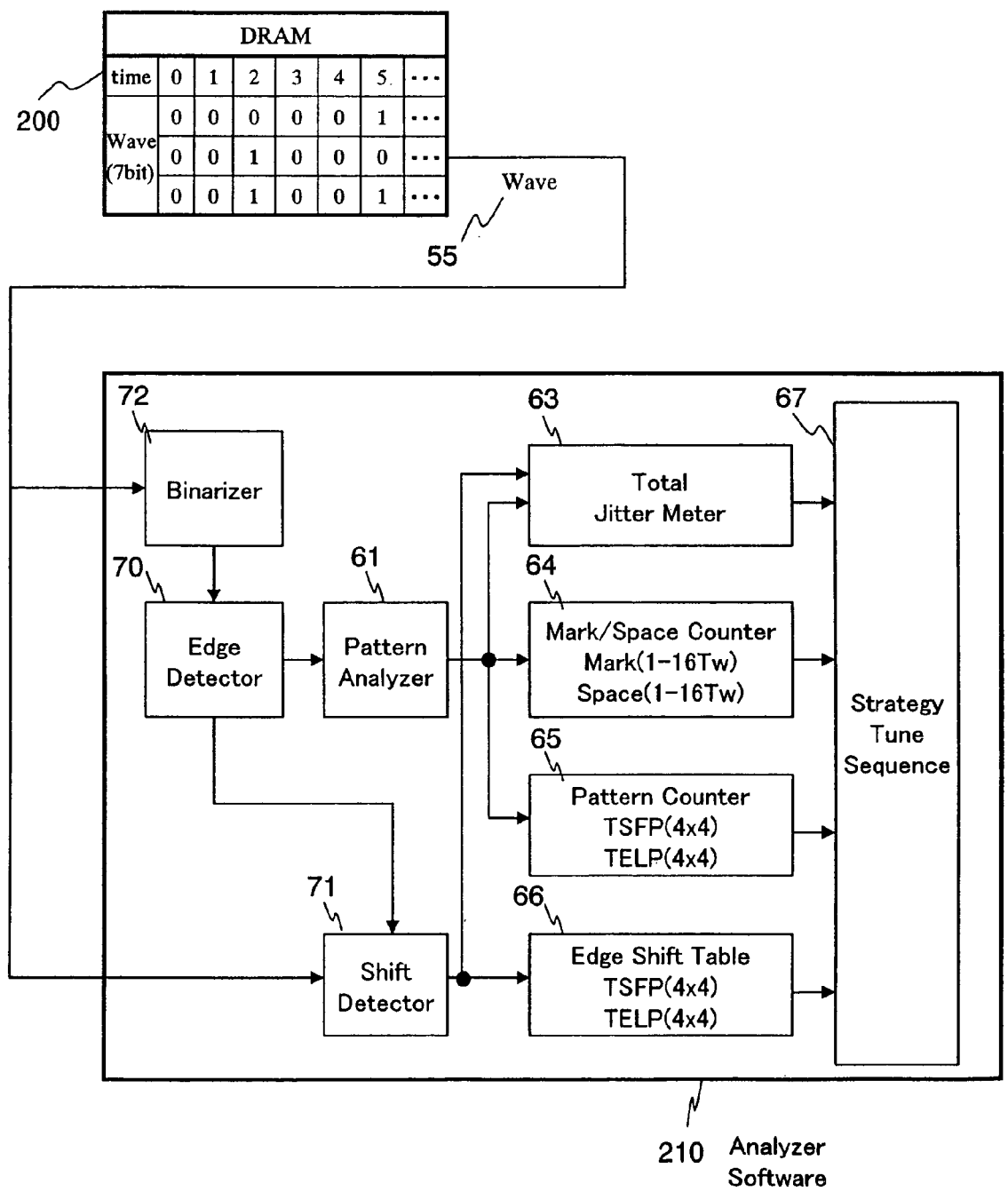
FIG. 26 shows a block diagram of the internal structure of analysis software for quality evaluation in accordance with the present invention.

FIG. 26 shows another block diagram of the internal structure of analysis software for quality evaluation in accordance with the invention. The illustrated example, which corresponds to the overall structure of FIGS. 14 and 18, performs signal quality evaluation by solely employing the waveform 55 stored in the external memory 200. The difference from FIG. 23 lies in that a binarizing unit 72 for producing a binarized data sequence from the waveform 55 is provided. When the direct slice scheme is employed for the binarizing unit 72, the same processes as described above are performed. On the other hand, when the PRML scheme is to be employed for the binarizing unit, it would be necessary to provide a PRML decoder emulator. Although the internal structure of the PRML decoder itself would not be described herein as it would go beyond the scope of the invention, the PRML decoder preferably is of the same structure as that of the PRML decoder implemented on the drive units.

Embodiment 2

The foregoing has been the description of the structure of the circuit for implementing the invention and the structure of the analysis program. In the following, a technique (write method) for optimizing the write pulse shape and power is described in specific terms.

As the initial values for the write pulse shape and power, parameters recommended by the manufacturer of disc media are generally used. Individual parameters of the write strategy recommended by the disc media manufacturers are recorded in the control data region that is not rewritable, in the wobble signal in which address information is recorded, or in a part of the land pre-pit information. In the following, the difference in write pulse shapes among three kinds of disc media, namely, DVD-RAM, DVD-R, and DVD-RW, will be initially discussed.

Figure 27:
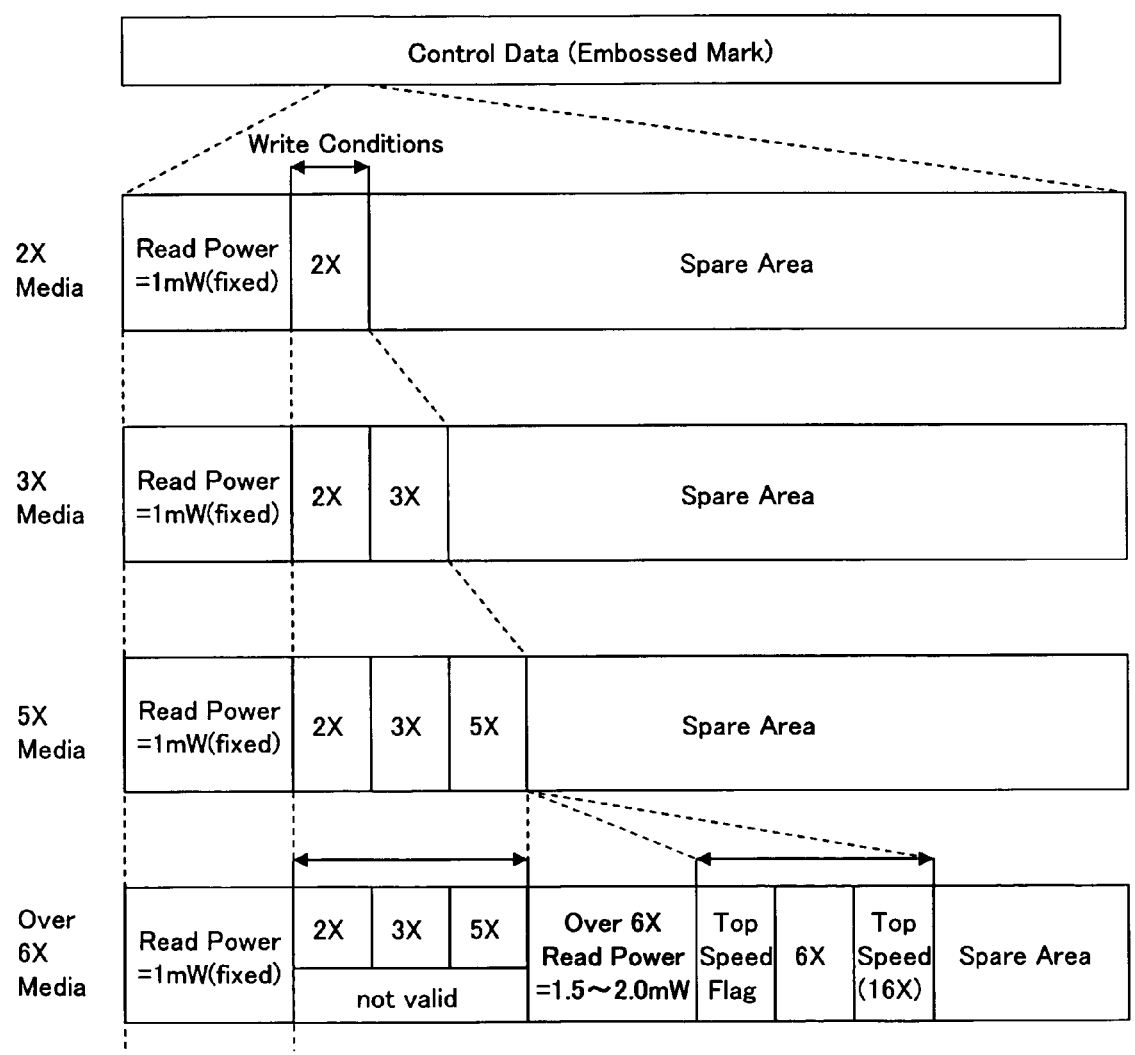
FIG. 27 shows the content of write strategy data written in the control data of a DVD-RAM.

FIG. 27 shows the contents of the write strategy data recorded in the control data section of the DVD-RAM. As shown, the 2×, 3×, and 5× DVD-RAM media that have already been standardized have maintained backward compatibility as far as recording goes. In the control data of the 5× DVD-RAM medium, there is added a region for storing the 3× and 5× write conditions in addition to the 2× write condition. Similar extensions are expected to be made in the 6× or faster DVD-RAM media that will be standardized in the future, where the pulse shape and power values for each recording speed, and their adjusting procedures, including the target asymmetry value, the ratio of recording threshold power and recommended power, and so on, are expected to be stored.

Figure 10A:
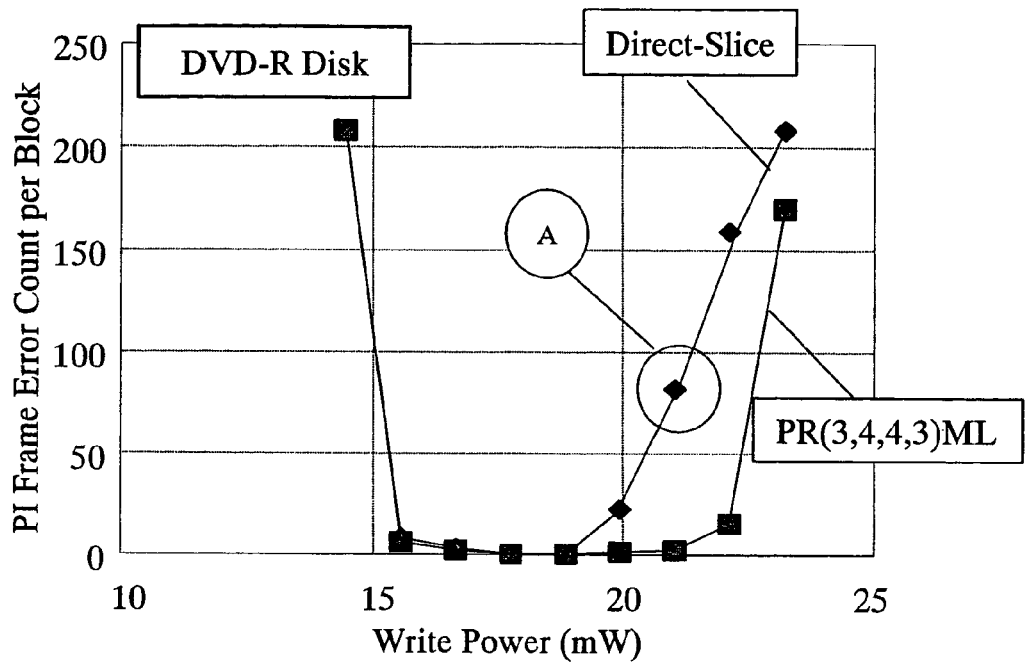
FIGS. 10(a)-10(c) show the measurement results indicating the relationship between write power and PI frame error in a DVD-R disc.
Figure 10B:
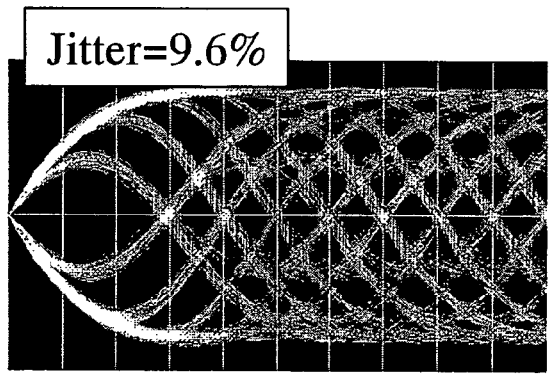
Figure 10C:
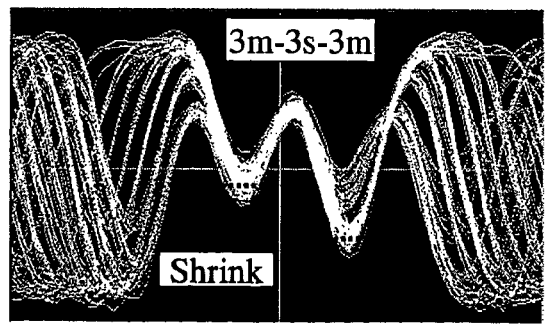
Figure 28:
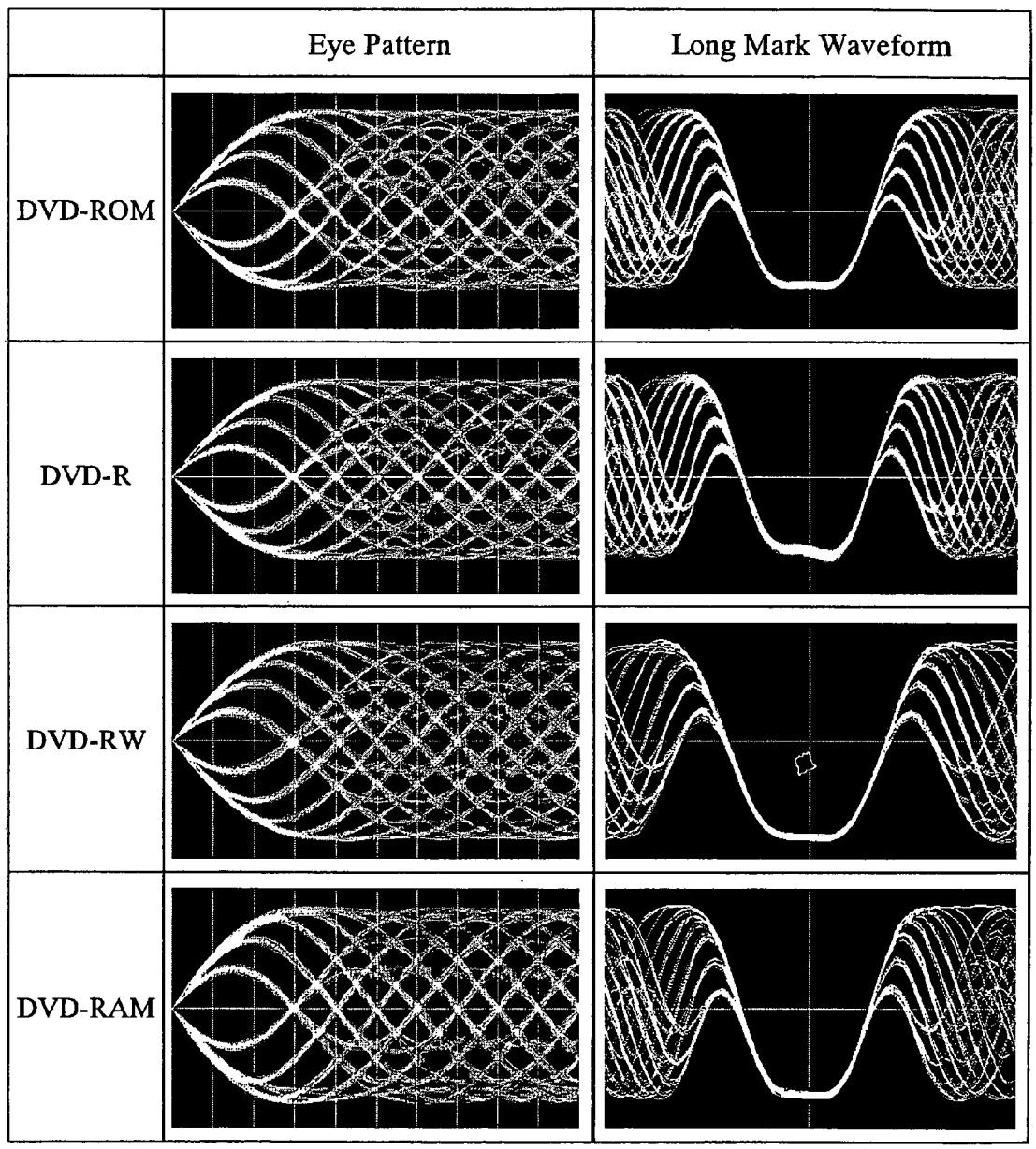
FIG. 28 shows the read signals from DVD-ROM, DVD-R, DVD-RW, and DVD-RAM media.

FIG. 28 shows the read signal for each of the media DVD-ROM, DVD-R, DVD-RW, and DVD-RAM. For the measurement, an evaluation apparatus LM330A manufactured by ShibaSoku Co., Ltd. mounting a head with NA 0.60 was used. The long mark waveforms depicted in the drawing are of a 10T mark signal that were extracted. It is seen that in media other than the DVD-R, the bottom portion of the read signal of the long mark is flat. This indicates that the width of the write mark (pit) is constant. When optimizing the write pulse shape and power, the first step is to cause the bottom portion of such a long mark to be flat, namely, to make the width of the write mark to be constant. By so doing, a recording can be realized such that a good jitter value can be obtained and crosstalk and cross-erase can be minimized. With regard to the DVD-R, as shown in FIG. 10, there is a tendency for the signal amplitude to drop when thermal energy is put in a subsequent portion. The same mechanism is believed to be at work regarding the read signal of the depicted long mark. Therefore, a difficult control would be required if the bottom of the long mark is to be made flat by all means. With regard to the DVD-R medium, it is necessary to adjust the write pulse shape and power providing a somewhat large tolerance concerning the flatness of the bottom of the long mark.

Figure 30:
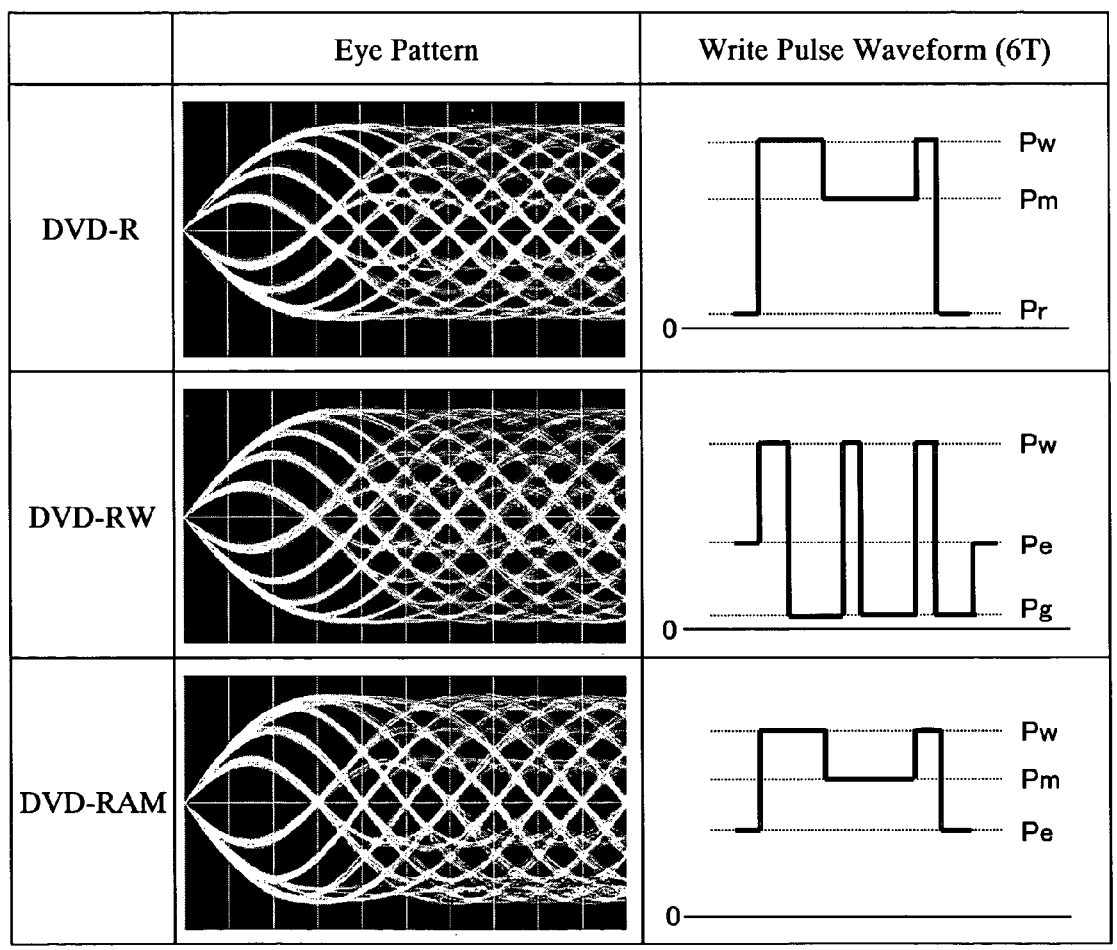
FIG. 30 schematically shows a write strategy for each of DVD-R, DVD-RW, and DVD-RAM media.

FIGS. 29 and 30 schematically show the write strategy for the DVD-R, DVD-RW, and DVD-RAM media. FIG. 29 shows a standard speed write condition, and FIG. 30 shows a high-speed write condition. Each write strategy is suitable for the recording physics of the corresponding medium. The recording physics inherent to each medium, which is beyond the scope of the invention and is not described in detail herein, must be known in order to optimize the write strategy in the same way as the above discussion regarding the long mark shape.

Figure 31:
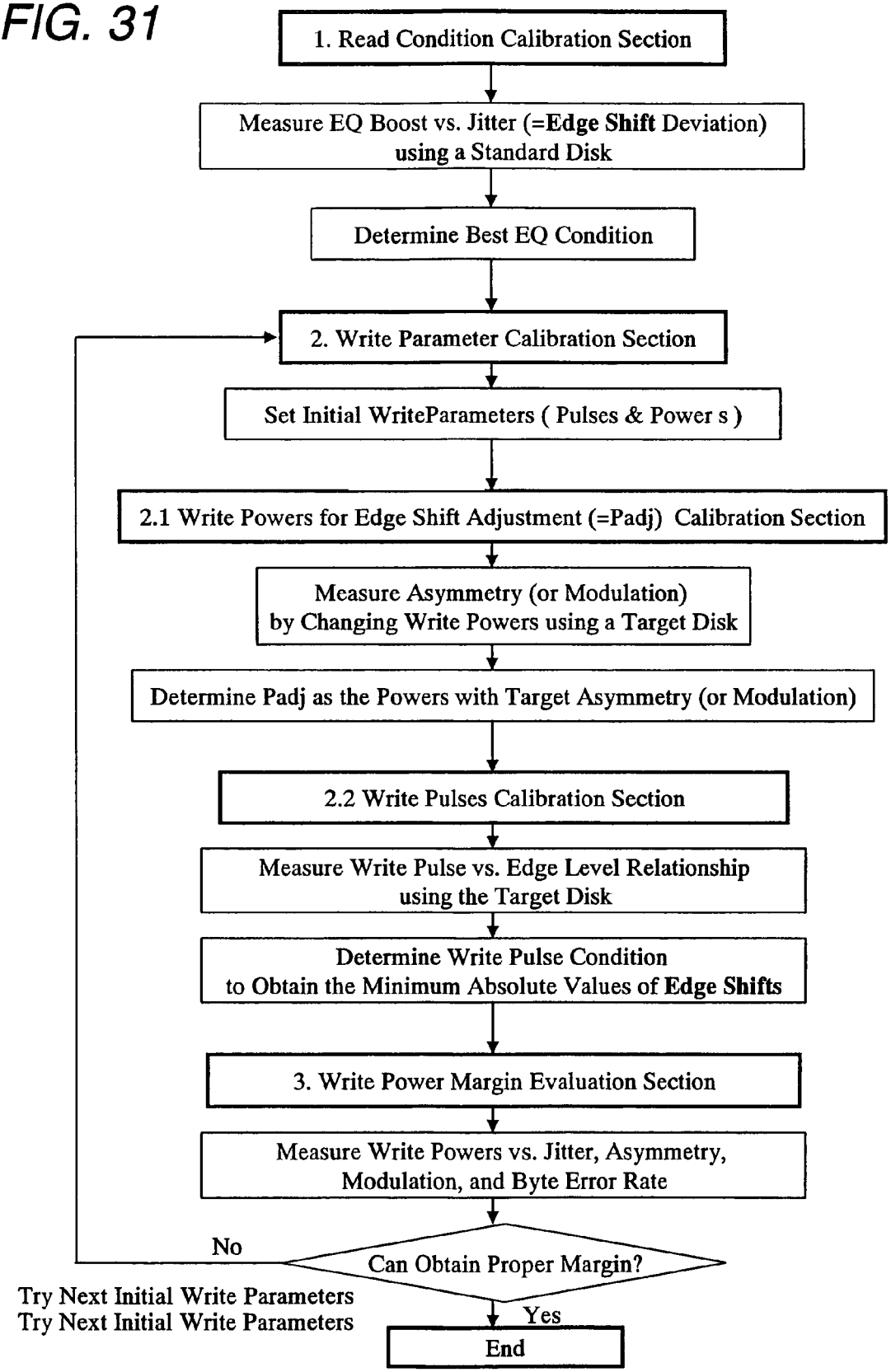
FIG. 31 shows an embodiment illustrating a write strategy optimization sequence according to the invention.

FIG. 31 shows an embodiment illustrating an optimization sequence for the write strategy of the invention. The sequence relates to the operation of the write strategy adjusting sequence in the analysis software shown in FIGS. 20, 22, 23, 24, and 26 in which edge shift is used as the evaluation value. The overall structure of the sequence consists of (1) a read condition calibration step; (2) a recording parameter calibration step; and (3) a write power margin evaluation step. The recording parameter calibration step (2) further consists of (2.1) a write power adjusting step for adjusting edge shift; and (2.2) a write pulse shape calibration step. The steps are described individually in the following.

(1) Read Condition Calibration Step

Figures 7, 8:
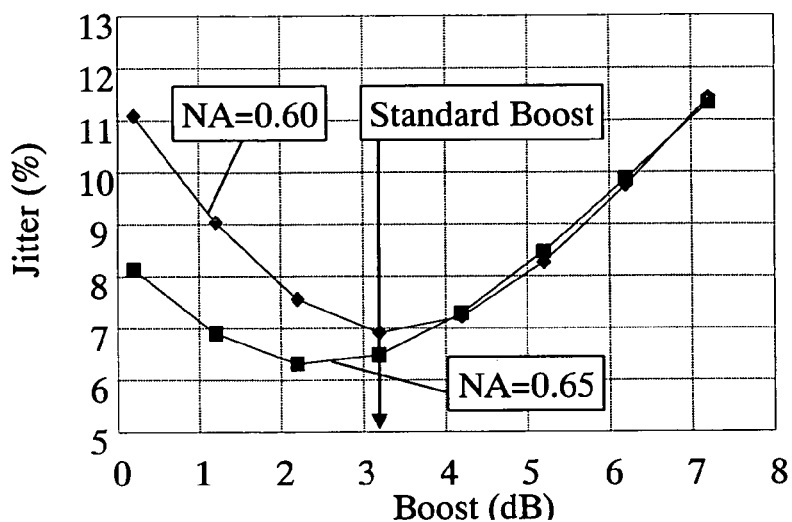
FIG. 7 shows the results of measuring the relationship between waveform equalizing boost amount and jitter using evaluation units with NA 0.60 and NA 0.65.
FIG. 8 shows the results of evaluating the jitter value of a DVD-R disc on the evaluation unit with NA 0.65 by optimizing the write condition by changing the equalizing boost amount of the evaluation unit to 2.2 dB.
Figure 9:
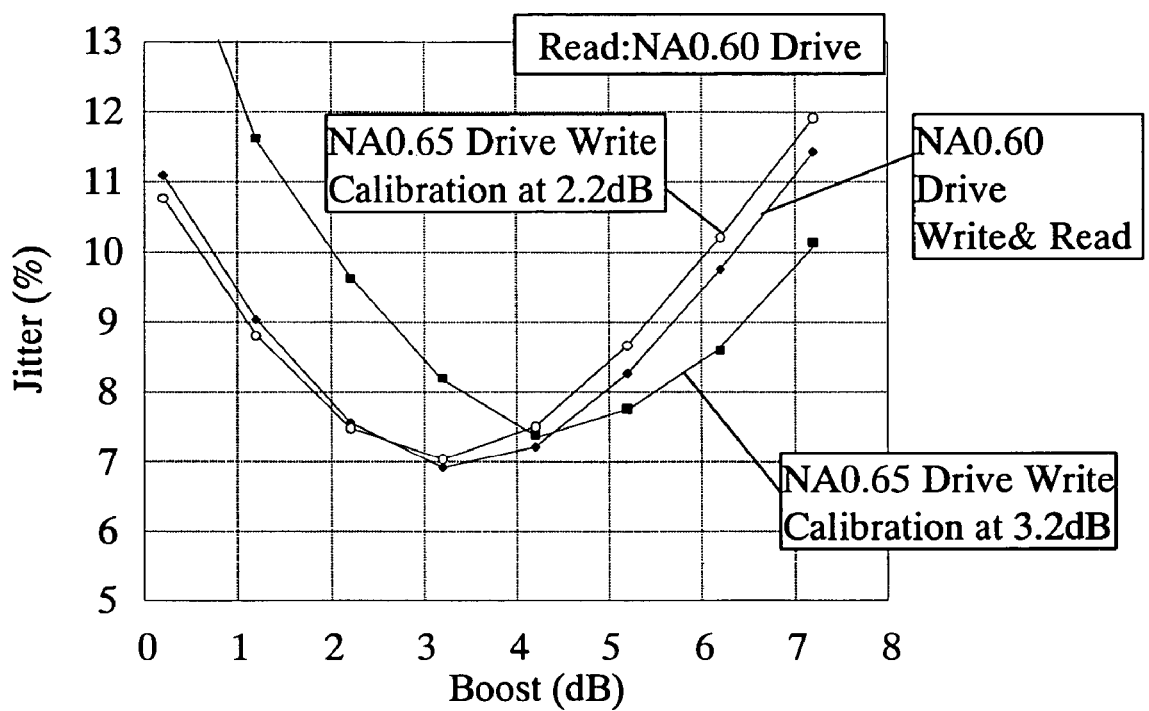
FIG. 9 shows the results of measuring the relationship between equalizing boost amount and jitter value when three recordable DVD discs were read on the evaluation unit with NA 0.60.

This is the initial step in which the equalization boost amount is calibrated so as to accommodate optical heads with different NA, as described with reference to FIG. 9. Specifically, a reference disc is read as shown in FIG. 7, and then an equalization boost amount such that the jitter value can be minimized is determined. The resultant read condition is used in the following steps.

(2) Recording Parameter Calibration Step (2.1) Recording Power Adjusting Step for Edge Shift Adjustment As described with reference to the control data of DVD-RAM, using the recommended write pulse shape (pulse width and edge position) as is in accordance with the adjustment procedure recommended by the disc manufacture, a power calibration is made in order mainly to absorb the difference in spot shape due to the difference in NA and the error in power calibration in the drive units. Because there are instructions concerning the asymmetry value in DVD-RAMs and instructions concerning the β value (quantity equivalent to asymmetry) in DVD-Rs, write power values (erase power value and bottom power value) are determined in accordance with these instructions such that a target asymmetry value (target β value) can be obtained. In the next step, the write power values determined in this step is used.

(2.2) Recording Pulse Shape Calibration Step

Figure 15:
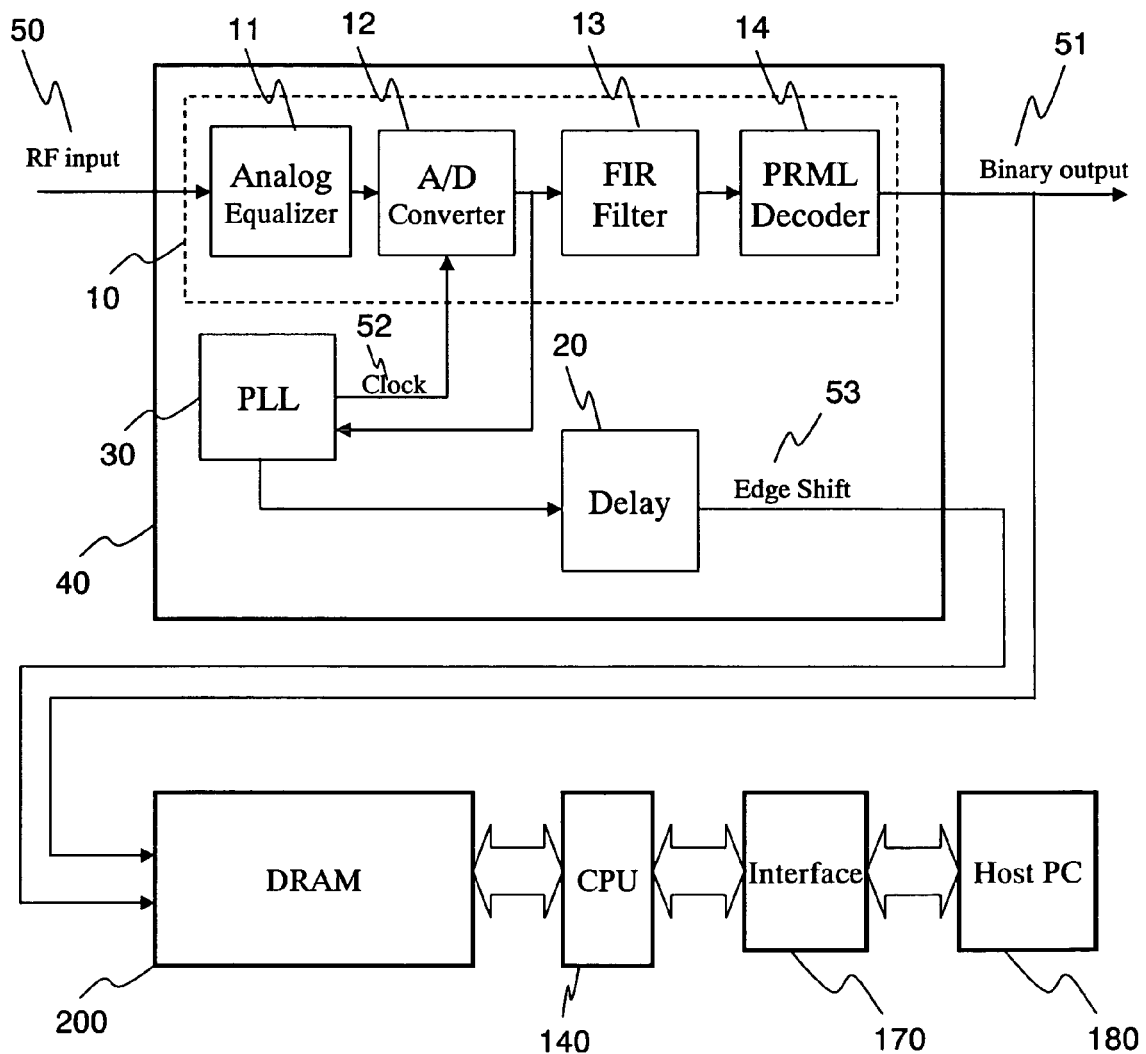
FIG. 15 shows an embodiment illustrating a circuit configuration suitable for the recording method and optical disc apparatus of the present invention.

While modifying the write pulse shape parameters, namely, the control parameters for the leading and trailing edges, individually, the edge shift amounts TSFP (Tsp, Tmk) and TELP (Tsp, Tmk) are evaluated under the above-described runaway protection condition using the configuration of FIG. 11 or FIG. 15 and the analysis software of FIG. 20. The write pulse shape parameters are then calibrated such that the edge shift amounts are as close to zero as possible. The write pulse parameters TSFP(3,3) and TELP(3,3) for the long marks of 6T or more are fixed.

(3) Recording Power Margin Evaluation Step

Using the thus calibrated write pulse shape parameters, the total jitter value and, if possible, the ECC error rate or the like are evaluated while varying the write power (or the erase power value or the bottom power value), in order to determine a power margin. If a sufficient power margin is obtained here, the loop is terminated. If a sufficient power margin is not obtained in this step, the initial values TSFP(3,3) and TELP (3,3) of the write pulse shape parameters are changed and the same process is repeated.

Figure 32:
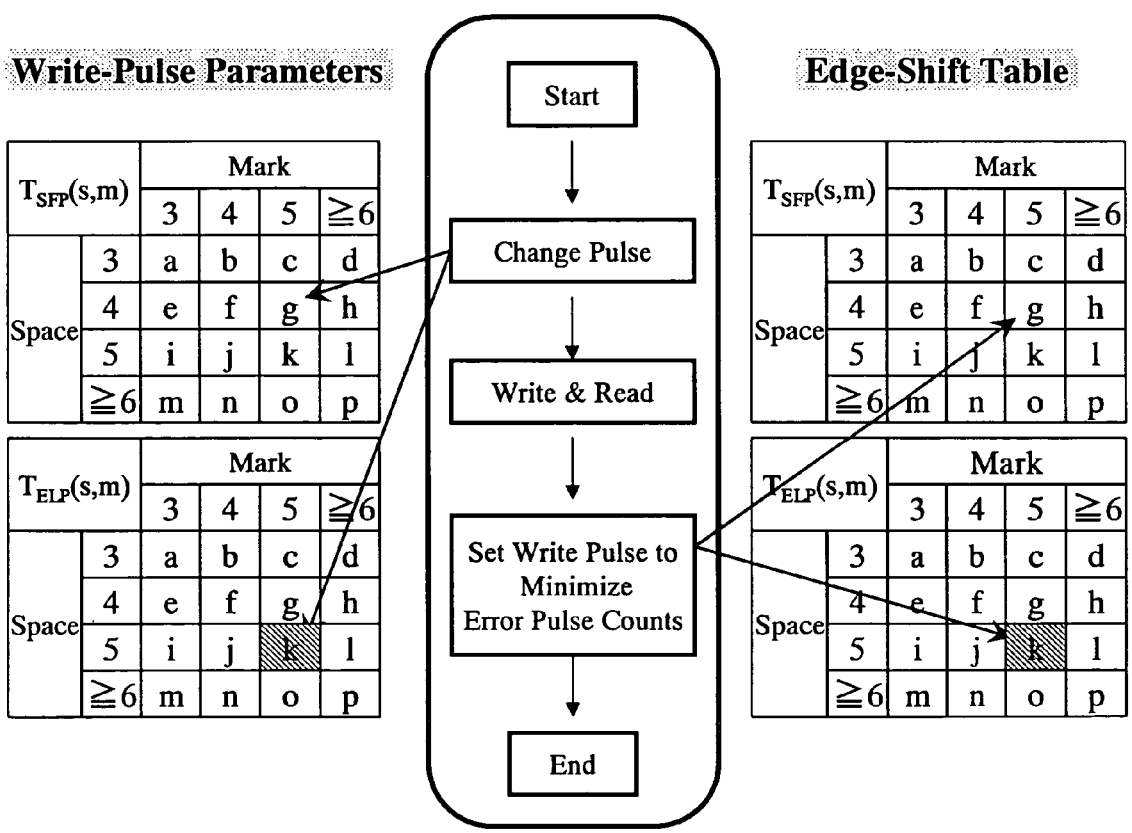
FIG. 32 schematically shows the flow of a write pulse shape calibration step in a DVD-RAM as an example.

FIG. 32 schematically shows the flow of the write pulse shape calibration step, using a DVD-RAM as an example. In DVD-RAMs, the write pulse parameters are defined in a 4×4 table for the leading and trailing edges individually. A mean value of each edge shift is measured and stored in an edge shift table for a similar 4×4 table edge pattern. In a simple sequence, the write pulse shape parameters are changed initially and an optical disc is recorded. Then, a particular sector is read and the corresponding edge shift value is evaluated, and the write pulse shape parameters are determined such that the edge shift value can be minimized. As will be seen from this example, the write pulse shape parameters and their evaluation values, namely, the edge shift table, correspond to each other on a one-to-one basis. Therefore, by performing the write/read process while varying the multiple write pulse parameters at once, a plurality of write pulse shape parameters can be optimized at the same time in parallel, thereby reducing the processing time.

Figure 33A:
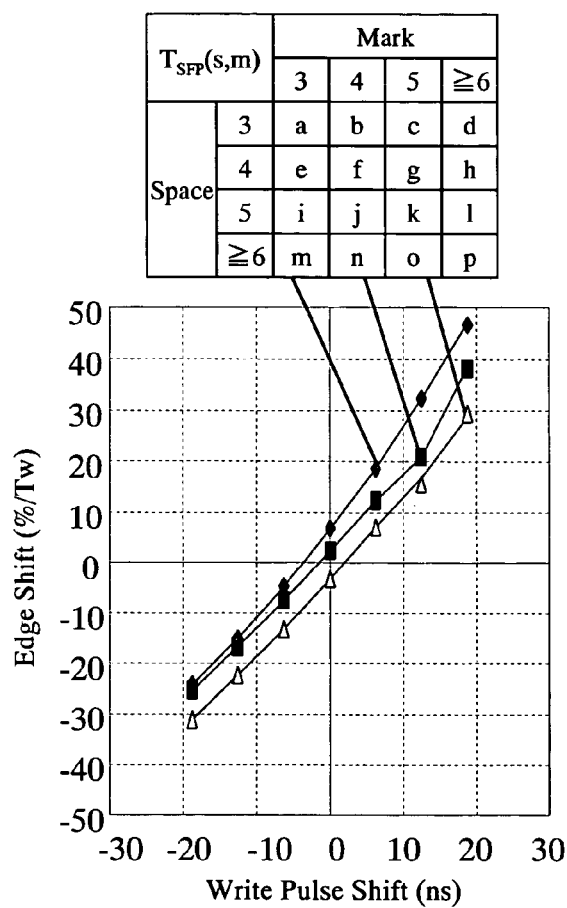
FIGS. 33(a)-33(b) show examples of measurement results for determining the write pulse shape parameter for a 2× DVD-RAM medium.
Figure 33B:
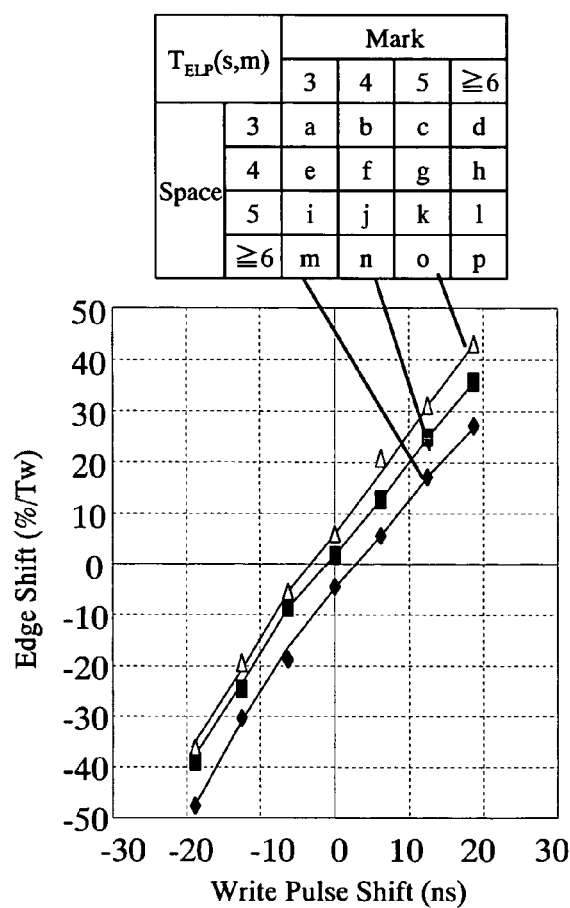

FIG. 33 shows an example of the measurement results for determining the write pulse shape parameters for a commercially available 2× DVD-RAM medium. In this example, measurement values of edge shift with respect to a displacement from an optimum value are summarized for six patterns including 6T spaces in the front and the rear. Thus, by selecting the write pulse shape parameters such that the value of each edge shift can be as close to zero as possible, optimization can be achieved.

Figure 34:
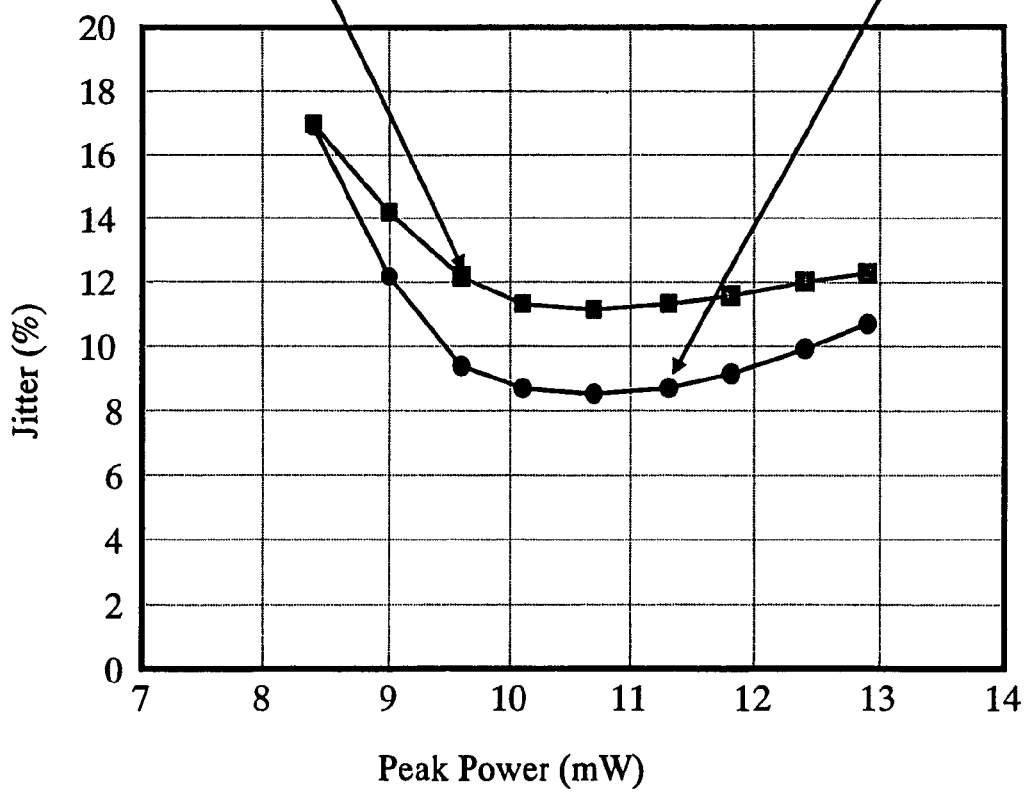
FIG. 34 shows measurement results indicating the difference in write power margin before and after write pulse shape optimization.

FIG. 34 shows the difference in the write power margin between before and after the optimization of the write pulse shape. After all of the 4×4 tables of the write pulse shape parameters are determined using the above-described optimization sequence, the relationship between write power and jitter value was measured. As will be seen from the drawing, the jitter value was improved and a good write power margin was obtained in accordance with the write method of the invention.

Figure 35A:
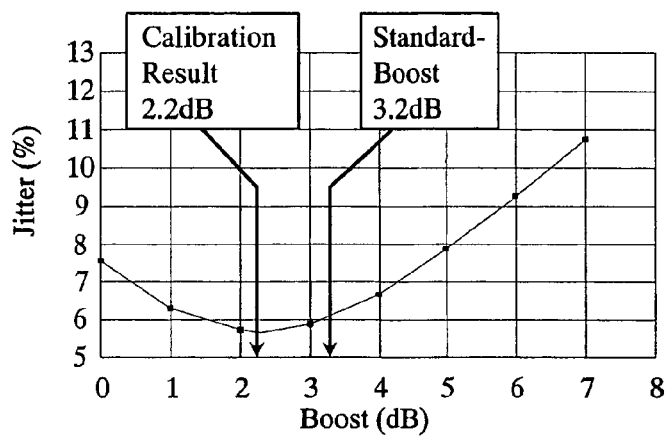
FIGS. 35(a)-35(c) show examples of a write pulse shape and power calibration sequence for the 2× writing of a DVD-R medium.
Figure 35B:
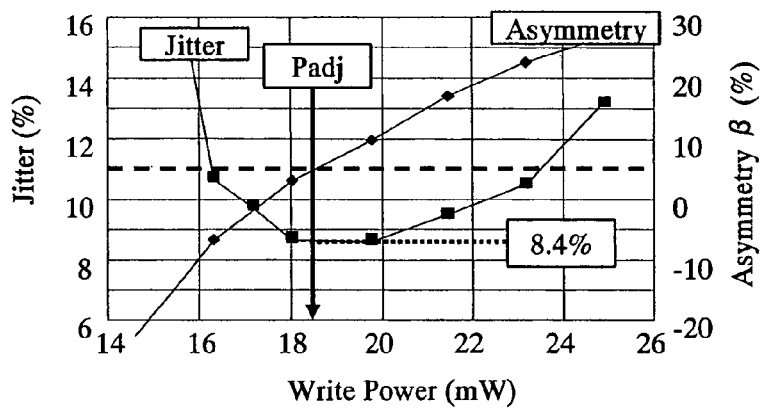
Figure 35C:
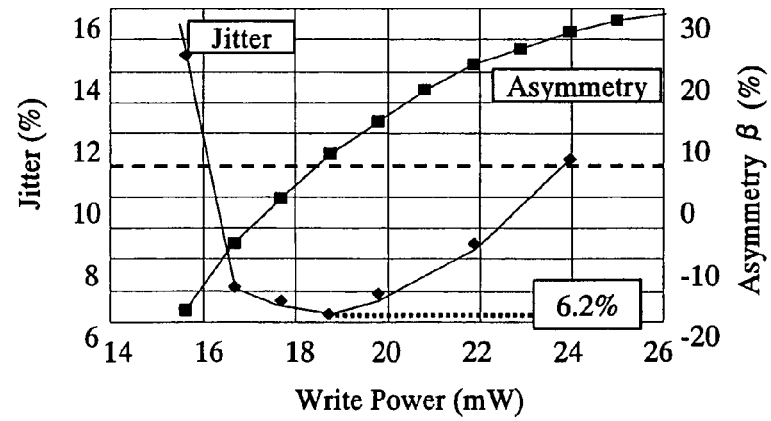

FIG. 35 shows an example of the write pulse shape and power calibration sequence for a commercially available DVD-R medium in the case of a 2× writing. As shown in FIG. 35(a), in the read condition calibration step (1), using a reference disc, the relationship between equalization boost amount and jitter value is determined, and the equalization boost amount is calibrated to 2.2 dB. FIG. 35(b) shows the results of the write power adjusting step for shift adjustment (2.2). The results are based on the measurement of the β value and the jitter value while changing the write power but without modifying the shape of the write pulse shape, using the parameters of the recommended write strategy read from the land pre-bit as the initial values. From these results, a write power Padj such that a target β value of 5% can be obtained is determined. FIG. 35(c) shows the results of measuring once again the relationship between write power and jitter value after the write pulse shape parameters have been calibrated. As shown, the jitter value improved from 8.4% to 6.2% by optimizing the write pulse shape parameters in accordance with the write method of the invention.

Figure 36:
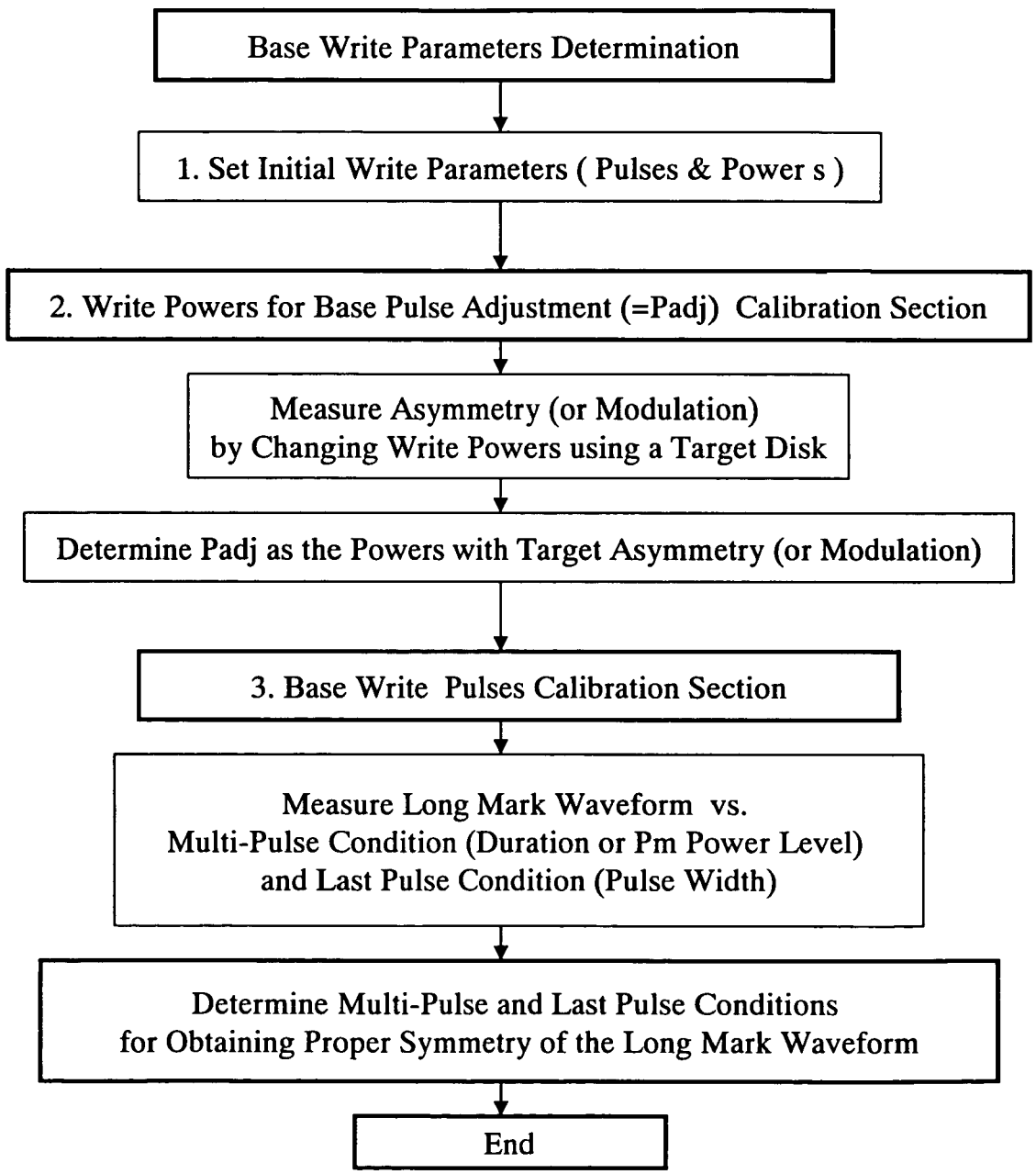
FIG. 36 shows an example of a sequence for optimizing a pulse shape parameter for writing a long mark.

FIG. 36 shows an example of a sequence for optimizing the pulse shape parameters for writing a long mark. This is a processing sequence that is used for changing the initial values TSFP(3,3) and TELP(3,3) of the write pulse shape parameters when a sufficient power margin cannot be obtained in the sequence of FIG. 31, for example. These parameters will be hereafter referred to as write pulse shape basic parameters. The overall sequence consists of (1) a step of setting write pulse shape and power initial values; (2) a step of adjusting write power for adjustment; and (3) a step of calibrating the write pulse shape basic parameters. These steps are hereafter described individually.

(1) Step of Setting the Initial Values for the Write Pulse Shape and Power

The write pulse shape and power recommended by the media manufacturer are read from the control data and used as the initial values.

(2) Step of Adjusting the Write Power for Adjustment

Using the same process as in the write pulse shape calibrating step (2.2) shown in FIG. 31, the write power for adjustment is determined.

(3) Step of Calibrating the Basic Parameters of the Write Pulse Shape

The waveform of a long mark is extracted and its flatness is measured, and then the shape of the write pulse is calibrated such that its front and rear asymmetries are within a tolerance range. Specifically, in the case of the write pulse shape described with reference to FIGS. 28 and 29, the front and rear asymmetries of the long mark are measured while changing the value of the duty of multiple pulses or the intermediate value of the power level (Pm in the drawing) corresponding to the multiple pulses. The basic parameters of the write pulse shape are then determined such that the asymmetries are within a tolerance range.

Figure 37:
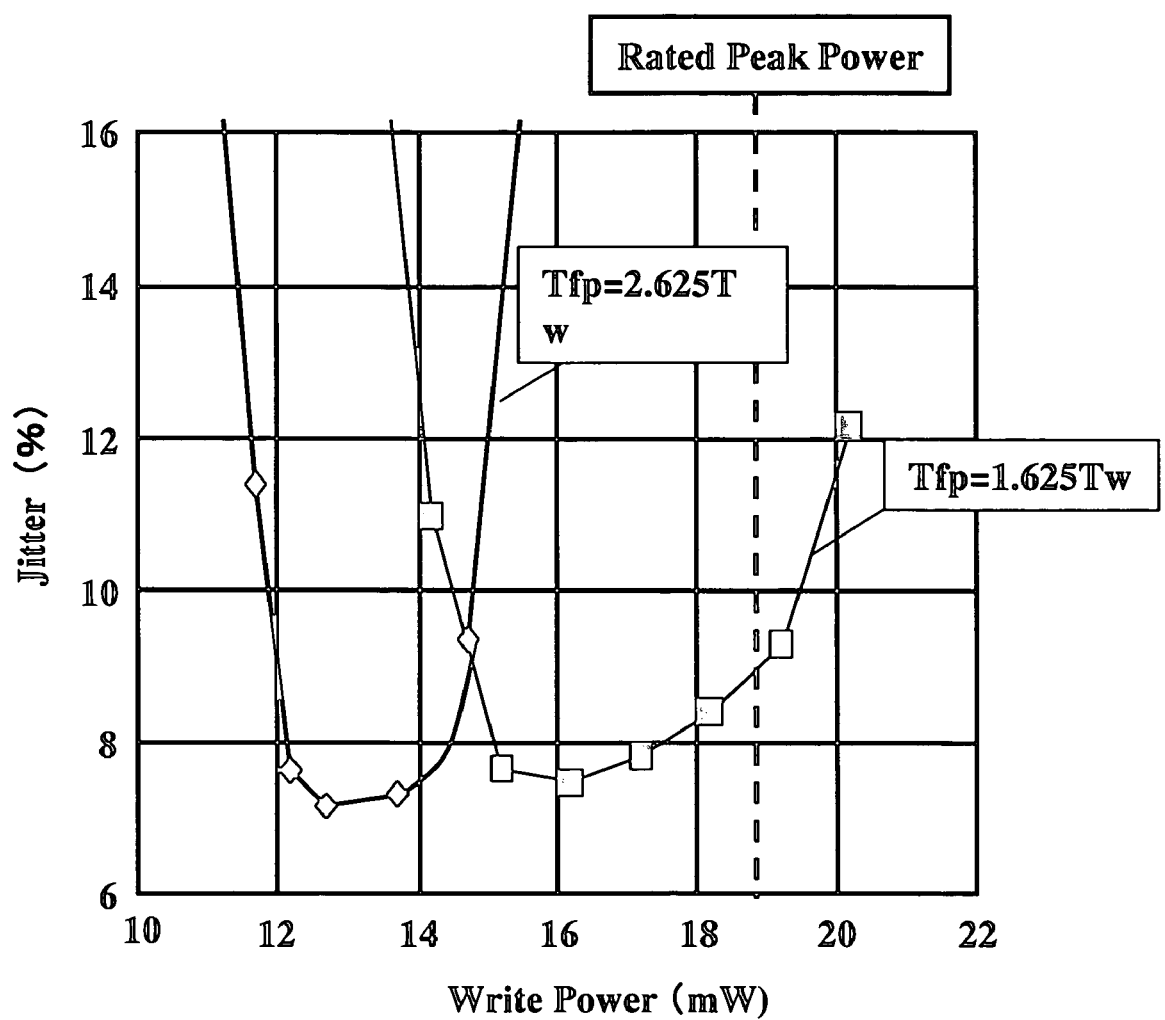
FIG. 37 shows the results of measuring the change in write sensitivity relative to the basic parameters of the write pulse shape in a DVD-R.

FIG. 37 shows the results of measuring the change in write sensitivities with respect to the basic parameters of the write pulse shape, in the case of a DVD-R. As a factor that determines the reliability of the drive unit, the write power margin is a major index. At the same time, there are cases where the rated values of the power of laser that is emitted are not sufficiently large relative to the sensitivity of the write medium. If a high-performance drive unit is to be developed with as small a cost as possible, such problems frequently occur. In such cases, it is effective to change modify the shape of the write pulse such that data could be written with a write power smaller than the rated write power. In the illustrated example, a commercially available DVD-R medium was recorded at the 2× speed. When the medium-manufacturer-recommended pulse (leading pulse width: 1.625T) was used as is, there was not much leeway with respect to the rate power of 18.5 mW. On the other hand, when a write pulse was used such that the leading pulse width was extended to 2.625T and the multi-pulse duties were linked and extended such that the shape of the long mark became increasingly more flat, the same level of write jitter value was obtained with a write power which was approximately 20% smaller, thereby allowing a sufficient margin to be obtained with respect to the rate output. In such a case too, it is effective to change the basic parameters of the write pulse shape.

Figure 38:
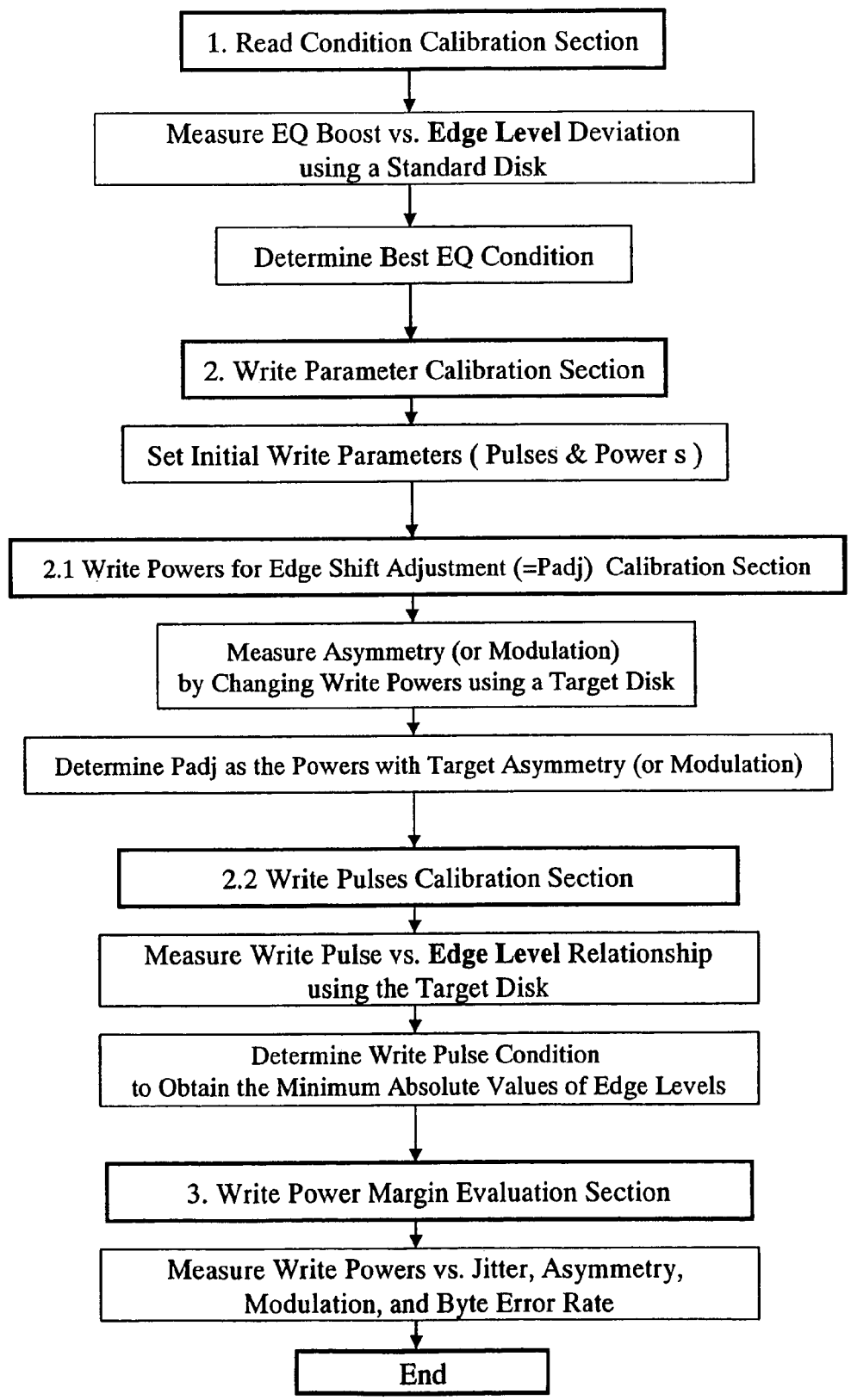
FIG. 38 shows another embodiment illustrating a write strategy optimization sequence in accordance with the invention.

FIG. 38 shows another embodiment illustrating a write strategy optimization sequence according to the invention. It shows the operation of the write strategy adjusting sequence unit 67 of the analysis software shown in FIG. 21. The present embodiment is simplified by using edge level instead of edge shift and by doing away with the retry loop whereby the basic parameters of the write pulse are changed after measuring the power margin. The overall structure consists of (1) a read condition calibrating step; (2) a write parameter calibrating step; and (3) a write power margin evaluation step. The write parameter calibrating step (2) is further comprised of (2.1) a write power adjusting step for edge shift adjustment, and (2.2) a write pulse shape calibrating step. The details of each step are the same as those shown in FIG. 31.

Figure 39:
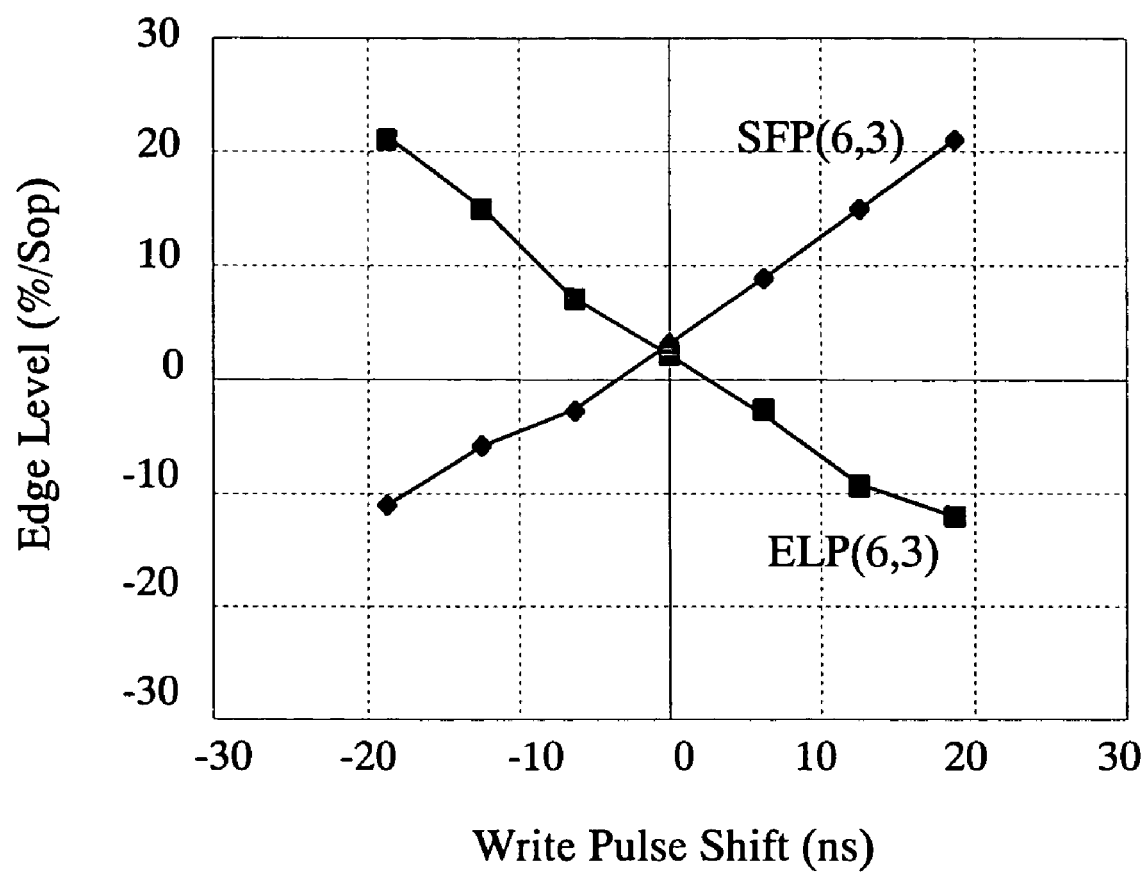
FIG. 39 shows an embodiment in which the shape of a write pulse has been optimized using an edge level.

FIG. 39 shows an example where the write pulse shape has been optimized using edge level. In the case of the edge shifts shown in FIG. 33, the edge shifts can be observed with the same signs when the leading and trailing edge positions of the write pulse are changed. On the other hand, when the edge levels are measured, the slope of the evaluation index for the trailing edge is reversed. Although this is an easily understandable problem when one considers the relationship between edge level and edge shift, the inventors took the trouble of explaining it with reference to the drawing as it is an important point to be noted in terms of processing software development.

Figure 40:
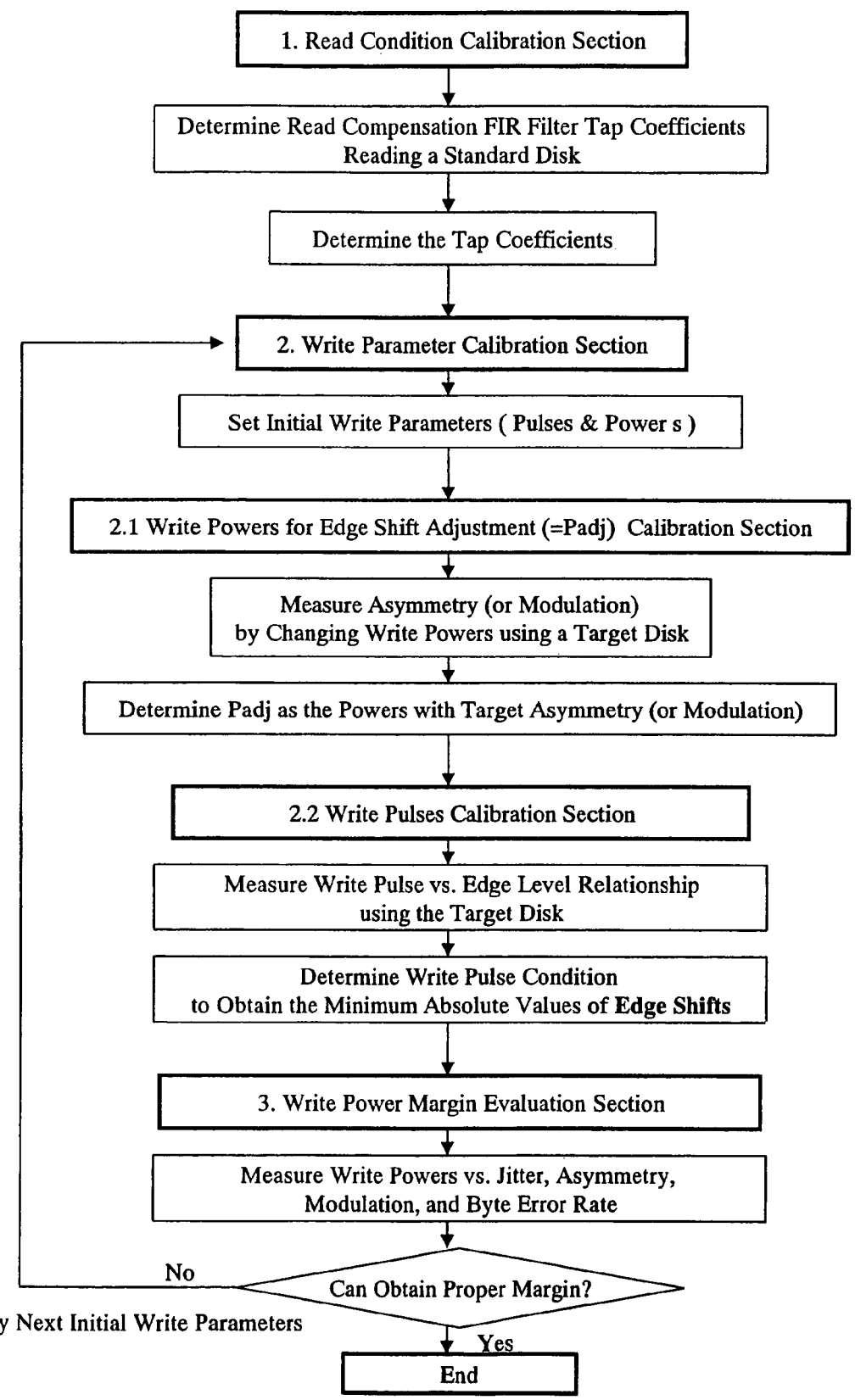
FIG. 40 shows another embodiment illustrating a write strategy optimization sequence in accordance with the invention.

FIG. 40 shows another embodiment of the write strategy optimization sequence according to the invention. It shows the operation of the write strategy adjusting sequence unit 67 of the analysis software shown in FIG. 25, and it involves the case where an FIR filter is used for correcting the difference in NA or group delay. The overall structure consists of (1) a read condition calibrating step; (2) write parameter calibrating step; and (3) write power margin evaluation step. The difference from the example of FIG. 31 lies in the read condition calibrating step (1). Specifically, the present embodiment employs an FIR filter for correcting read distortions such as group delay that cannot be addressed simply by determining the equalization boost amount in a simplified manner using the reference disc. For the determination of the individual tap coefficients of the FIR filter, the LSE (least square error) method can be used on the basis of an application of the adaptive equalizing technique for the PRML decoders, for example. The details will be described later, and the following describes the effect of such a technique with reference to an actual example involving a DVD-RAM.

FIG. 41 shows the results of measuring the relationship between the equalization boost amount and the jitter when a DVD-RAM disc was read on evaluation apparatuses with NA of 0.60 and 0.65. In the present example, a commercially available 2× DVD-RAM disc was used, and the write condition was adjusted such that the jitter value was minimized on the apparatus with NA of 0.60. The track that was read was an initially written track where there was no crosstalk. On the apparatus with NA of 0.60, the jitter value was minimized with the standard boost value for the DVD-RAM, namely, 5.5 dB. On the other hand, on the apparatus with NA of 0.65, the jitter value was minimized with the equalization boost amount of 4.0 dB. When the sequence of FIG. 31 is followed, the write pulse shape and power can be optimized with the equalization boost amount of 4.0 dB.

FIG. 42 shows a comparison of the shift amounts of individual patterns measured in the case where the DVD-RAM disc was read on the apparatuses of NA 0.60 and 0.65 with the standard boost condition. The read signal from the apparatus with NA of 0.60 had a jitter value of 5.2% and a resolution of 37%. When the same sector was read on the apparatus with NA of 0.65, the jitter value was 6.0% and the resolution was 61%. These differences in the read signal are due to the difference in optical spot shape caused by the different NA. In either case, however, the jitter value is good, so that the ECC error (PI error) is zero in each case and there is no problem in terms of signal reproduction. In the drawing, the measurement values of the edge shift with respect to a 4×4 pattern of the leading and trailing edges are shown in a table. In the case of the apparatus with NA of 0.60, each edge shift is not more than 5%/Tw because the write condition adjustment was made based on these values. However, when the disc was read on the apparatus with NA of 0.65, the maximum value of edge shift increased to 8%. The hatching in the drawing indicates an edge in which the difference between the both edge shifts exceeded 5%/Tw. If the write pulse shape and power are adjusted on the apparatus with NA of 0.65 using the equalization boost value of 5.5 dB, the read compatibility may be hindered, as mentioned above.

FIG. 43 shows the results of reading the same DVD-RAM disc on the apparatus with NA of 0.65 under the equalization boost amount of 4.0 dB. The jitter value was 5.1% and the edge shift amount was no more than 5%/Tw even on the apparatus with NA of 0.65. Thus, even if a test write is conducted under this read condition and the write condition is set such that the edge shift amount is minimized, the increase in the jitter value in the case of reading on the standard apparatus with NA of 0.60 would be kept within the tolerance range. However, the resolution (3T signal amplitude/11T signal amplitude) after equalization greatly differs between the apparatus with NA 0.60 and the apparatus with NA 0.65, the former being 37% and the latter 52%. This indicates the possibility that there could be a difference in the binarized result by the PRML scheme, in which the read signal is binarized based not only on the edge but also on temporal transition.

FIG. 44 shows the result of performing a read correction on the same DVD-RAM disc using an FIR filter on the apparatus of NA 0.65 with an equalization boost amount of 5.5 dB. In this example, the FIR filter 73 shown in FIG. 25 is provided with a NA-difference correcting function. The number of taps of the FIR filter 73 was set to be 15, and the tap coefficients were determined by the LSE method. The edge shift of each 4×4 pattern when read on the apparatus of NA 0.65 was closer to zero than the results shown in FIG. 43 in which only the equalization boost amount was adjusted, thus indicating an improvement. Also, with regard to the resolution of the signal after equalization, similar values to those obtained when read on the reference apparatus of NA 0.60 were obtained within the error range.

Figure 45:
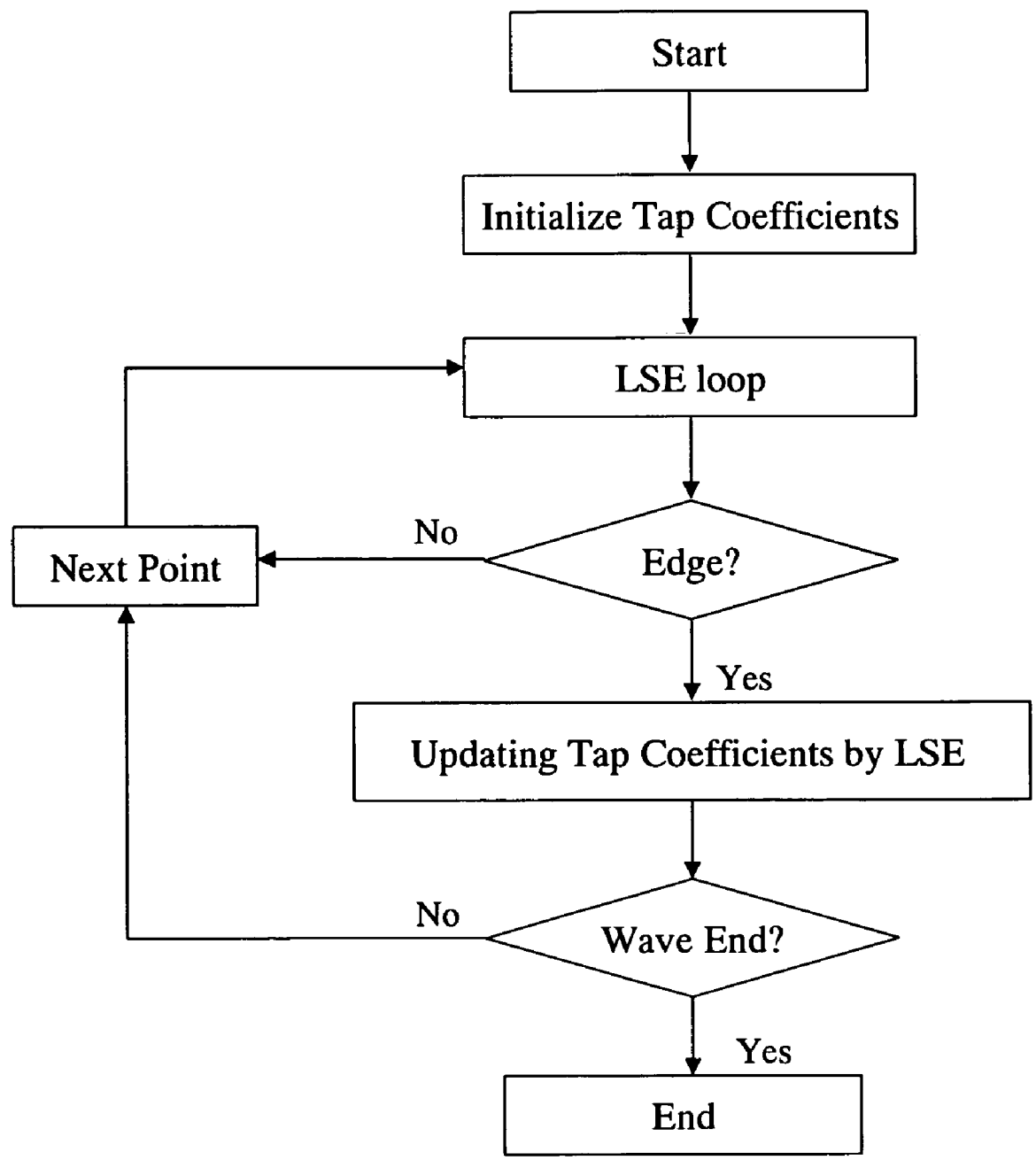
FIG. 45 shows a processing method for setting the tap coefficients of the FIR filter for read correction.

FIG. 45 shows a processing method for setting the tap coefficients of the FIR filter for the read signal correction. In the PRML decoder, the entire read signal is compared with a reference signal to decode it into a digital bit sequence that generates a closest reference signal. In the adaptive equalization by the conventional LSE method, each tap coefficient is sequentially updated based on the concept of the least squares such that the square of the error between the entire read signal and the entire reference signal is minimized. Because this has a different characteristic from the binarization based on the direct slice scheme, which focuses solely on the edge position, the LSE method should never be used as is for determining the tap coefficients of the FIR filter 73. In the present example, a technique was adopted which is based on an improvement of the conventional LSE method such that the tap coefficients are updated while solely focusing on the edge level. As shown, the method by itself is a simple arrangement based on a study loop of the LSE method to which an edge detection function has been added and should be easily understandable. Therefore, how the method is actually implemented will not be described in detail herein.

What is at issue here is the PR class that should be the target. PRML decoders produce a reference signal by the superposition of the PR class, which is an approximation of the impulse response of the read signal. Normally, it is desirable to employ a PR class that allows for reading with a sufficiently small error ratio. For example, in the case of DVDs including DVD-RAMs and CDs, PR(3,4,4,3) with a class bit number of 4 is often used. Although the error with respect to the read signal decreases as the class bit number is increased, this is not preferable as the circuit size increases substantially in proportion to the square of the class bit number. Because the primary purpose here is to ensure the read compatibility, a highly accurate approximation is required. After trying several techniques, it became clear that the impulse response should be directly approximated from the read signal that has been equalized with a reference equalization condition (i.e., the boost amount of 5.5 dB for DVD-RAM) on the apparatus with NA of 0.60, which is actually the reference. In addition to this method, it is also possible to perform the approximation based on the scalar diffraction-calculations.

In reality, the target signal was generated by means of PR(1.0,2.8,3.8,3.8,2.8,1.0) with a class bit number of 6. In this way, the read signal of the apparatus with NA of 0.60 can be approximated. When determining the tap coefficients for the apparatus with NA of 0.65, the standard equalizer for the DVD-RAM was used as analog equalizer, using the aforementioned LSE method that focuses solely on the class and the edge portion. A similar technique may be adapted to the disc media other than DVD-RAMs by reading the standard disc and determining the impulse response by approximation from the reproduced waveform.

Figure 46A:
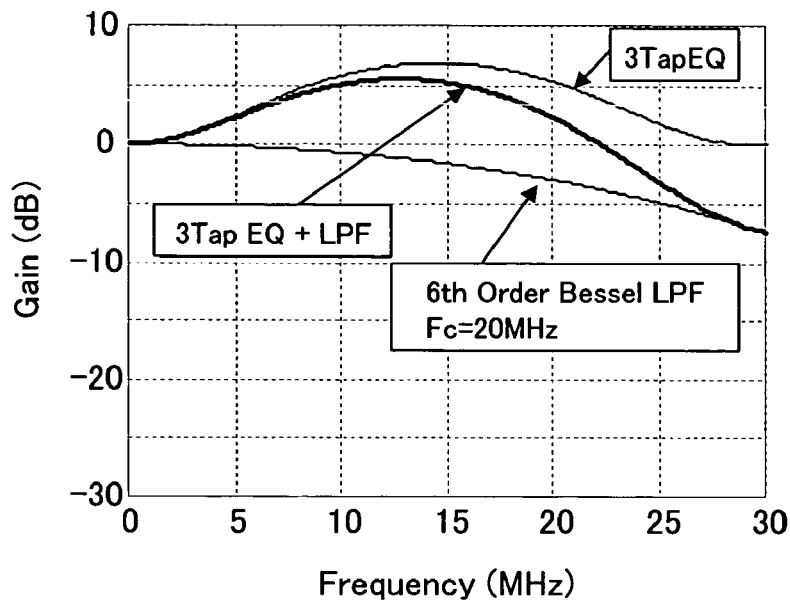
FIGS. 46(a)-46(b) show the frequency characteristics of the FIR filter determined by the LSE method.
Figure 46B:
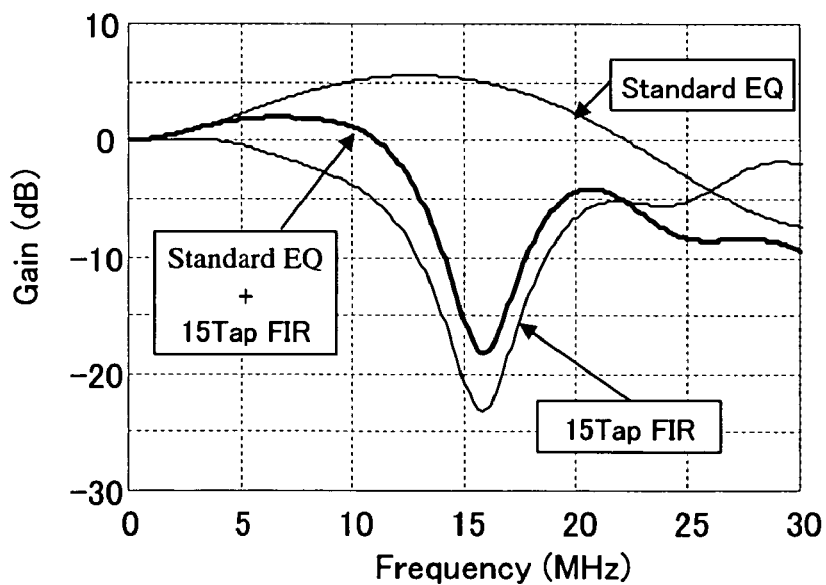

FIG. 46 shows the frequency characteristics of an FIR filter determined by the LSE method. FIG. 46(a) shows the standard equalization characteristics of the DVD-RAM at 2× speed, the filter being consisted of a 3-tap FIR filter and a $6^{th}$ order Bessel LPF. FIG. 46(b) shows the study results obtained on an apparatus with NA of 0.65. The frequency of a 3T signal repetition pattern is located at about 10 MHz. The FIR filter shows the characteristics of a low-pass filter that reduces the gain of the signal below 15 MHz. This shows that the filter functions to correct the increase in resolution due to the difference in NA. The gain peak seen at about 20 MHz does not have a particular contribution to the characterstics of the read signal.

FIG. 47 shows the results of determining the allowable value of an edge shift, in FIG. 42, the difference in the edge shift amount due to the difference in NA is pronounced in the pattern including a 3T mark and a 3T space, reflecting the difference in the optical spot size. However, in the 3T mark-3T space pattern, the difference in edge shift is small. This is due to the fact that, since the 3T-3T repetition signal is a sine wave, although the amplitude varies the edge position does not change even if the spot size changes. Thus, as shown in FIG. 46(a), using a leading1 trailing edge pattern, the edges at only the hatched portions were shifted, experimental and computed results were compared. The "+" and "−" signs in the figure indicate the direction of shift, which is the direction of edge shift in the case where the resolution changed due to a decrease in the optical spot size. The data pattern that was recorded was a 8-16 modulated signal in accordance with the DVD-RAM standard. When the frequency of the edges that are shifted is 21% ($R_+$, $R_-$) each, the shift amount is $\Delta_+$, $\Delta_-$ ($\Delta\sigma_+ = \Delta\sigma_-$ in the present case) each, and the jitter value of an averaged fluctuation of each edge is $\sigma_0$, the composed jitter $\sigma_{tot}$ of a complex Gaussian distribution can be expressed by:

$$\sigma_{tot} = \sqrt{\sigma_o^2 + \Delta_+^2 \cdot R_+ + \Delta_-^2 \cdot R_-} \tag{Eq. 14}$$

FIG. 47(b) shows the experimental results of examining the relationship between edge shift and bit error rate by generating an edge shift while varying the write pulse condition in accordance with the aforementioned condition. In the present example, assuming a normal operation condition of the DVD-RAM, an overwrite was conducted ten times on a continuous five tracks, and the signal from the central track was evaluated. The minimum jitter value was 8.4%. As seen in the drawing, when the edge shift exceeded 10%, the bit error ratio increases.

FIG. 47(c) shows the results of measuring the edge shift and jitter in the same experiment. The figure also shows the jitter value calculated in accordance with Eq. 14. A relatively good correspondence can be seen between the measurement results and the calculated results. It was learned that the allowable value for edge shift such that the jitter value can be maintained below 9% of the standard value was 5%/Tw. From the results shown in FIGS. 43 and 44, it is seen that the edge shift amount differences in the apparatus with NA 0.65 and that with NA 0.60 are both not more than 5%/Tw, which are within the allowable value.

The foregoing has been the description of the results of writing and reading a commercially available DVD-RAM media at 2× speed. Hereafter, the effect of group delay correction by FIR filter 73 in a 16× DVD-RAM medium under development and its write strategy will be described.

Figure 48:
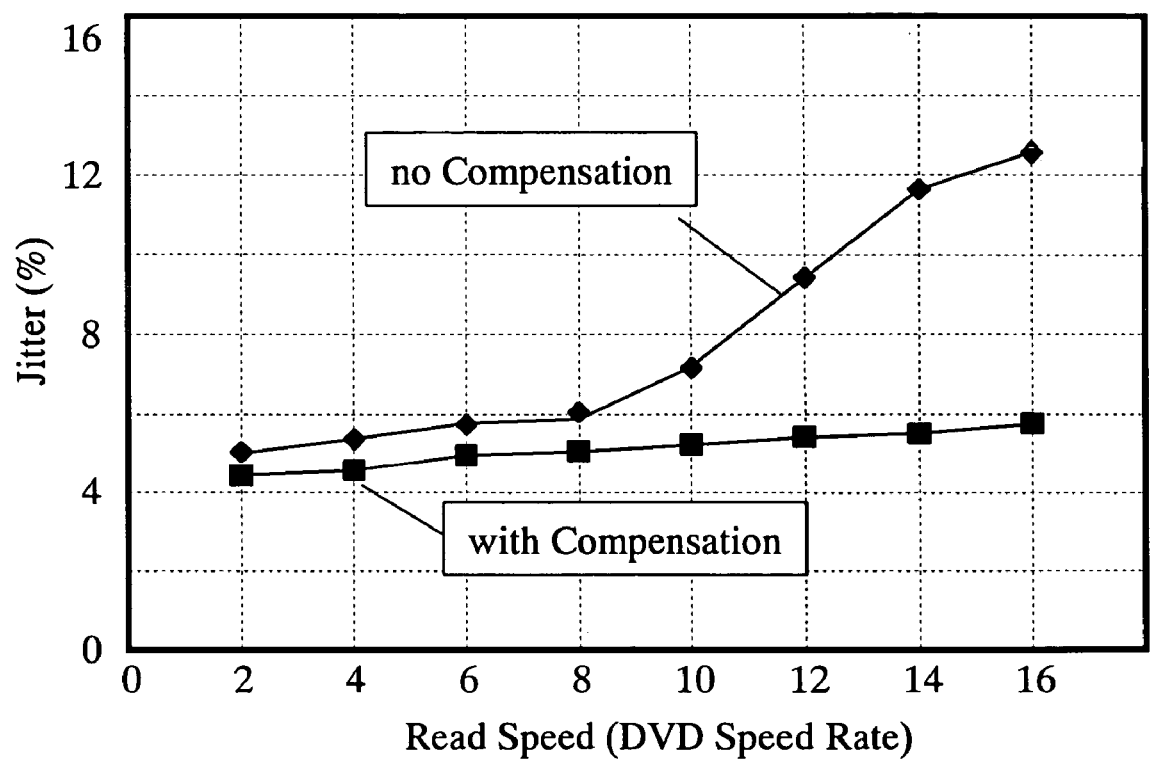
FIG. 48 shows the results of measuring the jitter value when a track written at 2× was read at speeds in the 2×-16× range on the evaluation unit with NA 0.60.

FIG. 48 shows the results of measuring the jitter value when a track that had been recorded at 2× speed was read in a 2-16× speed range on the evaluation unit with NA 0.60. While the write/read speed keeps increasing as the performance of the optical disc apparatus and media is enhanced, it is important to ensure the read compatibility when optimizing the write pulse shape and power, as has up to now been repeatedly stated. Meanwhile, when the same track is read at high speed, (1) the S/N ratio decreases as the influence of the amplifier noise and laser noise increases, and (2) the jitter value increases due to a relative increase in the group delay, for example, in accordance with the band characteristics of the I-V amplifier. With regard to problem (1), the reduction in S/N ratio can be recovered somewhat by introducing the PRML technology. On the other hand, with regard to problem (2), it poses a problem in terms of read compatibility as mentioned above. In particular, if a recording speed of 8× or higher is to be realized when writing DVDs, it is necessary to introduce a rotation control of the CAV scheme at least partly, which would require the setting of the write pulse shape and power such that a good write can be performed in a wide range of line velocity, thus complicating the problem. The figure shows the results in the case where the track was read under the standard equalization condition for the DVD-RAM, and in the case where mainly the group delay was corrected using the FIR filter.

Since the standard equalization condition for the DVD-RAM is defined at 2×, the measurements were made in the present example while causing the frequency characteristics to vary in proportion to the read speed with a constant equalizing boost amount. The jitter value, which was about 5% at 2× speed in the case of the standard equalization condition, exceeded 2% when read at 16× speed. On the other hand, when the read correction was performed using the FIR filter, it was possible to reduce the jitter value to 6% or smaller even when read at 16× speed. The read correction in the present example using the FIR filter employed the same technique as in the aforementioned adaptive equalization study focusing on the edge, in which the signal read on the unit with NA of 0.65 is caused to be close to a signal read on the unit with NA of 0.60. Specifically, the PR class was generated from the standard 2× read signal to obtain a reference signal, and, at each read speed, the individual tap coefficients of the FIR filter were determined such that the error between the read signal and the reference signal was minimized.

The frequency characteristics and noise of the I-V amplifier are qualitatively described herein. The band of an I-V amplifier is defined under the condition where the gain drops by 3 dB. For example, in the case of a DVD-RAM, when read at 16× speed, the frequency of the repetition signal of a minimum run-length (3T) is approximately 80 MHz. In order to read this signal properly, an I-V amplifier with a band at least twice as wide as 80 MHz. The performance of an I-V amplifier is dependent on the photodetector, the conversion resistance value, and the IC process. Generally, as in the performance indices for transistors and operational amplifiers, a limiting condition is imposed such that the product of the band and the gain (which can be considered to be the inverse of the noise) is substantially constant. Therefore, there is the relationship that when a wideband I-V amplifier is used, the noise of the amplifier increases. The I-V amplifiers used for the head of optical disc apparatuses are designed and selected such that a maximum apparatus performance can be achieved under such a limiting condition.

In such a case, when the aforementioned read band of 160 MHz is ensured, noise increases. Therefore, it is necessary to limit the band to approximately 120 MHz if a good apparatus performance is to be obtained. The band of the apparatus used in the experiment was 110 MHz. Although in the normal data reading process, considerations are given so as not to let such a characteristic to be a problem, using an I-V amplifier with performance ensuring read compatibility for the purpose of write pulse shape and power optimization is not preferable, for doing so would result in increasing noise or lead to an increase in the apparatus cost. However, by using the read correction technique of the present invention as described above, write pulse shape and power optimization can be realized by a software processing. As a result, the read compatibility can be ensured without any increase in the apparatus cost, which is one of the most significant effects of the present invention.

Figure 49:
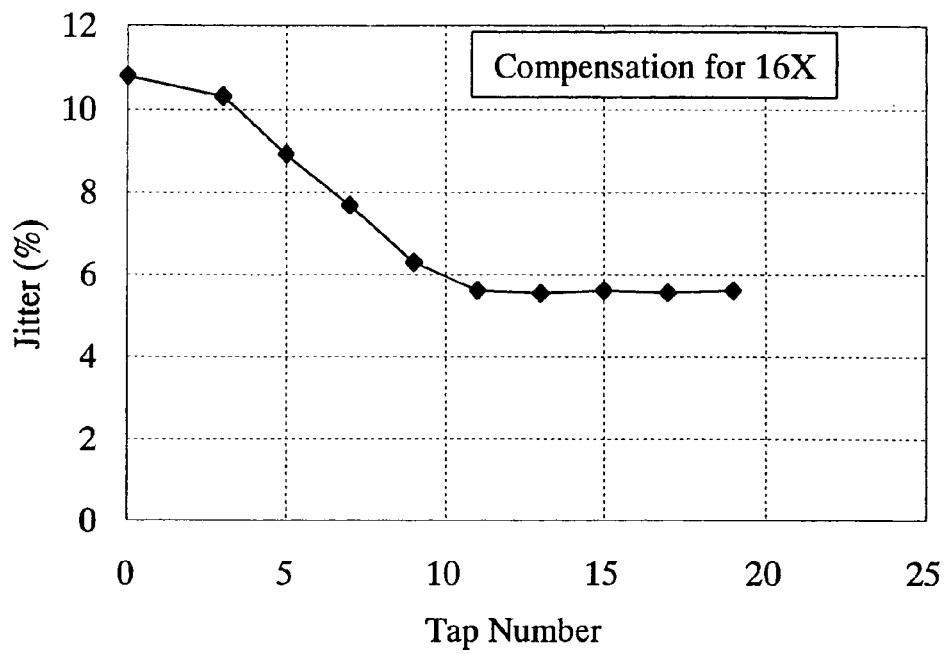
FIG. 49 shows the experimental results of measuring the relationship between the tap number of the FIR filter for read correction and jitter value at 16× speed.

FIG. 49 shows the experimental results obtained by measuring the relationship between the tap number of the FIR filter for read correction at 16× speed and the jitter value. The individual tap coefficients are determined as described above. As will be seen from the figure, the FIR filter had characteristics such that the jitter value starts to significantly decrease when the tap number exceeds 5 until it saturates with the tap number of 9 or larger. The tap number was set to 15 herein for sufficient margin.

Figure 50:
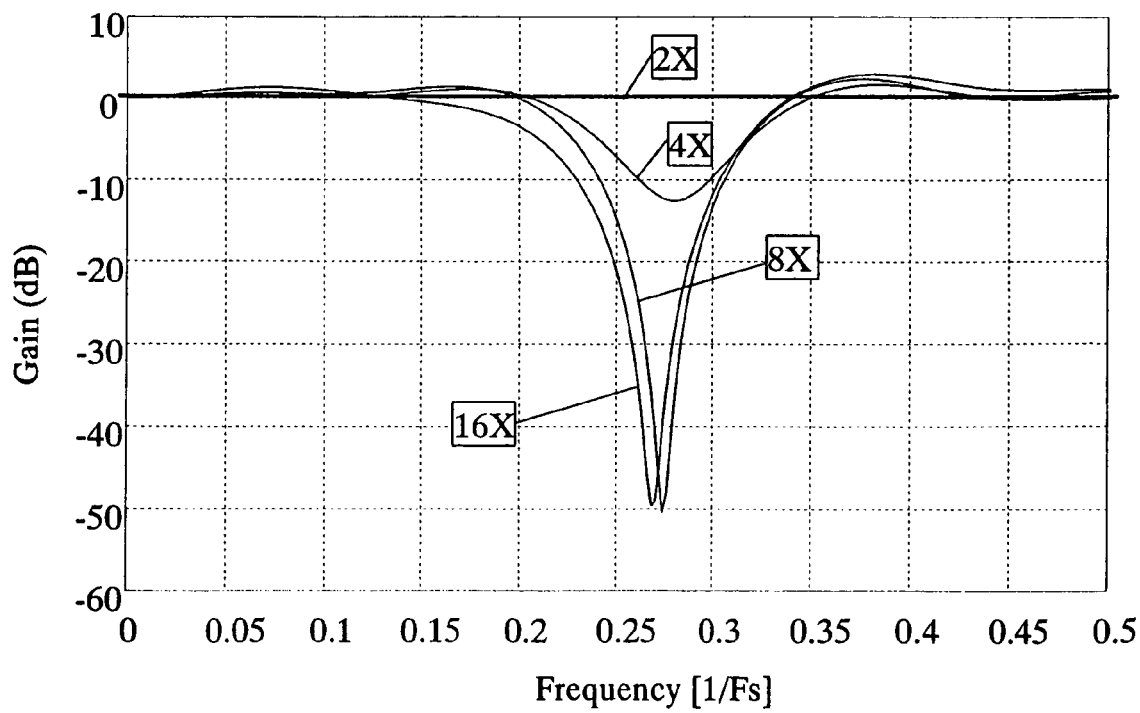
FIG. 50 shows the frequency characteristics of the FIR filter for read correction.

FIG. 50 shows the frequency characteristics of a FIR filter for read correction. In the present example, the frequency characteristics of the FIR filter at 2×, 4×, 8×, and 16× speeds are shown. Since the FIR filter is operated in synchronism with the channel clock, the frequency of the horizontal axis is standardized by the channel clock. The frequency of the repetition signal of minimum run-lengths (3T) is 0.167. Because the 2× speed is the reference for writing and reading, the FIR filter has characteristics such that it allows the read signal to pass through as is. Specifically, only the coefficient of the center tap is set to "1," and the other coefficients may be set to "0," as already mentioned above. The frequency characteristics of the FIR filter differ depending on the individual speed. The differences in characteristics at frequencies below 0.167 are mainly for correcting group delay, and the minimum value of gain that is observed at frequencies in the vicinity of 0.25 have a low-pass filtering effect, which improves the S/N ratio.

Figure 51A:
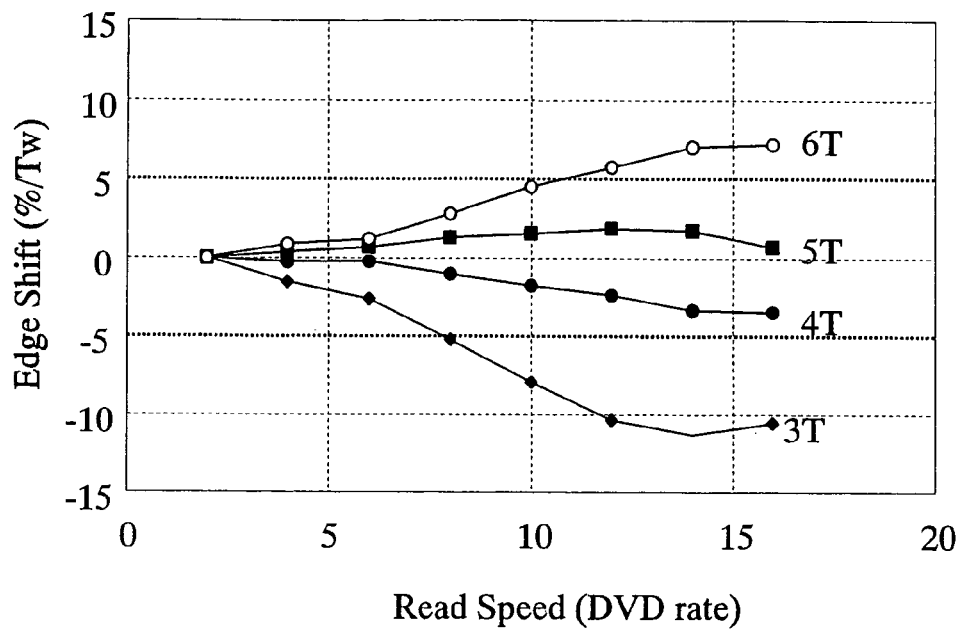
FIGS. 51(a)-51(b) show the experimental results concerning the group delay suppressing effect provided the FIR filter for read correction.
Figure 51B:
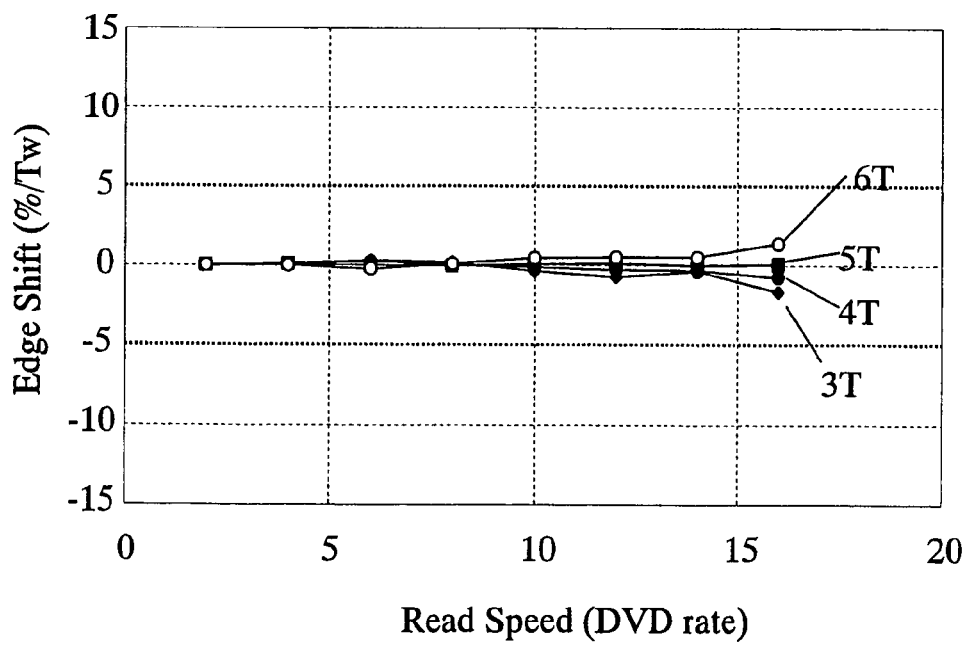

FIG. 51 shows the experimental results indicating the group delay suppressing effect obtained by the read correction FIR filter. FIG. 51(a) shows the results under the standard equalization condition. The edge shift in the vertical axis indicates the measurement results of edge shift in each of the aforementioned 4×4 patterns that have been averaged by the individual mark length of 3T, 4T, 5T, and 6T. It can be seen that, with reference to the 2× speed, 3T shifts by approximately −10% and 6T shifts by approximately +7% at 16×. These numbers do not satisfy the aforementioned condition of 5% or less for write/read compatibility. On the other hand, when a read correction was performed by means of the FIR filter, the edge shift amount was substantially constant in the range between 2× to 16× and the condition of 5% or less for read compatibility is satisfied, as shown in FIG. 51(b).

FIG. 52 shows the eye pattern and jitter value at each speed in a summarized manner for the case where read correction was performed and for the case when it was not performed. It is seen that a significant signal quality improving effect is obtained at the 16× speed in particular.

FIG. 53 shows the tap coefficients of the read correction FIR filter at each speed in a summarized manner. In this table, the tap coefficients are standardized such that the DC gain is 1.

FIG. 54 shows the results of measuring the jitter value and bit error ratio at 6× and 16× speeds. For the measurement of the bit error ratio, PR(3,4,4,3)ML was used. Even after 10 overwrites, good bit error ratios of $10^{-6}$ were obtained.

Embodiment 3

Figure 55:
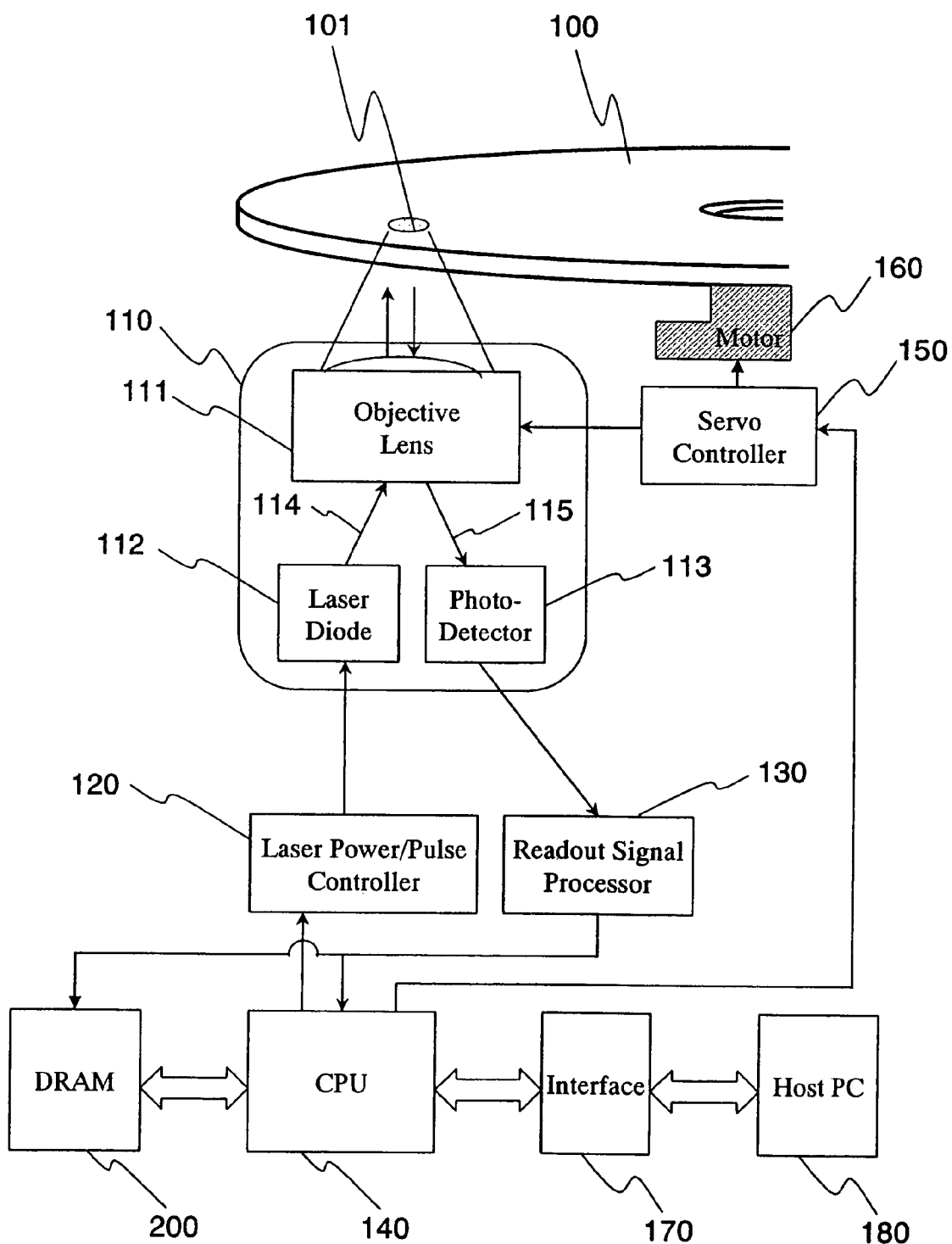
FIG. 55 shows an embodiment of an optical disc apparatus in accordance with the invention.

FIG. 55 shows an embodiment illustrating the configuration of an optical disc apparatus according to the invention. An optical disc medium 100 is rotated by a motor 160. Upon reading, a laser power/pulse controller 120 causes a semiconductor laser 112 in an optical head 110 to emit laser light 114 while controlling the current that flows in the optical head such that an optical intensity instructed by a CPU 140 can be obtained. The laser light 114 is focused by an objective lens 111, thereby forming an optical spot 101 on the optical disc medium 100. Reflected light 115 from an optical spot 101 is then detected by a photodetector 113 via an objective lens 111. The photodetector is comprised of a plurality of separate photo-detecting elements. A read signal processing circuit 130, using the signal detected by the optical head 110, reads the information recorded on the optical disc medium 100. Upon writing, the laser power/pulse controller 120 converts predetermined write data into a predetermined write pulse current and controls the semiconductor laser 112 to emit pulsed light. The circuit configurations of the invention shown in FIGS. 1 and 11, for example, are incorporated in the read signal processing circuit 130 shown in the figure, and the results are stored in an external memory 200. Sequences for read signal quality evaluation and for the optimization of write pulse shape and power are implemented in the CPU 140 or host PC 180 as programs. These configurations make it possible to provide the optical disc apparatus for realizing the recording method of the invention.

The invention is used for large-capacity optical disc apparatuses.

What is claimed is:

1. An optical disc apparatus for writing and/or reading information on an optical disc medium by irradiating said optical disc medium with a laser pulse, comprising:
   means for obtaining a read signal by reading data recorded on said optical disc medium;
   an Analog-to-Digital (A/D) converter for generating a read signal bit stream by converting said read signal into a digital data sequence;
   a Finite Impulse Response (FIR) filter for digitally equalizing said read signal bit stream to obtain an equalized read signal bit stream;
   a Viterbi decoder for outputting a binarized data signal by using said equalized read signal bit stream;
   means for extracting positional information of an edge of said read signal bit stream by performing linear interpolation or polynomial interpolation, based on at least two points including a point corresponding to said edge of said read signal bit stream; and
   adjusting means for adjusting conditions of said laser pulse for writing information, based on said positional information of said edge of said read signal bit stream.

2. The optical disc apparatus according to claim 1, wherein said positional information is a digital value representing a phase shift of a point corresponding to said edge of said read signal bit stream, and wherein said adjusting means determines the conditions of said laser pulse such that the digital value representing the phase shift of the point corresponding to said edge of said read signal bit stream becomes closer to zero, for each data pattern distinguished by said edge of said read signal bit stream and preceding and following spaces.

3. The optical disc apparatus according to claim 1, wherein said positional information represents the level of a point corresponding to said edge of said read signal bit stream, and wherein said adjusting means determines the conditions of said laser pulse such that the level of the point corresponding to said edge of said read signal bit stream becomes closer to a reference level of said A/D converter or a determination level of a direct slice scheme, for each data pattern distinguished by said edge of said read signal bit stream and preceding and following spaces.

4. The optical disc apparatus according to claim 1, further comprising a memory for sequentially and temporarily storing said positional information of said edge of said read signal bit stream.

5. An optical disc apparatus for writing and/or reading information on an optical disc medium by irradiating said optical disc medium with a laser pulse, comprising:
    an optical head having an objective lens with a predetermined numerical aperture;
    means for obtaining a read signal by reading data recorded on said optical disc medium;
    an Analog-to-Digital (A/D) converter for generating a read signal bit stream by converting said read signal into a digital data sequence;
    a Finite Impulse Response (FIR) filter for digitally equalizing said read signal bit stream to obtain an equalized read signal bit stream;
    a Viterbi decoder for outputting a binarized data signal by using said equalized read signal bit stream; and
    adjusting means for adjusting conditions of said laser pulse for writing information to said optical disc medium based on the equalized read signal bit stream;
    wherein in adjustment of the conditions of said laser pulse, equalization conditions of said FIR filter are set corresponding to a difference in a numerical aperture (NA) of said objective lens.

6. The optical disc apparatus according to claim 5, wherein said adjusting means determines the conditions of said laser pulse such that a digital value representing a phase shift of a point corresponding to the edge of said read signal bit stream that has been extracted from said equalized read signal bit stream becomes closer to zero, for each data pattern distinguished by the edge of said read signal bit stream and the preceding and following spaces.

7. A method of writing and/or reading information to an optical disc medium by irradiating said medium with a laser pulse, comprising the steps of:
    varying the power and pulse shape of said laser pulse;
    writing predetermined data pattern by irradiating a track on said optical disc medium with said laser pulse;
    obtaining a read signal by reading said data pattern;
    converting said read signal into a read signal bit stream using an Analog-to-Digital (A/D) converter in synchronism with a clock signal;
    equalizing said read signal bit stream using a Finite Impulse Response (FIR) filter;
    performing a Phase-Locked Loop (PLL) function that detects information corresponding to a phase difference between an edge portion of said clock signal and an edge portion of said read signal bit stream, and that tracks the frequency of said clock signal;
    obtaining a binarized data stream by binarizing said equalized read signal bit stream using a Viterbi decoder;
    extracting positional information in the form of a digital value from an edge of said read signal bit stream by performing linear interpolation or polynomial interpolation based on a level of a point corresponding to an edge of said read signal bit stream or levels of a point corresponding to said edge of said read signal bit stream and its peripheral points; and
    evaluating and optimizing the power and pulse shape of said laser pulse based on said positional information of said edge of said read signal bit stream, so that said detected phase difference becomes closer to zero.

8. The method according to claim 7, wherein said positional information of said edge of said read signal bit stream is sequentially and temporarily stored in a memory.

9. The method according to claim 7, wherein equalizing said read signal bit stream using said Finite Impulse Response (FIR) filter comprises filtering said read signal bit stream.

* * * * *